US008884912B2

(12) United States Patent
Otsuki et al.

(10) Patent No.: US 8,884,912 B2
(45) Date of Patent: Nov. 11, 2014

(54) ELECTROSTATIC CAPACITANCE TYPE INPUT DEVICE AND CALCULATION METHOD FOR CALCULATING APPROACH POSITION OF CONDUCTOR

(75) Inventors: Yoshiyuki Otsuki, Kyoto (JP); Yasushi Kasajima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 942 days.

(21) Appl. No.: 13/026,775

(22) Filed: Feb. 14, 2011

(65) Prior Publication Data

US 2011/0276291 A1 Nov. 10, 2011

(30) Foreign Application Priority Data

Feb. 19, 2010 (JP) ................................ 2010-034236
Apr. 12, 2010 (JP) ................................ 2010-091126

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04108* (2013.01)
USPC ........................... 345/174; 178/18.06; 702/65

(58) Field of Classification Search
USPC ......... 345/173–179; 178/18.01, 18.06, 19.03; 702/65
See application file for complete search history.

(56) References Cited

U.S. PATENT DOCUMENTS

2004/0021786 A1* 2/2004 Nakamura et al. ............ 348/294
2007/0242053 A1* 10/2007 Muranaka ..................... 345/173
2009/0315858 A1* 12/2009 Sato et al. ..................... 345/174
2010/0090712 A1* 4/2010 Vandermeijden ............. 324/658
2010/0259283 A1* 10/2010 Togura ......................... 324/679

FOREIGN PATENT DOCUMENTS

JP 2008-33777 2/2008

* cited by examiner

*Primary Examiner* — Abbas Abdulselam
*Assistant Examiner* — Gerald Oliver
(74) *Attorney, Agent, or Firm* — Hamre, Schumann, Mueller & Larson, P.C.

(57) ABSTRACT

An electrostatic capacitance type input device includes: first electrodes arranged in a first direction and extending in a second direction intersecting the first direction; second electrodes arranged in the second direction and extending in the first direction; a storage unit storing first direction detection values obtained through the first electrodes resulting from the change in capacitance between a first conductor and the electrodes, and storing second direction detection values obtained through the second electrodes resulting from the change in capacitance between the first conductor and the electrodes; and a calculation unit, which generates first map values from a first value and a second value obtained, respectively, by processing at least one of the first direction detection values and at least one of the second direction detection values. The calculation unit determines whether the first conductor has approached the first electrodes and second electrodes using the first map values.

20 Claims, 36 Drawing Sheets

$$(X1_{pq}, Y1_{pq}) = (X1_{2i+1\,2j}, Y1_{2i+1\,2j}) = \left(\frac{X_i + X_{i+1}}{2},\ Y_j\right)$$

$$(X1_{pq}, Y1_{pq}) = (X1_{2i\,2j+1}, Y1_{2i\,2j+1}) = \left(X_i, \frac{Y_j + Y_{j+1}}{2}\right)$$

$$(X1_{pq}, Y1_{pq}) = (X1_{2i+1\,2j+1}, Y1_{2i+1\,2j+1}) = \left(\frac{X_i + X_{i+1}}{2}, \frac{Y_j + Y_{j+1}}{2}\right)$$

FIG. 15

$$
T1=\begin{pmatrix}
map1(2,2) & & & & map1(2n+1,2)\\
& \ddots & & \cdots & \\
& & map1(pmax,qmax-1) & & \\
& map1(pmax-1,qmax) & map1(pmax,qmax) & map1(pmax+1,qmax) & \\
& & map1(pmax,qmax+1) & & \\
& \cdots & & \ddots & \\
map1(2n,2m+1) & & & & map1(2n+1,2m+1)
\end{pmatrix}
$$

$$(X2_{pq}, Y2_{pq}) = (X2_{2i+1\,2j+1}, Y2_{2i+1\,2j+1}) = \left(\frac{X_i+X_{i+1}}{2}, \frac{Y_j+Y_{j+1}}{2}\right)$$

$(X2_{pq}, Y2_{pq}) = (X2_{2i+1\,2j+1}, Y2_{2i+1\,2j+1}) = (\frac{X_i + X_{i+1}}{2}, \frac{Y_j + Y_{j+1}}{2})$

FIG. 27

$$T2=\begin{pmatrix} \mathrm{map2}(2,2) & \cdots & & & \mathrm{map2}(2n+1,2) \\ & & \mathrm{map2}(pmax,qmax-1) & & \\ & \mathrm{map2}(pmax-1,qmax) & \mathrm{map2}(pmax,qmax) & \mathrm{map2}(pmax+1,qmax) & \\ & & \mathrm{map2}(pmax,qmax+1) & & \\ \mathrm{map2}(2n,2m+1) & \cdots & & & \mathrm{map2}(2n+1,2m+1) \end{pmatrix}$$

ELECTROSTATIC CAPACITANCE TYPE INPUT DEVICE AND CALCULATION METHOD FOR CALCULATING APPROACH POSITION OF CONDUCTOR

BACKGROUND OF THE INVENTION

1. Field of the Invention

The present invention relates to an electrostatic capacitance type input device. In addition, the present invention relates to a calculation method for calculating an approach position of a conductor.

2. Description of the Related Art

FIGS. 34 and 35 show an example of an input device as an example of the related art of the present invention. FIG. 35 is an overhead view taken along line XXXV-XXXV of FIG. 34. An input device 9X shown in these drawings composes a touch panel by being used by superimposing with a liquid crystal display panel 9Y. This touch panel is used as display means and operating means of, for example, a cell phone 9Z. An example of a touch panel of the related art is disclosed in Japanese Patent Application Laid-Open No. 2008-33777.

The input device 9X is provided with a transmission plate 91 (omitted from FIG. 35), a transmission plate 92, detection electrodes 9*a* and 9*b*, wiring 931, wiring 932 (omitted from FIG. 34), a flexible substrate 971 and an IC chip 972. The detection electrodes 9*a* and 9*b* are respectively formed on the transmission plates 91 and 92. The detection electrodes 9*a* each extend along the y direction. The detection electrodes 9*b* each extend along the x direction. The wiring 931 is connected to the detection electrodes 9*a*. The wiring 932 is connected to the detection electrodes 9*b*.

FIG. 36 schematically shows the detection electrodes 9*a* connected to the IC chip 972. The IC chip 972 is provided with a plurality of input terminals 979. Each of the input terminal's 979 is individually connected to the wiring 931. Although not shown in the drawing, this applies similarly to the detection electrodes 9*b*.

As shown in FIG. 34, the cell phone 9Z has a transparent cover 98. The input device 9X is joined to the transparent cover 98. When a user operates the cell phone 9Z, a conductor 9D such as a finger approaches or contacts the transparent cover 98, thereby causing electrostatic capacitance to be generated between the conductor 9D and the detection electrodes 9*a* and 9*b*. FIG. 37 indicates a graph representing values corresponding to changes in electrostatic capacitance between the conductor 9D and the detection electrodes 9*a* when the conductor 9D has approached or contacted the transparent cover 98. The position where the conductor 9D has approached the transparent cover 98 can be detected by specifying the detection electrode 9*a* connected to the input terminal 979 in which electrostatic capacitance has increased.

In the input device 9X, electrostatic capacitance of the detection electrodes 9*a* and the detection electrodes 9*b* may vary slightly due to the effects of external noise even if the conductor 9D has not approached the transparent cover 98. Consequently, the IC chip 972 determines whether or not an increase in electrostatic capacitance of the detection electrodes 9*a* and the detection electrodes 9*b* exceeds a prescribed threshold value either before or after obtaining information relating to the approach position of the conductor 9D in the x direction and y direction. In the case the increase in electrostatic capacitance of the detection electrodes 9*a* does not exceed the specified threshold value, the IC chip 972 determines that the conductor 9D is not approaching the detection electrodes 9*a* and the detection electrodes 9*b*. At this time, the IC chip 972 outputs a signal to the outside indicating that the conductor 9D is not approaching. On the other hand, in the case the increase in electrostatic capacitance of the detection electrodes 9*a* and the detection electrodes 9*b* exceeds the prescribed threshold value, the IC chip 972 outputs information to the outside relating to the approach position of the conductor 9D.

However, in the case the transparent cover 98 of the cell phone 9Z is thick, for example, the minimum separation distance between the conductor 9D and the detection electrodes 9*a* and the detection electrodes 9*b* increases. Whereupon, an increase in electrostatic capacitance of the detection electrodes 9*a* and the detection electrodes 9*b* decreases even if the conductor 9D approaches. Consequently, there is no alternative but to decrease the above-mentioned threshold value. If the threshold value is decreased, there is the risk of an increase in electrostatic capacitance of the detection electrodes 9*a* and the detection electrodes 9*b* exceeding the threshold value in the case electrostatic capacitance of the detection electrodes 9*a* and the detection electrodes 9*b* has changed due to the effects of external noise. This leads to the problem of the conductor 9D being determined to have approached the detection electrodes 9*a* and the detection electrodes 9*b* despite the conductor 9D not actually approaching the detection electrodes 9*a* and the detection electrodes 9*b*.

SUMMARY OF THE INVENTION

With the foregoing in view, an object of the present invention is to provide an electrostatic capacitance type input device capable of suppressing the occurrence of misoperations.

An electrostatic capacitance type input device provided by a first aspect of the present invention is provided with a plurality of first detection electrodes arranged in a first direction and respectively extending in a second direction intersecting the first direction; a plurality of second detection electrodes arranged in the second direction and respectively extending in the first direction; a storage unit that respectively stores values obtained through each of the first detection electrodes resulting from a change in electrostatic capacitance between a first conductor and each of the first detection electrodes as first direction detection values, and respectively stores values obtained through each of the second detection, electrodes as a result of a change in electrostatic capacitance between the first conductor and each of the second detection electrodes as second direction detection values; and a calculation unit, wherein the calculation unit executes processing for generating a plurality of first map values obtained by arithmetic processing of a first value obtained by arithmetic processing of at least any of the plurality of first direction detection values and a second value obtained by arithmetic processing of at least any of the plurality of second direction detection values, and executes processing for determining whether or not the first conductor has approached the plurality of first detection electrodes and the plurality of second detection electrodes by using the plurality of first map values.

Preferably, the plurality of first map values includes a maximum first map value that is the largest value among the plurality of first map values, and the calculation unit compares the maximum first map value with a prescribed threshold value in the processing for determining whether or not the first conductor has approached.

Preferably, any one of the plurality of first values is a value obtained by weighting the area of a region where each of the first detection electrodes and a prescribed region overlap and adding at least any of the plurality of first direction detection values, and any one of the plurality of second values is a value obtained by weighting the area of a region where each of the second detection electrodes and the prescribed region overlap and adding at least any of the plurality of second direction detection values.

Preferably, each of the first map values is a sum of any one of the plurality of first values and any one of the plurality of second values.

Preferably, each of the first map values is a value obtained by exponentiating a sum of any one of the plurality of first values and any one of the plurality of second values.

Preferably, each of the first map values is correlated with a two-dimensional coordinate containing a pair of one coordinate value in the first direction and one coordinate value in the second direction, the calculation unit executes processing for calculating a first approach position in use of the plurality of first map values, and the first approach position is an approach position of the first conductor relative to the plurality of first detection electrodes and the plurality of second detection electrodes in the first direction and the second direction respectively.

Preferably, the calculation unit calculates the first approach position in use of only a portion of the plurality of first map values in the processing for calculating the first approach position.

Preferably, each of the first map values is any one of a plurality of elements of a first matrix, each of row components of the first matrix is correlated with a single coordinate value in the first direction while each of column components of the first matrix is correlated with a single coordinate value in the second direction, in the first matrix, coordinate values in the first direction correlated with the row components change monotonously as row numbers increase, while coordinate values in the second direction correlated with the column components change monotonously as column numbers increase, the plurality of first map values includes a maximum first map value that is the largest value among the plurality of first map values and two adjacent first map values different by one row number from the maximum first map value, but having mutually same column numbers as the maximum first map value, and the calculation unit calculates the first approach position by using the maximum first map value and the two adjacent first map values in the processing for calculating the first approach position.

Preferably, the plurality of first detection electrodes includes a first approached detection electrode closest to the first approach position among the plurality of first detection electrodes, the plurality of second detection electrodes includes a second approached detection electrode closest to the first approach position among the plurality of second detection electrodes, the calculation unit executes preparatory processing, and in the preparatory processing, a value corresponding to the first approached detection electrode among the plurality of first direction detection values in the storage unit is down-converted, and a value corresponding to the second approached detection electrode among the plurality of second direction detection values in the storage unit is down-converted.

Preferably, the calculation unit, after carrying out the preparatory processing, executes processing for generating a plurality of second map values obtained by arithmetic processing of a third value obtained by arithmetic processing of at least any of the plurality of first direction values and a fourth value obtained by arithmetic processing of at least any of the plurality of second direction detection values, and processing for determining whether or not a second conductor has approached the plurality of first detection electrodes and the plurality of second detection electrodes by using the plurality of second map values.

Preferably, each of the second map values is correlated with a two-dimensional coordinate containing a pair of one coordinate value in the first direction and one coordinate value in the second direction, the calculation unit executes processing for calculating a second approach position using the plurality of second map values, and the second approach position is an approach position of a second conductor, which differs from the first conductor, relative to the plurality of first detection electrodes and the plurality of second detection electrodes in the first direction and the second direction respectively.

Preferably, the calculation unit calculates the second approach position in use of only a portion of the plurality of second map values in the processing for calculating the second approach position.

Preferably, each of the second map values is any one of a plurality of elements of a second matrix, each of row components of the second matrix is correlated with a single coordinate value in the first direction while each of column components of the second matrix is correlated with a single coordinate value in the second direction, in the second matrix coordinate values in the first direction correlated with the row components change monotonously as row numbers increase, while coordinate values in the second direction correlated with the column components change monotonously as column numbers increase, the plurality of second map values includes a maximum second map value that is the largest value among the plurality of second map values and two adjacent second map values different by one column number from the maximum second map value, but having mutually same row numbers as the maximum second map value, and the calculation unit calculates the second approach position by using the maximum second map value and the two adjacent second map values in the processing for calculating the second approach position.

A calculation method provided by a second aspect of the present invention uses an electrostatic capacitance type input device provided with a plurality of first detection electrodes arranged in a first direction and respectively extending in a second direction intersecting the first direction, and a plurality of second detection electrodes arranged in the second direction and respectively extending in the first direction, the method comprising the steps of:

storing respectively in a storage unit, as first direction detection values, values obtained through each of the first detection electrodes resulting from a change in electrostatic capacitance between a first conductor and each of the first detection electrodes; storing respectively in the storage unit, as second direction detection values, values obtained through each of the second detection electrodes resulting from a change in electrostatic capacitance between the first conductor and each of the second detection electrodes; generating a plurality of first map values obtained by arithmetic processing of a first value obtained by arithmetic processing of at least any of the plurality of first direction detection values and a second value obtained by arithmetic processing of at least any of the plurality of second direction detection values, and determining whether or not the first conductor has approached the plurality of first detection electrodes and the plurality of second detection electrodes by using the plurality of first map values.

Preferably, the plurality of first map values includes a maximum first map value that is the largest value among the plurality of first map values, and the maximum first map value is compared with a prescribed threshold value in the determination step.

Preferably, any of the plurality of first values is a value obtained by weighting the area of a region where each of the first detection electrodes and a prescribed region overlap and adding at least any of the plurality of first direction detection values, and any of the plurality of second values is a value obtained by weighting the area of a region where each of the second detection electrodes and the prescribed region overlap and adding at least any of the plurality of second direction detection values.

Preferably, each of the first map values is a sum of any one of the plurality of first values and any one of the plurality of second values.

Preferably, each of the first map values is a value obtained by exponentiating a sum of any one of the plurality of first values Preferably, each of the first map values is correlated with a two-dimensional coordinate containing a pair of one coordinate value in the first direction and one coordinate value in the second direction, a step is further provided for calculating a first approach position in use of the plurality of first map values, and the first approach position is an approach position of the first conductor relative to the plurality of first detection electrodes and the plurality of second detection electrodes in the first direction and the second direction respectively.

Preferably, the first approach position is calculated in use of only a portion of the plurality of first map values in the step of calculating the first approach position.

Preferably, each of the first map values is any one of a plurality of elements of a first matrix, each of row components of the first matrix is correlated with a single coordinate value in the first direction while each of column components of the first matrix is correlated with a single coordinate value in the second direction, in the first matrix coordinate values in the first direction correlated with the row components change monotonously as row numbers increase, while coordinate values in the second direction correlated with the column components change monotonously as column numbers increase, the plurality of first map values includes a maximum first map value that is the largest value among the plurality of first map values and two adjacent first map values different by one row number from the maximum first map value, but having mutually same column numbers as the maximum first map value, and the first approach position is calculated by using the maximum first map value and the two adjacent first map values in the step of calculating the first approach position.

Preferably, the plurality of first detection electrodes includes a first approached detection electrode closest to the first approach position among the plurality of first detection electrodes, and the plurality of second detection electrodes includes a second approached detection electrode closest to the first approach position among the plurality of second detection electrodes, with the calculation method further comprising a preparation step, and in the preparation step, a value corresponding to the first approached detection electrode among the plurality of first direction detection values in the storage unit is down-converted, and a value corresponding to the second approached detection electrode among the plurality of second direction detection values in the storage unit is down-converted.

Preferably, the calculation method further comprises:

after the preparation step, a step of generating a plurality of second map values obtained by arithmetic processing of a third value obtained by arithmetic processing of at least any of the plurality of first direction values and a fourth value obtained by arithmetic processing of at least any of the plurality of second direction detection values; and a step of determining whether or not the second conductor has approached the plurality of first detection electrodes and the plurality of second detection electrodes by using the plurality of second map values.

Preferably, each of the second map values is correlated with a two-dimensional coordinate containing a pair of one coordinate value in the first direction and one coordinate value in the second direction, a step is further provided for calculating a second approach position in use of the plurality of second map values, and the second approach position is an approach position of the second conductor relative to the plurality of first detection electrodes and the plurality of second detection electrodes in the first direction and the second direction respectively.

Preferably, the second approach position is calculated in use of only a portion of the plurality of second map values in the step of calculating the second approach position. Preferably, each of the second map values is any one of a plurality of elements of a second matrix, each of row components of the second matrix is correlated with a single coordinate value in the first direction while each of column components of the second matrix is correlated with a single coordinate value the second direction, in the second matrix coordinate values in the first direction correlated with the row components change monotonously as row numbers increase, while coordinate values in the second direction correlated with the column components change monotonously as column numbers increase, the plurality of second map values includes a maximum second map value that is the largest value among the plurality of second map values and two adjacent second map values different by one column number from the maximum second map value, but having mutually same row numbers as the maximum second map value, and the second approach position is calculated by using the maximum second map value and the two adjacent second map values in the step of calculating the second approach position.

Other characteristics and advantages of the present invention will made be clear by the following detailed explanation while referring to the appended drawings.

BRIEF DESCRIPTION OF THE DRAWINGS

FIG. 15 is a drawing for explaining a step of determining whether or not a conducted has approached in a first embodiment;

FIG. 27 is a drawing for explaining a step of determining whether or not a conductor has approached in a fifth embodiment;

DETAILED DESCRIPTION OF THE PREFERRED EMBODIMENTS

The following provides a detailed explanation of embodiments of the present invention with reference to the drawings.

Figure 1:
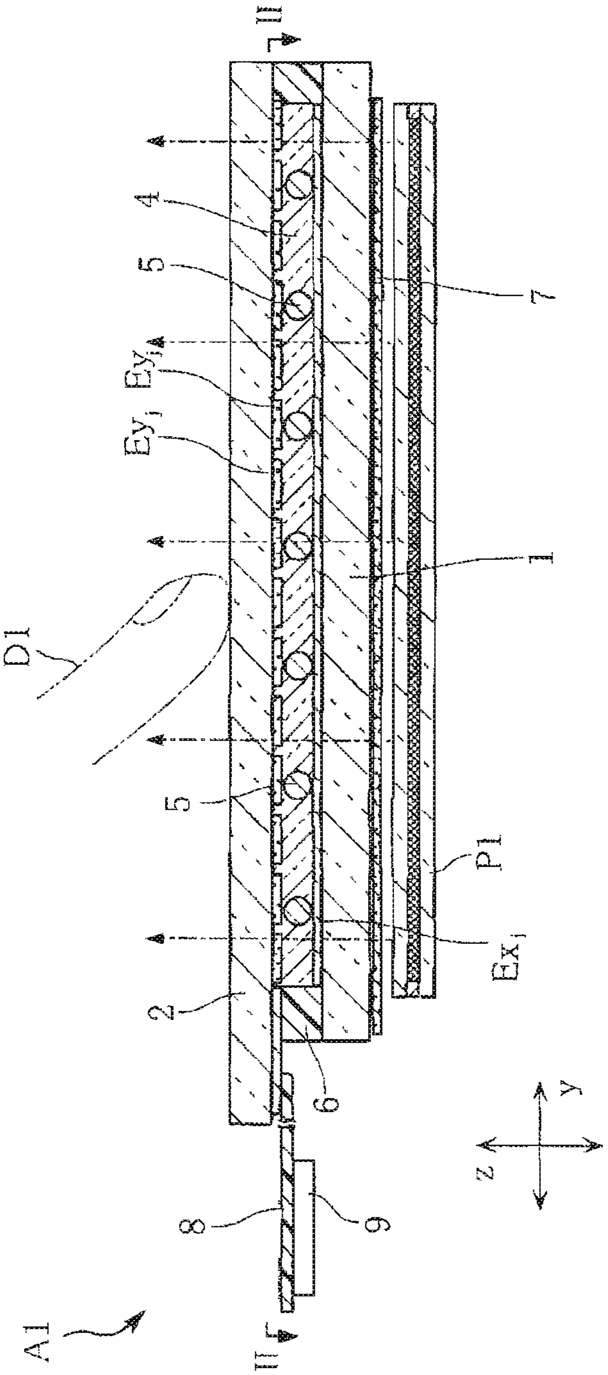
FIG. 1 is a cross-sectional view of an input device according to a first embodiment of the present invention.
Figure 2:
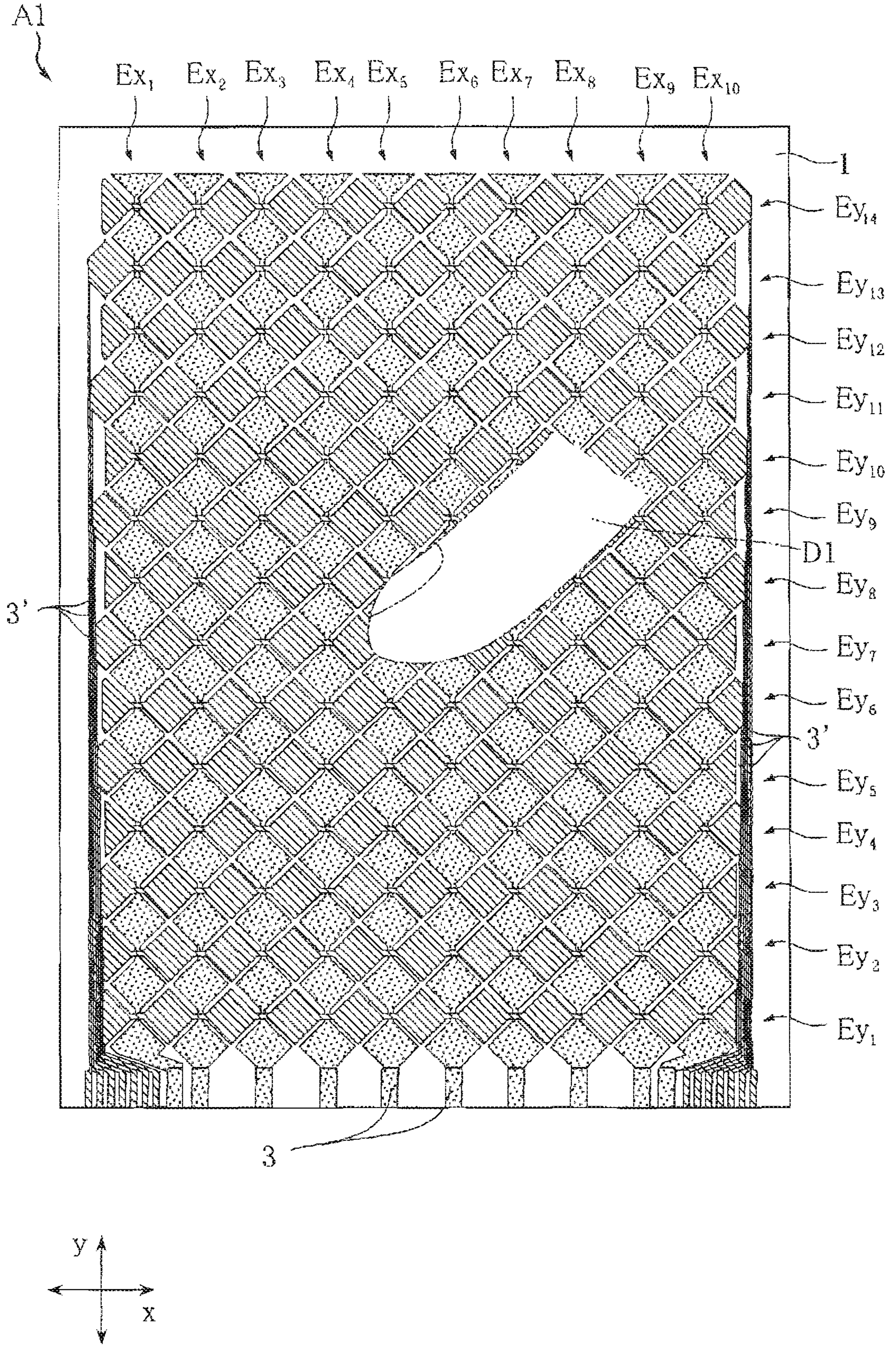
FIG. 2 is an overhead view of essential portions of the input device of FIG. 1 taken along line II-II in FIG. 1.
Figure 3:
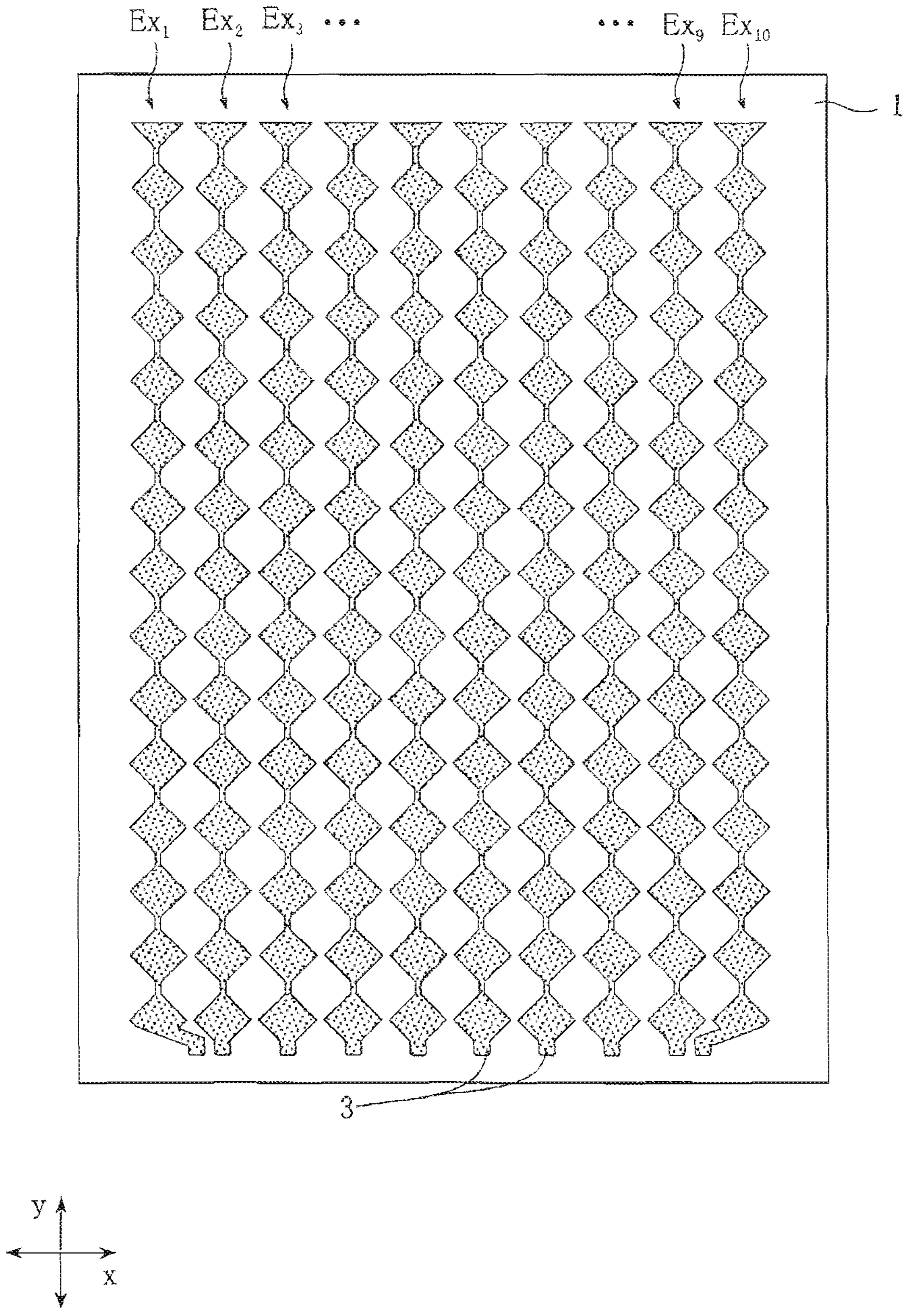
FIG. 3 is an overhead view mainly showing first detection electrodes of the input device shown in FIG. 2.
Figure 4:
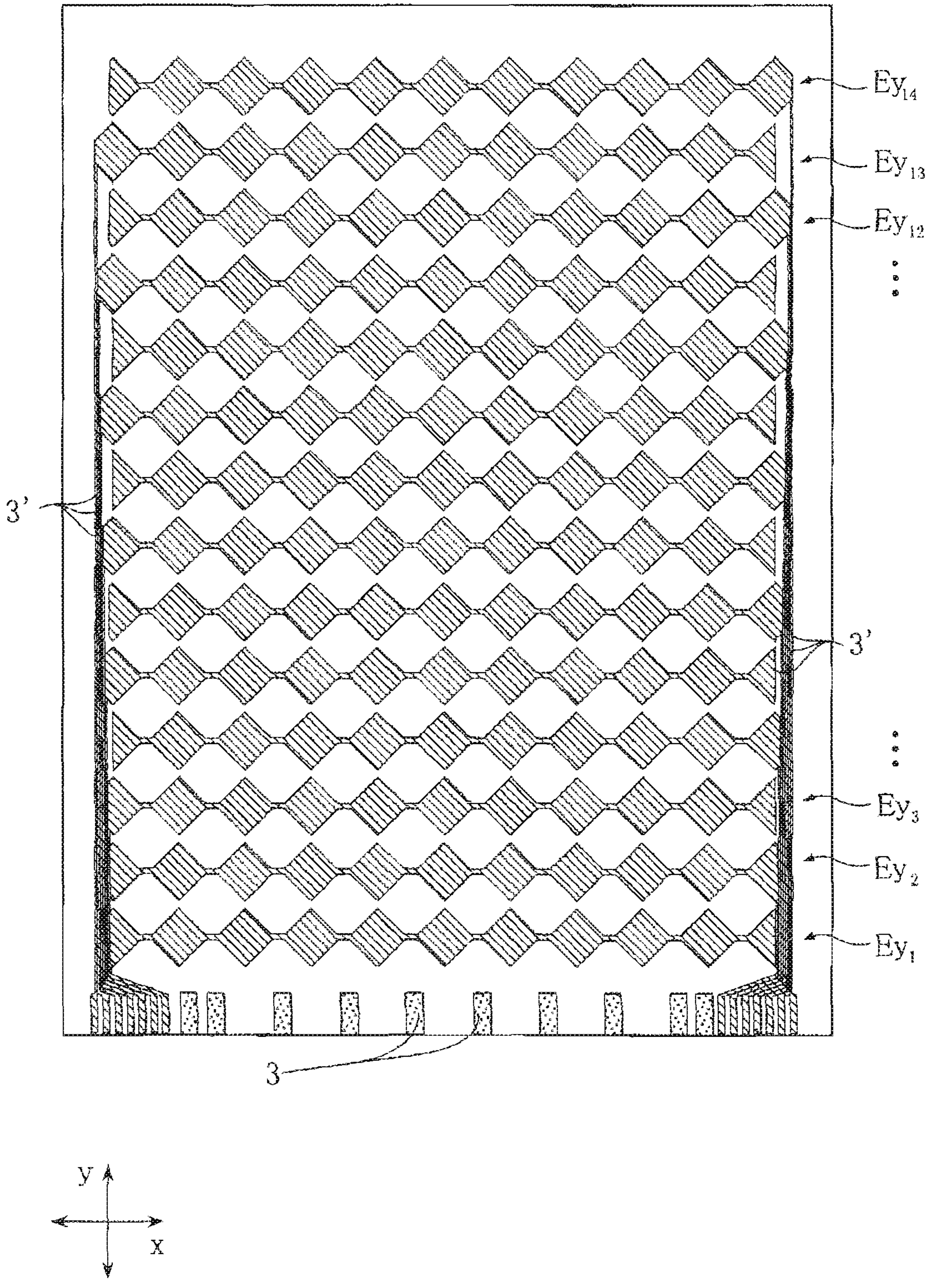
FIG. 4 is an overhead view mainly showing second detection electrodes of the input device shown in FIG. 2.

FIGS. 1 and 2 indicate an input device A1 according to a first embodiment of the present invention. The input device A1 shown in these drawings is provided with transmission plates 1 and 2, a plurality of first detection electrodes $Ex_i$ (where, i=1, 2, . . . , n) for detecting position in the x direction, a plurality of second detection electrodes $Ey_j$ (where, j=1, 2, . . . , m) for detecting position in the y direction, wiring 3 and 3', a resin layer 4, a spacer 5, an anisotropic electrically conductive resin portion 6, a shielding layer 7, a flexible substrate 8, and an IC chip 9. In FIG. 1, the wiring 3 and 3' is omitted. In FIG. 2, the transmission plate 2, the resin layer 4, the spacer 5, the anisotropic electrically conductive resin portion 6, the shielding layer 7, the flexible substrate 8 and the IC chip 9 are omitted. The input device A1 is composed so as to be able to detect an approach position of a conductor D1. The input device A1 composes, for example, a touch panel device arranged on the side of an image display surface of a liquid crystal touch panel P1. FIG. 3 is an overhead view mainly showing the first detection electrodes $Ex_i$ shown in FIG. 2. FIG. 4 is an overhead view mainly showing the second detection electrodes $Ey_j$ shown in FIG. 2.

The transmission plates 1 and 2 are respectively transparent resin substrates or transparent glass substrates. Examples of materials of transparent resin substrates include polyethylene terephthalate (PET), polyethylene naphthalate (PEN) and polycarbonate (PC).

The plurality of first detection electrodes $Ex_i$ (where, i=1, 2, . . . , n) for detecting position in the x direction is formed in a pattern on the upper surface in FIG. 1 of the transmission plate 1. The plurality of first detection electrodes $Ex_i$ is respectively mutually parallel extending in the y direction, and is arranged while mutually separated in the x direction (that intersects with the y direction). In the present embodiment, the number of the first detection electrodes $Ex_i$ is 10 (namely, n=10). Each first detection electrode $Ex_i$ is composed of a transparent electrically conductive material such as ITO or IZO. As shown in FIG. 3, each first detection electrode $Ex_i$ has a plurality of diamond-shaped portions and a linear portion that connects the diamond-shaped portions. The shape of the diamond-shaped portions may be round, polygonal or of another shape.

The plurality of second detection electrodes $Ey_j$ (where, j=1, 2, . . . , m) for detecting position in the y direction is formed in a pattern on the lower surface in the drawing of the transmission plate 2. The plurality of second detection electrodes $Ey_j$ is respectively mutually parallel extending in the x direction, and is arranged mutually separated in the y direction. In the present embodiment, the number of the second detection electrodes $Ey_j$ is 14 (namely, m=14). Each second detection electrode $Ey_j$ is composed of a transparent electrically conductive material such as ITO or IZO. As shown in FIG. 4, each second detection electrode $Ey_j$ has a plurality of diamond-shaped portions and a linear portion that connects the diamond-shaped portions. The shape of the diamond-shaped portions may be round, polygonal or of another shape. The diamond-shaped portions of the second detection electrodes $Ey_j$ are arranged so as not to overlap with the diamond-shaped portions of the first detection electrodes $Ex_i$ in the x direction and the y direction.

A portion of each wiring 3 is formed into a pattern on the transmission plate 1. Another portion of each wiring 3 is formed into a pattern extending over the transmission plate 2 and the flexible substrate 8. The portion of each wiring 3 on the transmission plate 1 and the portion of each wiring 3 on the transmission plate 2 corresponding to the portion of each wiring 3 on the transmission plate 1 are electrically connected through the anisotropic electrically conductive resin portion 6 while ensuring an electrically insulated state between the portions of each wiring 3 on the transmission plate 1 and while maintaining an electrically insulated state between the portions of each wiring 3 on the transmission plate 2. The anisotropic electrically conductive resin portion 6 is composed of a cured anisotropic electrically conductive resin. Each wiring 3 is connected to one of the first detection electrodes $Ex_i$ on the transmission plate 1.

The wiring 3' is formed into a pattern extending over the transmission plate 2 and the flexible substrate 8, and is connected to one of the second detection electrodes $Ey_j$ on the transmission plate 2.

As shown in FIG. 1, the resin layer 4 and the spacer 5 are interposed between the transmission plates 1 and 2. The resin layer 4 is composed of a resin material that easily allows transmission of light. An electrically insulated state is maintained between the first detection electrodes $Ex_i$, the second detection electrodes $Ey_j$ and between the first detection electrodes $Ex_i$ and the second detection electrodes $Ey_j$ by the resin layer 4. The spacer 5 consists of granules composed of silica or acrylic resin (for example, a member of the Micropearl Series, Sekisui Chemical Co., Ltd.). A suitable distance can be secured between the transmission plates 1 and 2 by suitably selecting the size of the spacer 5.

The shielding layer 7 is provided on the lower surface in FIG. 1 of the transmission plate 1. The shielding layer 7 is composed of a transparent electrically conductive material such as ITO or IZO. The shielding layer 7 is covered by a clear protective layer (not shown). The shielding layer 7 fulfills the role of blocking external noise.

As shown in FIG. 1, the flexible substrate 8 is attached to an end portion of the transmission plate 2. As has been previously described, a portion of the wiring 3 and a portion of the wiring 3' are also provided on the flexible substrate 8.

The IC chip 9 is installed on the flexible substrate 8. The IC chip 9 fulfills the function of controlling the driving state of the input device A1 or calculating approach positions of the conductor D1. The IC chip 9 is connected to each of the first detection electrodes $Ex_i$ and each of the second detection electrodes $Ey_j$ through input terminals not shown.

Figure 5:
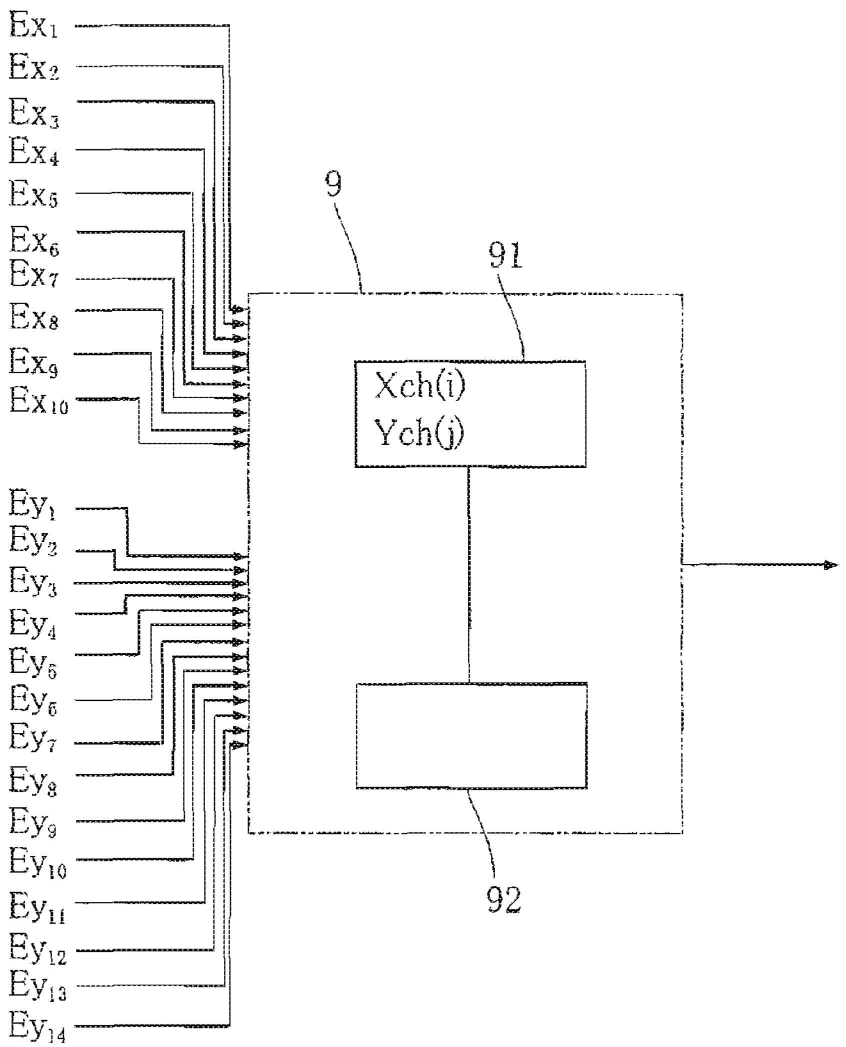
FIG. 5 is a functional block diagram of an IC chip of the present embodiment.

FIG. 5 shows a functional block diagram of the IC chip 9. As shown in this drawing, the IC chip 9 includes a storage unit 91 and a calculation unit 92.

The storage unit 91 stores data during calculations by the calculation unit 92. In the present embodiment, the storage unit 91 respectively stores values obtained through each of the first detection electrodes $Ex_i$ as first direction detection values Xch(i) (where, i=1, 2, . . . , n) accompanying a change in electrostatic capacitance between the conductor D1 such as a finger and each of the first detection electrodes $Ex_i$. Similarly, the storage unit 91 respectively stores values obtained through each of the second detection electrodes $Ey_j$ as second direction detection values Ych(j) (where, j=1, 2, . . . , m) accompanying a change in electrostatic capacitance between the conductor D1 and each of the second detection electrodes $Ey_j$.

The calculation unit 92 calculates approach positions of the conductor D1 in the x direction and the y direction. The calculation unit 92 carries out calculations while transmitting and receiving data to and from the storage unit 91.

Figure 6:
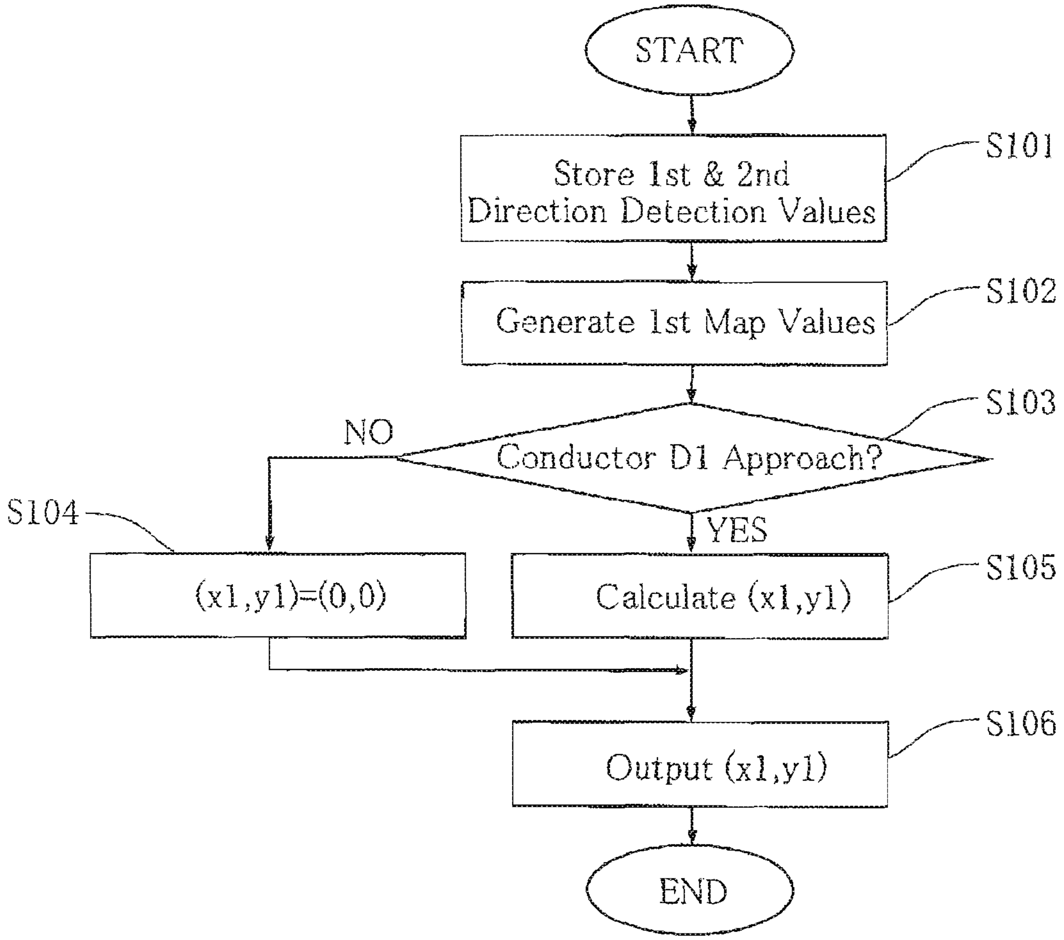
FIG. 6 is a flow chart showing the flow of processing in the present embodiment.

Next, an explanation is provided of an example of a method for calculating approach positions of the conductor D1 in the present embodiment using FIGS. 6 to 16. FIG. 6 is a flow chart showing the flow of processing in the present embodiment. In the present embodiment, a method is explained for calculating a first approached coordinate (x1,y1) that represents an approach position of the conductor D1 when the conductor D1 has approached the transmission plate 2.

<Storage of First Direction Detection Values and Second Direction Detection Values (S101)>

First, as shown in FIG. 6, the first direction detection values and the second direction detection values are stored in the storage unit 91. When the input device A1 operates, a signal corresponding to a change in electrostatic capacitance that can occur between the conductor D1 and each of the first detection electrodes $Ex_i$ is sent to the IC chip 9 from each of the first detection electrodes $Ex_i$. When the IC chip 9 receives this signal, the storage unit 91 respectively stores values obtained through each of the first detection electrodes $Ex_i$ and a circuit not shown in the IC chip 9 as the first direction detection values Xch(i) (where, i=1, 2, . . . , n) accompanying a change in electrostatic capacitance between the conductor D1 and each of the first detection electrodes $Ex_i$ as previously described. Similarly, a signal corresponding to a change in electrostatic capacitance that can occur between the conductor D1 and each of the second detection electrodes $Ey_j$ is sent to the IC chip 9 from each of the second detection electrodes $Ey_j$. When the IC chip 9 has received this signal, the storage unit 91 respectively stores values obtained through each of the second detection electrodes $Ey_j$ and a circuit not shown in the IC chip 9 as the second direction detection values Ych(j) (where, j=1, 2, . . . , m) accompanying a change in electrostatic capacitance between the conductor D1 and each of the second detection electrodes $Ey_j$ as previously described.

Figure 7:
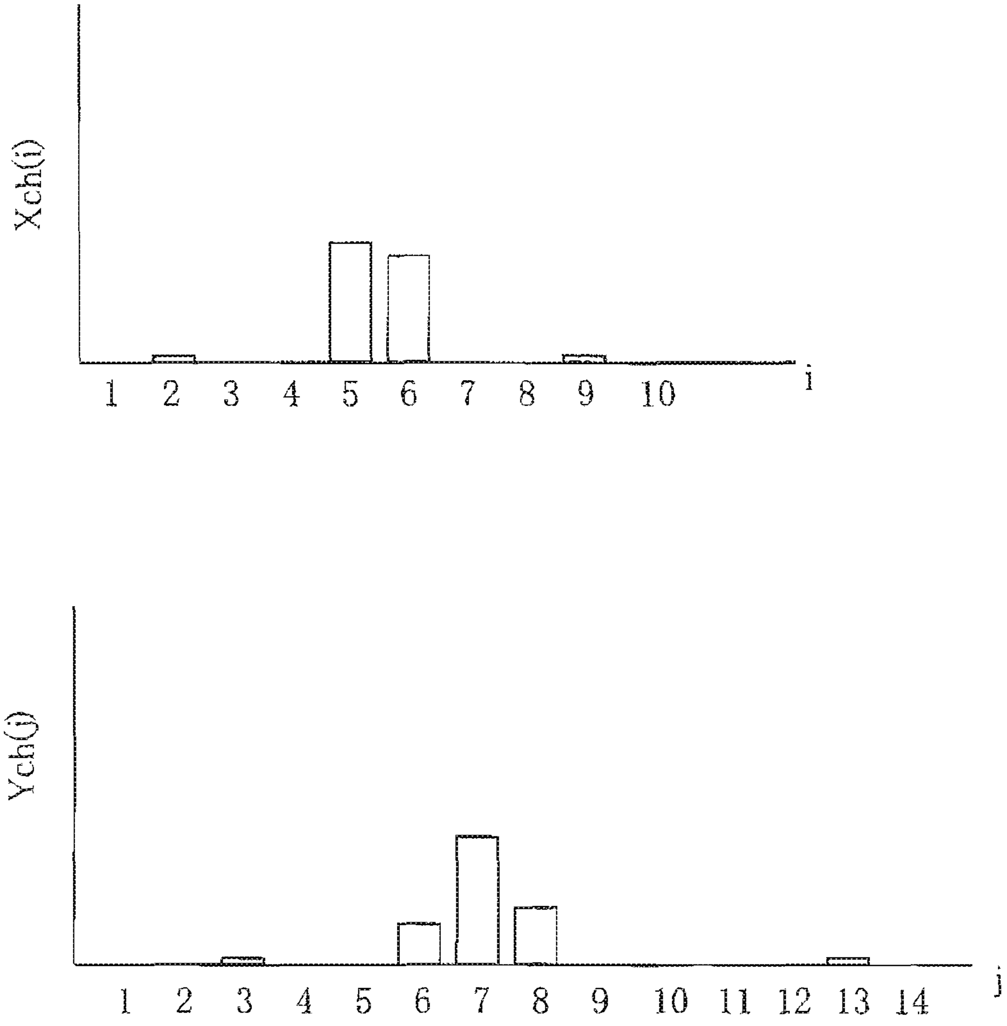
FIG. 7 is a graph showing an example of each of first direction detection values and second direction detection values.
Figure 8:
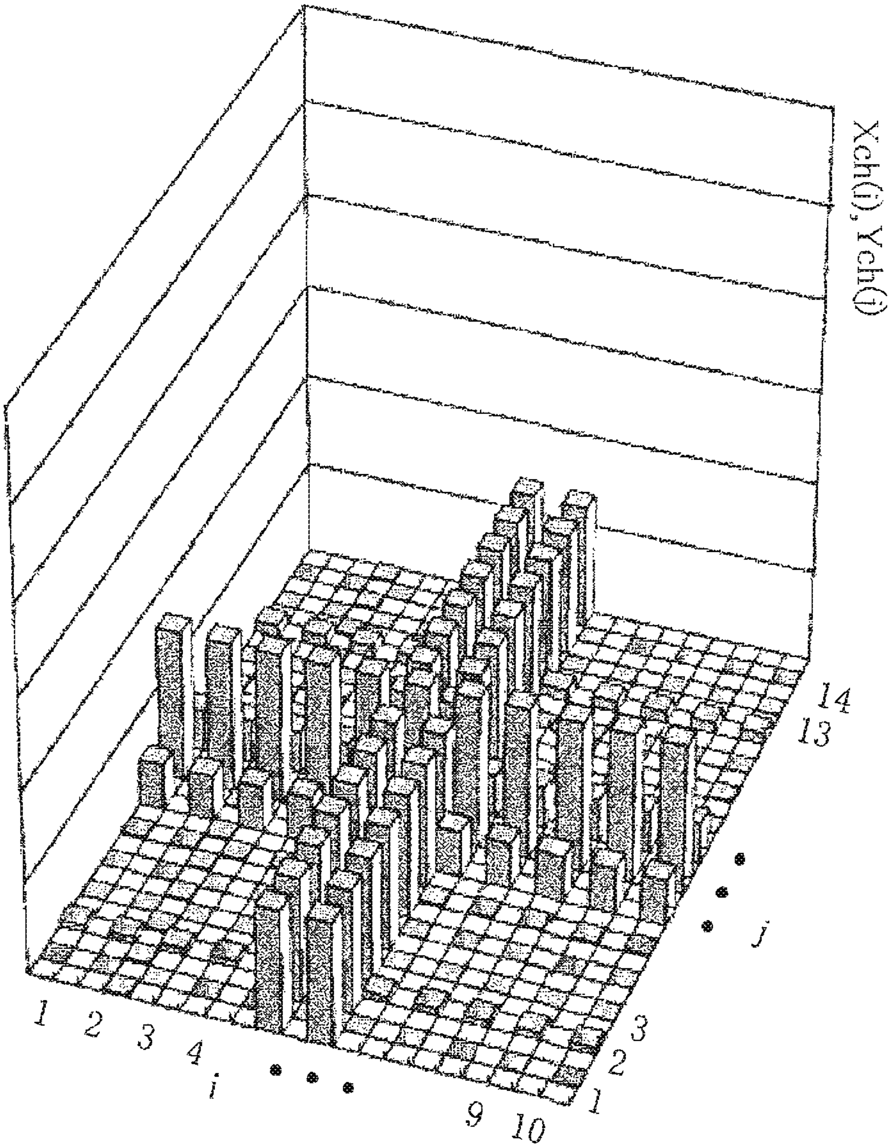
FIG. 8 is a graph of a three-dimensional representation of each of the values shown in FIG. 7.

FIG. 7 shows an example of each of the first direction detection values Xch(i) and the second direction detection values Ych(j) in the case the conductor D1 has approached the position shown in FIG. 2. FIG. 8 indicates a bar graph showing a three-dimensional representation of each value for each of the first direction detection values Xch(i) and each of the second direction detection values Ych(j) shown in FIG. 7. The electrode among the first detection electrodes $Ex_1$ to $Ex_n$ that has the largest area facing the region of the transmission plate 2 contacted by the conductor D1 shown in FIG. 2 is electrode $Ex_5$, while the electrode having the second largest area facing the contacted region is second detection electrode $Ey_8$ and the electrode having the third largest area facing the contacted region is second detection electrode $Ex_6$. The electrode among the second detection electrodes $Ey_1$ to $Ey_m$ that has the largest area facing the contacted region is second detection electrode $Ey_7$, while the electrode having the second largest area facing the contacted region is second detection electrode $Ey_8$. In FIG. 7, each of the values of the first direction detection values Xch(i) and the second direction detection values Ych(j) are represented as respectively corresponding to surfaces areas where the first detection electrodes $Ex_i$ and the second detection electrodes $Ey_j$ oppose the region of the transmission plate 2 contacted by the conductor D1. Furthermore, the reason why Xch(2), Xch(9), Ych(3) and Ych(13) slightly indicate values in FIG. 7 is due to the effects of noise.

<Generation of First Map Values (S102)>

Figure 14:
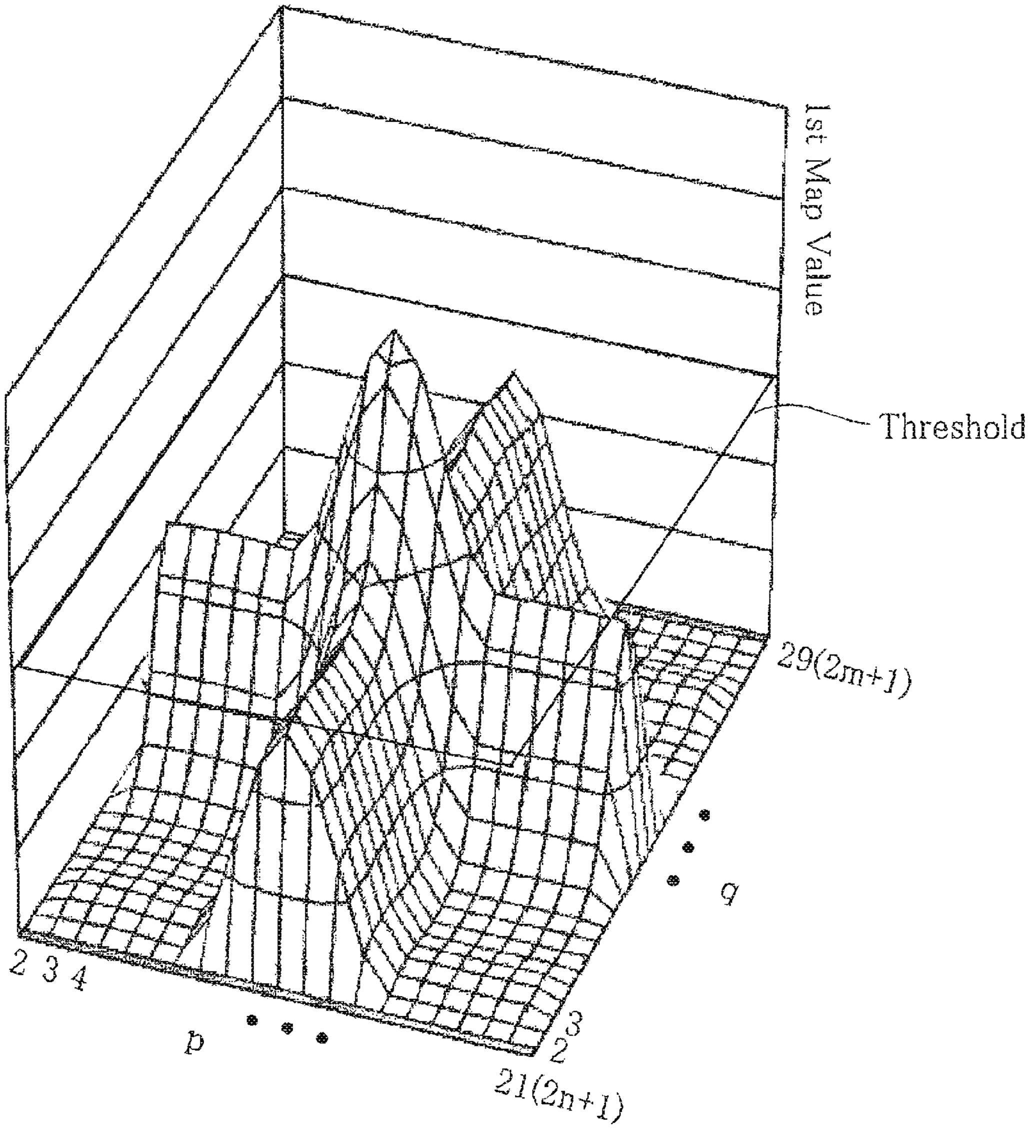
FIG. 14 is a drawing showing a three-dimensional representation of first map values of a first embodiment.

Next, a plurality of first map values is generated using the first direction detection values Xch(i) and the second direction detection values Ych(j). FIG. 14 shows a three-dimensional representation of the first map values. More specifically, the first map values are generated in the manner described below. Each first map value is a value obtained by arithmetic processing of a first value obtained by arithmetic processing of at least any of the first direction detection values Xch(i) and a second value obtained by arithmetic processing of at least any of the second direction detection values Ych(j).

The first map values have a positive correlation with each of the first direction detection values Xch(i) used to determine the first map values. Namely, if a value other than a specific first direction detection value Xch(i) among the first direction detection values Xch(i) used to determine that first map value, and a value of the second direction detection value Ych(j) used to determine that first map value are the same, then the value of the first map value becomes larger the larger the value of that specific first direction detection value Xch(i). The first map values have a positive correlation with each of the second direction detection values Ych(j) used to determine the first map values. Namely, if the first direction detection value Xch(i) used to determine that first map value, and a value other than a specific second direction detection value Ych(j) among the second direction detection values Ych(j) used to determine that first map value are the same, then the value of the first map value becomes larger the larger the value of that specific second direction detection value Ych(j).

The number of the first map values generated can be freely determined according to combinations of any of the plurality of first direction detection values Xch(i) and any of the plurality of second direction detection values Ych(j).

The following indicates an example of generating 2n×2m first map values.

Figure 9:
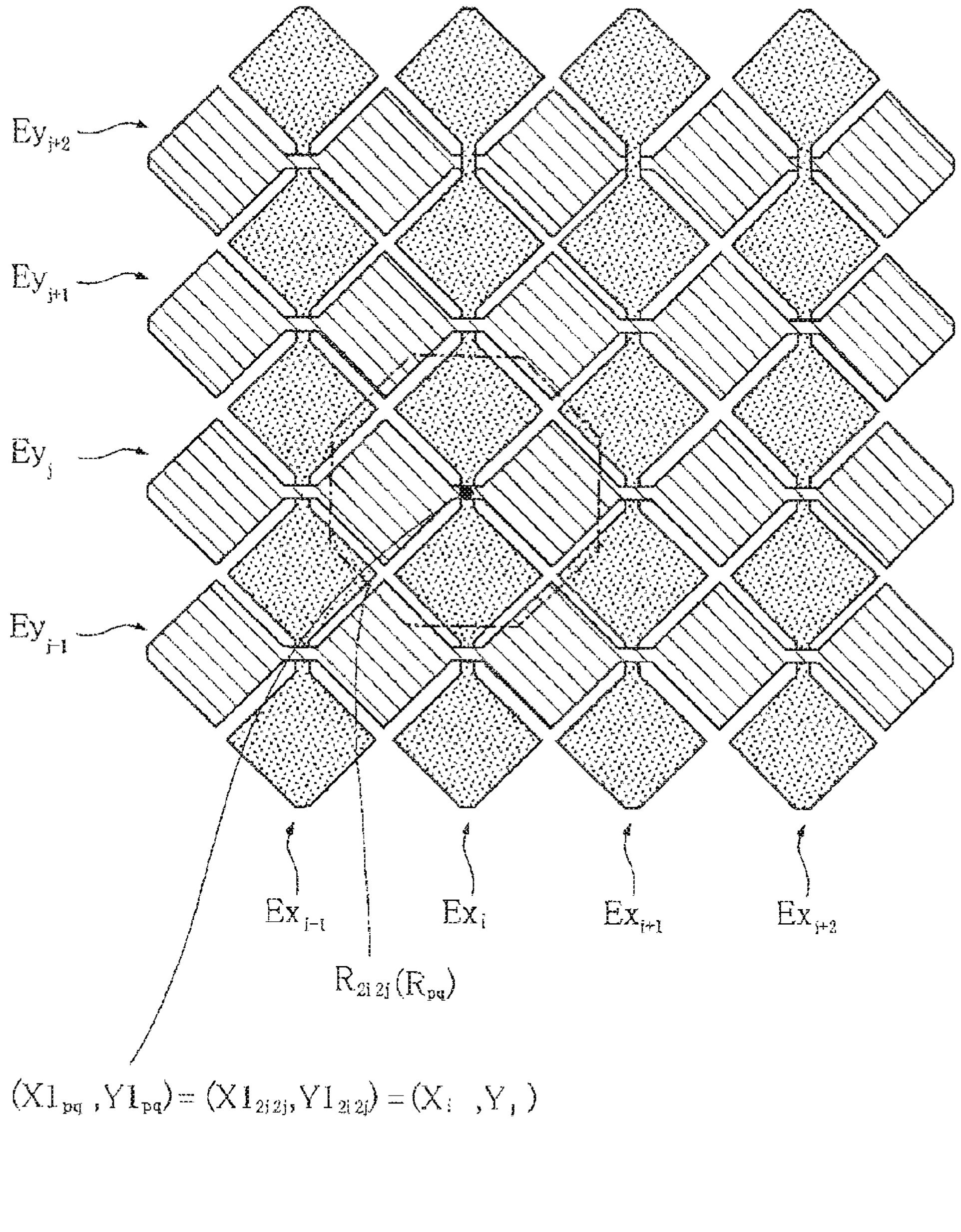
FIG. 9 is an enlarged overhead view of the input device shown in FIG. 2.

FIG. 9 is an enlarged overhead view of the input device A1 shown in FIG. 2.

Each first map value map1(p,q) is correlated with a certain two-dimensional coordinate, and that two-dimensional coordinate ($X1_{pq}$,$Y1_{pq}$) is a barycentric coordinate of a region $R_{pq}$ of a prescribed area shown in FIG. 9 and the like. The shape of the region $R_{pq}$ may be of any shape. In the present embodiment, the region $R_{pq}$ has an area of 4 of the diamond-shaped portions of each first detection electrode $Ex_i$. The first map value map1(p,q) is defined as follows:

$$\mathrm{map1}(p,q)=Vx(p,q)+Vy(p,q) \quad (1)$$

Vx(p,q) is a first value, and is represented as follows:

$$Vx(p,q)=\Sigma S_k \cdot Xch(k) \quad (2)$$

Here, $S_k$ is the area of the region where the region $R_{pq}$ and a first detection electrode $Ex_k$ overlap (where, k=1, 2, . . . , n). Namely, the first value Vx(p,q) is a value obtained by weighting the area where the region $R_{pq}$ and the first detection electrode $Ex_k$ overlap and adding the first direction detection value Xch(i).

Similarly, Vy(p,q) is a second value, and is represented by the following:

$$Vy(p,q)=\Sigma T_k \cdot Ych(k) \quad (3)$$

Here, similar to $S_k$, $T_k$ is the area of the region where the region $R_{pq}$ and a second detection electrode $Ey_k$ overlap (where, k=1, 2, . . . , m). Namely, the second value Vy(p,q) is a value obtained by weighting each of the areas of the regions where the region $R_{pq}$ and the second detection electrode $Ey_k$ overlap, and adding each second direction detection value Ych(j).

Consequently, the first map value map1(p,q) can be said to be the sum of a value obtained by weighting each of the areas of the regions where the region $R_{pq}$ and the first detection electrode $Ex_k$ overlap and adding each first direction detection value Xch(i), and a value obtained by weighting each of the areas of the regions where the region $R_{pq}$ and the second detection electrode $Ey_k$ overlap and adding each second direction detection value Ych(j).

In the present embodiment, in the four cases in which the first map value map1(p,q) is:

(p,q)=(2*i*,2*j*) (case 1, see FIG. 9), (p,q)=(2*i*+1,2*j*) (case 2, see FIG. 10), (p,q)=(2*i*, 2*j*+1) (case 3, see FIG. 11), or (p,q)=(2*i*+1,2*j*+1) (case 4, see FIG. 12), (where, i=1, 2, . . . , n, and j=1, 2, . . . , m), the parameters used during determination differ. The following provides a detailed explanation of this.

<Case 1>

The following provides an explanation of case 1 using FIG. 9. As shown in the drawing, the two-dimensional coordinate ($X1_{pq}$,$Y1_{pq}$) is represented as follows:

$$\begin{aligned}(X1_{pq}, Y1_{pq}) &= (X1_{2i}, Y1_{2j}) \\ &= (X_i, Y_j)\end{aligned} \quad (4\text{-}1)$$

$X_i$ is a central position of the first detection electrodes $Ex_i$ in the x direction. Similarly, $Y_j$ is a central position of the second detection electrodes $Ey_j$ in the y direction.

In case 1, formula (2) is represented as follows:

$$\begin{aligned}Vx(p,q) &= Vx(2i,2j) \\ &= S_{i-1}Xch(i-1)+S_iXch(i)+S_{i+1}Xch(i+1) \\ &= 0.3Xch(i-1)+1.4Xch(i)+0.3Xch(i+1)\end{aligned} \quad (2\text{-}1)$$

$S_{i-1}$, $S_i$ and $S_{i+1}$ are defined as $S_{i-1}$=0.3, $S_i$=1.4 and $S_{i+1}$=0.3 based on a value of 1 for the area of a single diamond-shaped electrode included in the first detection electrodes $Ex_i$. Furthermore, a suitable value (such as 0) is used for those values that do not actually exist, such as Xch(0), Xch(n+1).

Similarly, formula (3) in case 1 is represented as follows:

$$\begin{aligned}Vy(p,q) &= Vy(2i,2j) \\ &= T_{j-1}Ych(j-1)+T_jYch(j)+T_{j+1}Ych(j+1) \\ &= 0.3Ych(j-1)+1.4Ych(j)+0.3Ych(j+1)\end{aligned} \quad (3\text{-}1)$$

$T_{j-1}$, $T_j$ and $T_{j+1}$ are defined as $T_{j-1}$=0.3, $T_j$=1.4 and $T_{j+1}$=0.3 based on a value of 1 for the area of a single diamond-shaped electrode included in the second detection electrodes $Ey_j$. Furthermore, a suitable value (such as 0) is used for those values that do not actually exist, such as Ych(0), Ych(m+1).

In case 1, the first map value map1(p,q) is generated according to formula (1) by determining the first value Vx(p,q) and the second value Vy(p,q).

<Case 2>

Figure 10:
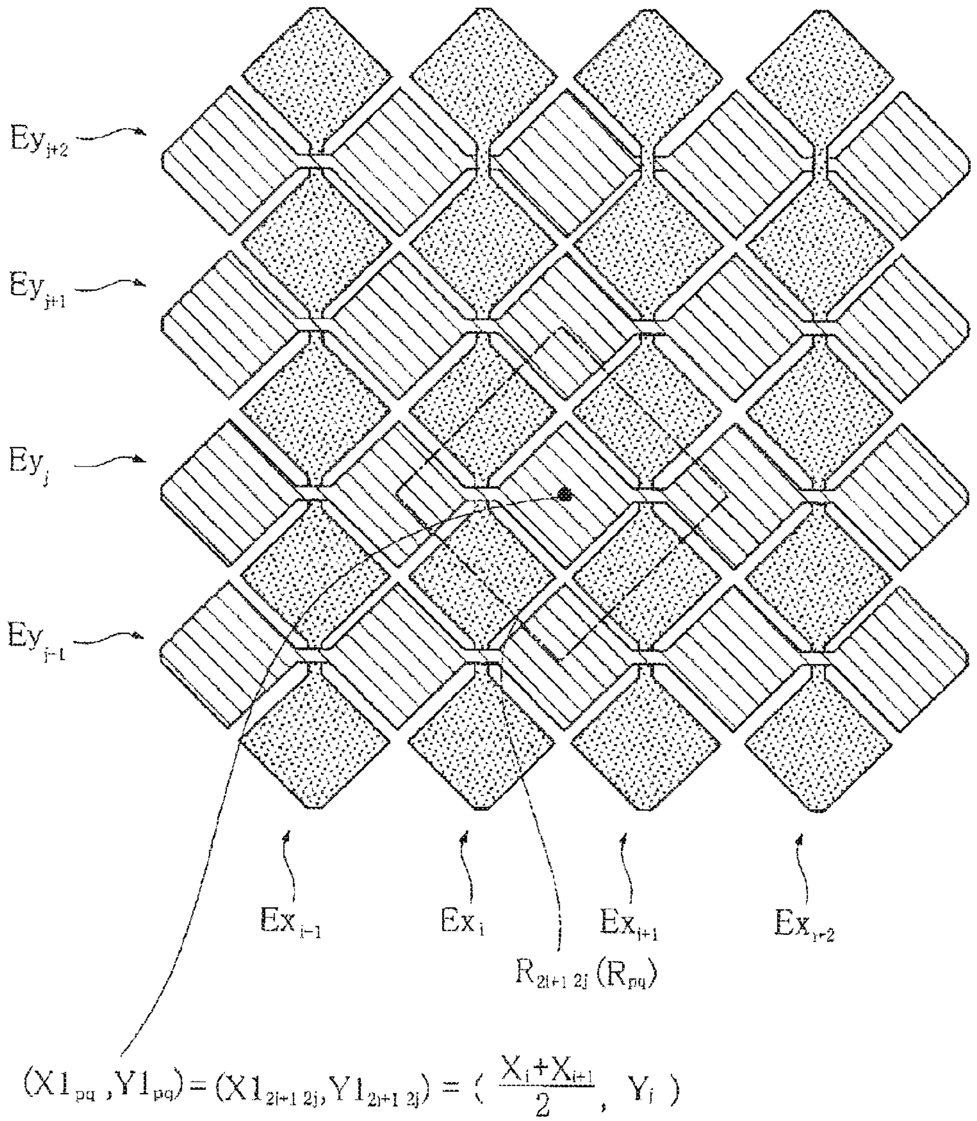
FIG. 10 is a drawing for explaining a case 2 of a first embodiment.

The following provides an explanation of case 2 using FIG. 10. As shown in the drawing, the two-dimensional coordinate ($X1_{pq}$,$Y1_{pq}$) is represented as follows:

$$(X1_{pq}, Y1_{pq}) = (X1_{2i+1}, Y1_{2j}) = ((X_i + X_{i+1})/2, Y_j) \quad (4\text{-}2)$$

$X_{i+1}$ is a central position of the first detection electrodes $Ex_{i+1}$ in the x direction.

In case 2, formula (2) is represented as follows:

$$Vx(p, q) = Vx(2i+1, 2j) = S_i Xch(i) + S_{i+1} Xch(i+1) = 1.0Xch(i) + 1.0Xch(i+1) \quad (2\text{-}2)$$

$S_i$ and $S_{i+1}$ are defined as $S_i$=1.0 and $S_{i+1}$=1.0 based on a value of 1 for the area of a single diamond-shaped electrode included in the first detection electrodes $Ex_i$.

Formula (3) in case 2 is represented as follows:

$$Vy(p, q) = Vy(2i+1, 2j) = T_{j-1} Ych(j-1) + T_j Ych(j) + T_{j+1} Ych(j+1) = 0.3Ych(j-1) + 1.4Ych(j) + 0.3Ych(j+1) \quad (3\text{-}2)$$

In case 2, the first map value map1(p,q) is generated according to formula (1) by determining the first value Vx(p, q) and the second value Vy(p,q).

<Case 3>

Figure 11:
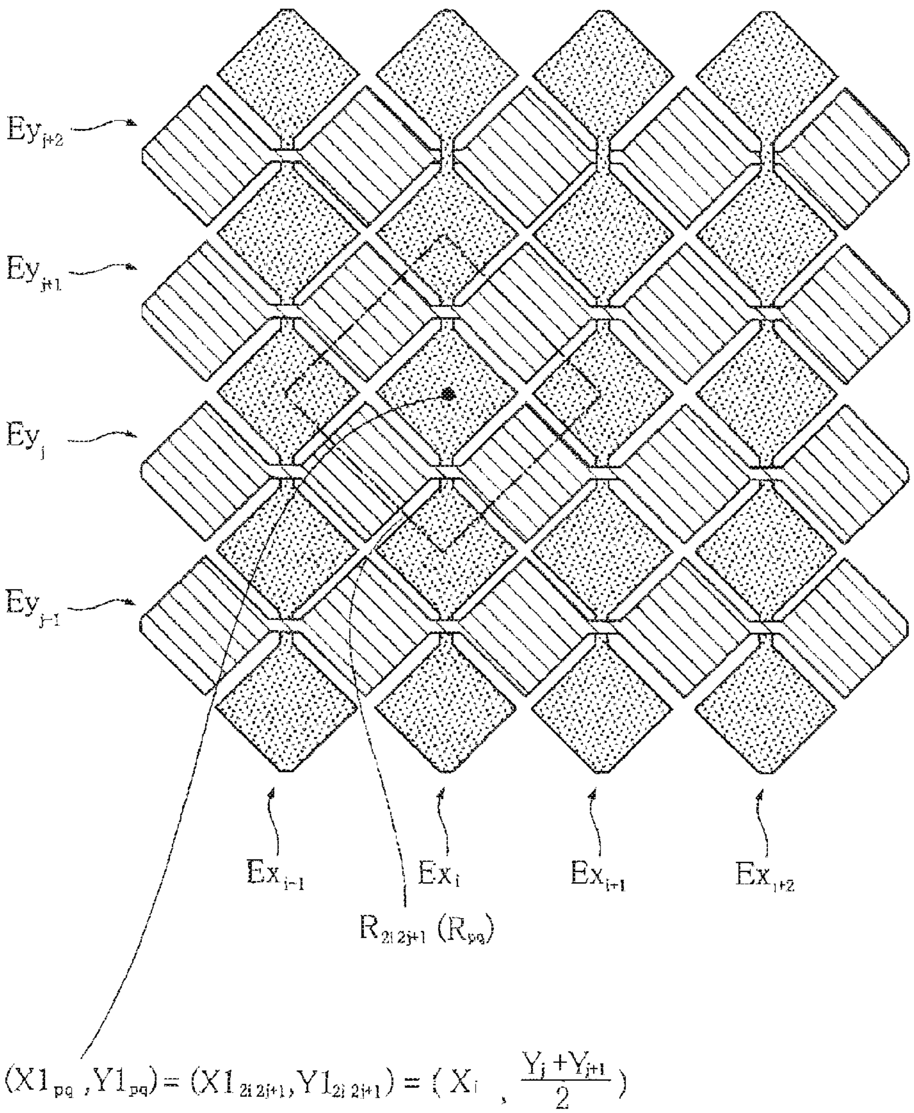
FIG. 11 is a drawing for explaining a case 3 of a first embodiment.

The following provides an explanation of case 3 using FIG. 11. As shown in the drawing, the two-dimensional coordinate ($X\mathbf{1}_{pq}$,$Y\mathbf{1}_{pq}$) is represented as follows:

$$(X1_{pq}, Y1_{pq}) = (X1_{2i}, Y1_{2j+1}) = (X_i, (Y_j + Y_{j+1})/2) \quad (4\text{-}3)$$

$Y_{i+1}$ is a central position of the second detection electrodes $Ey_j$ in the y direction.

In case 3, formula (2) is represented as follows in the same manner as case 1:

$$Vx(p, q) = Vx(2i, 2j+1) = S_{i-1} Xch(i-1) + S_i Xch(i) + S_{i+1} Xch(i+1) = 0.3Xch(i-1) + 1.4Xch(i) + 0.3Xch(i+1) \quad (2\text{-}3)$$

Formula (3) in case 3 is represented as follows:

$$Vy(p, q) = Vy(2i, 2j+1) = T_j Ych(j) + T_{j+1} Ych(j+1) = 1.0Ych(j) + 1.0Ych(j+1) \quad (3\text{-}3)$$

$T_j$ and $T_{j+1}$ are defined as $T_j$=1.0 and $T_{j+1}$=1.0 based on a value of 1 for the area of a single diamond-shaped electrode included in the second detection electrodes $Ey_j$.

In case 3, the first map value map1(p,q) is generated according to formula (1) by determining the first value Vx(p, q) and the second value Vy(p,q).

<Case 4>

Figure 12:
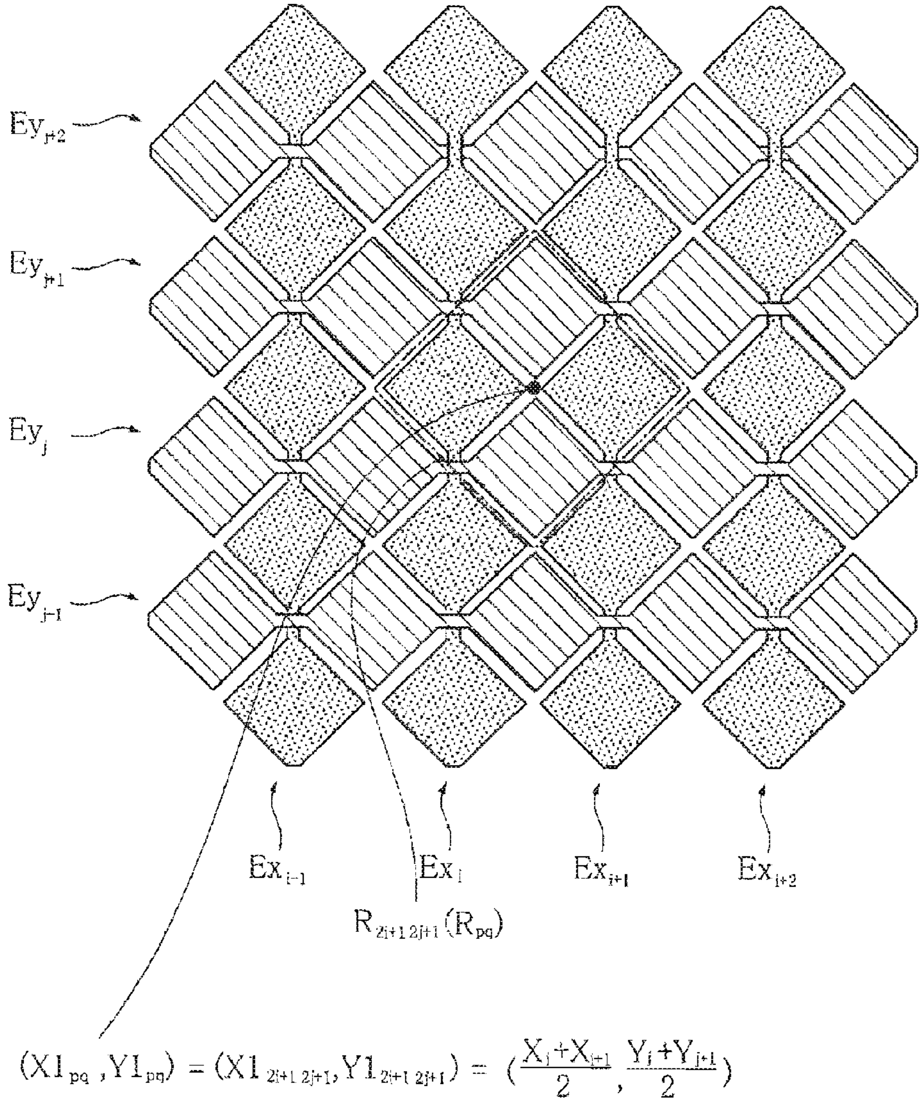
FIG. 12 is a drawing for explaining a case 4 of a first embodiment.
Figure 13:
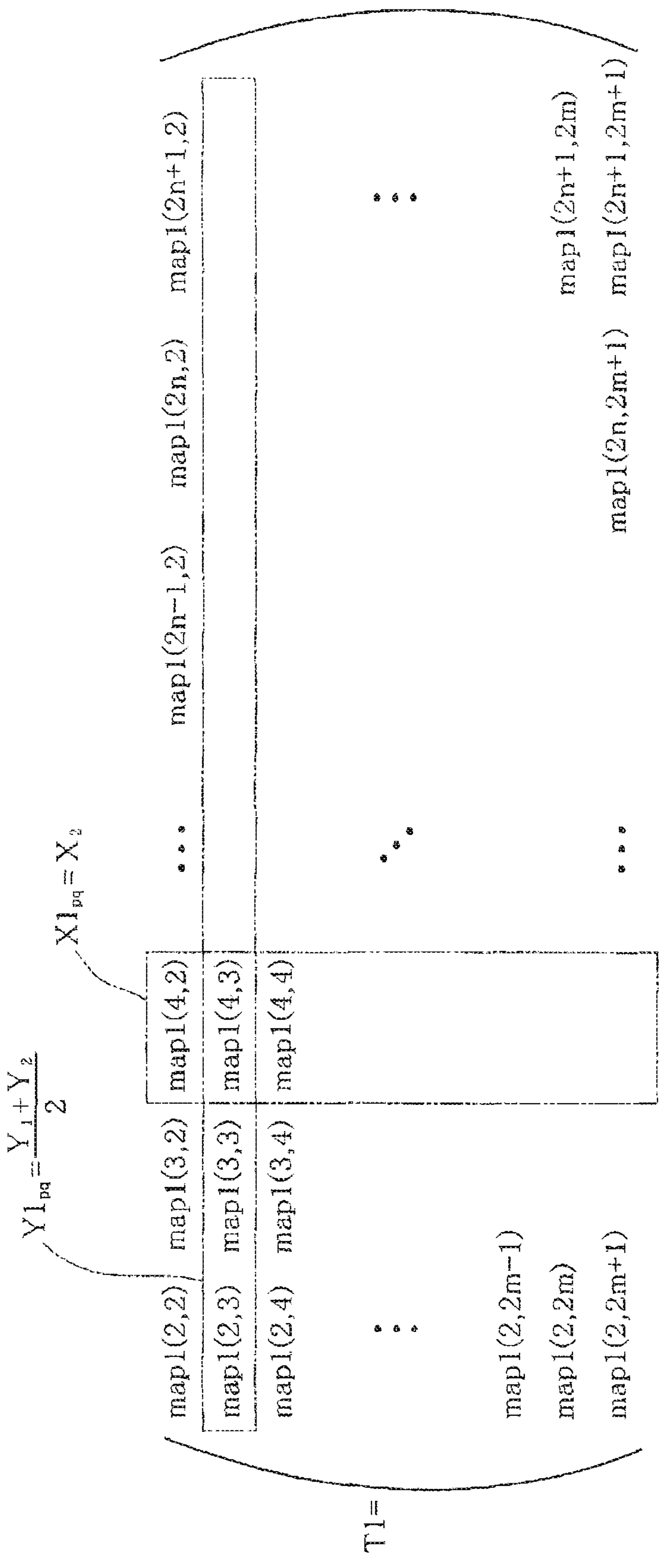
FIG. 13 is a drawing for explaining a matrix of a first embodiment having first map values as elements thereof.

The following provides an explanation of case 4 using FIG. 12. As shown in the drawing, the two-dimensional coordinate ($X\mathbf{1}_{pq}$,$Y\mathbf{1}_{pq}$) is represented as follows:

$$(X1_{pq}, Y1_{pq}) = (X1_{2i+1}, Y1_{2j+1}) = ((X_i + X_{i+1})/2, (Y_j + Y_{j+1})/2) \quad (4\text{-}4)$$

In case 4, formula (2) is represented as follows in the same manner as case 2:

$$Vx(p, q) = Vx(2i+1, 2j+1) = S_i Xch(i) + S_{i+1} Xch(i+1) = 1.0Xch(i) + 1.0Xch(i+1) \quad (2\text{-}4)$$

Formula (3) in case 4 is represented as follows in the same manner as case 3:

$$Vy(p, q) = Vy(2i+1, 2j+1) = T_j Ych(j) + T_{j+1} Ych(j+1) = 1.0Ych(j) + 1.0Ych(j+1) \quad (3\text{-}4)$$

In case 4, the first map value map1(p,q) is generated according to formula (1) by determining the first value Vx(p, q) and the second value Vy(p,q).

A plurality of first map values map1(p,q) can be generated by calculating cases 1 to 4 described above.

When considering that i=1, 2, . . . , n, p represents 2n integers from 2 to 2n+1. On the other hand, when considering that j=1, 2, . . . , m, q represents 2m integers from 2 to 2m+1. Therefore, the first map value map1(p,q) can be considered to be an element of a 2n×2m matrix T1. Here, an element $\alpha_{rs}$ of the matrix T1 is defined as follows (see FIG. 13):

$$\alpha_{rs} = \mathrm{map1}(r+1, s+1) \quad (5)$$

(where, r=1, 2, . . . , 2n and s=1, 2, . . . , 2m).

It can be understood from formulas (4-1), (4-2), (4-3) and (4-4) that if the values of p in a plurality of first map values map1(p,q) are mutually the same, then the values of the two-dimensional coordinate $X\mathbf{1}_{pq}$ correlated with these first map values map1(p,q) are the same. Consequently, if row numbers in the matrix T1 are the same, then the values of the two-dimensional coordinate $X\mathbf{1}_{pq}$ correlated with a matrix element (first map value map1(p,q)) are the same. For example, component p of the third row of the matrix T1 is 4, and $X\mathbf{1}_{pq}=X_2$ according to formulas (4-1) and (4-3).

Similarly, it can be understood that if the values of q in a plurality of the first map values map1(p,q) are mutually the same, then the values of the two-dimensional coordinate $Y\mathbf{1}_{pq}$ correlated with these first map values map1(p,q) are the same. Consequently, if column numbers in the matrix T1 are the same, then the values of the two-dimensional coordinate $Y\mathbf{1}_{pq}$ correlated with a matrix element (first map value map1(p,q)) are the same. For example, component q of the second column of the matrix T1 is 3, and $Y\mathbf{1}_{pq}=(Y_1+Y_2)/2$ according to formulas (4-3) and (4-4).

According to formulas (4-1), (4-2), (4-3) and (4-4), as the value of p becomes larger, the value of $X\mathbf{1}_{pq}$ also becomes larger, and as the value of q becomes larger, the value of $Y\mathbf{1}_{pq}$ also becomes larger. Consequently, in the matrix T1, as a row number increases, the values of the two-dimensional coordinate $X1_{pq}$ respectively correlated with a component of that row (first map value map1(p,q)) increases monotonously. Similarly, in the matrix T1, as a column number increases, the value of the two-dimensional coordinate $Y1_{pq}$ correlated to a component of that column (first map value map1(p,q)) increases monotonously.

FIG. 14 shows a three-dimensional representation of first map values map1(p,q) that enables the first map values map1 (p,q) to be perceived visually. The direction of height in the drawing corresponds to the value of the first map value. The largest value among the first map values map1(p,q) is determined using the first detection electrodes $Ex_i$ and the second detection electrodes $Ey_j$ that have been approached by the conductor D1. Consequently, the two-dimensional coordinate correlated to the largest value among the first map values map1(p,q) can be said to be close to the position where the conductor D1 has approached.

<Determination of Approach of Conductor D1 (S103)>

Next, an explanation is provided of the step (S103) for determining whether or not the conductor D1 has approached the plurality of first detection electrodes $Ex_i$ and the plurality of second detection electrodes $Ey_j$ by using the first map values map1(p,q) generated according to the process described above with reference to FIG. 15. First, a maximum first map value map1(pmax,qmax) is extracted from the first map values map1(p,q) determined in the above-mentioned processing (pmax is the value of p for which the first map value reaches a maximum, while similarly, qmax is the value of q for which the first map value reaches a maximum). Next, the calculation unit 92 determines whether or not the value of this maximum first map value map1(pmax,qmax) is larger than a prescribed threshold value (see FIG. 14). In the case the maximum first map value map1(pmax,qmax) is less than or equal to the prescribed threshold value (NO in S103), the calculation unit 92 determines that the conductor D1 has not approached (S104).

In the case the conductor D1 has been determined to have not approached, the calculation unit 92 outputs a signal indicating that the conductor D1 has not approached (such as a signal indicating that the first approach coordinate (x1,y1) is (0,0)) outside the IC chip 9 (S106).

<Calculation of First Approach Coordinate (x1,y1) (S105)>

On the other hand, in the case the maximum first map value map1(pmax,qmax) is larger than the prescribed threshold value (YES in S103), the calculation unit 92 judges that the conductor D1 has approached. In this case, the calculation unit 92 calculates the value of the first approach coordinate (x1,y1) (S105). The calculation unit 92 may also calculate the value of the first approach coordinate (x1,y1) by using only a portion of the plurality of first map values map1(p,q). In the present embodiment, the maximum first map value map1 (pmax,qmax) and two adjacent first map values map1(pmax−1,u) and map1(pmax+1,u), which differ by one row number from the maximum first map value map1(pmax,qmax) but are mutually contained in the same column, are used to calculate x1 of the first approach coordinate (x1,y1) (here, u=2, 3, . . . , 2m+1). The following provides an explanation of an example of the case in which u=qmax, namely in the case the two adjacent first map values are contained in the same column as the maximum first map value.

Figure 16:
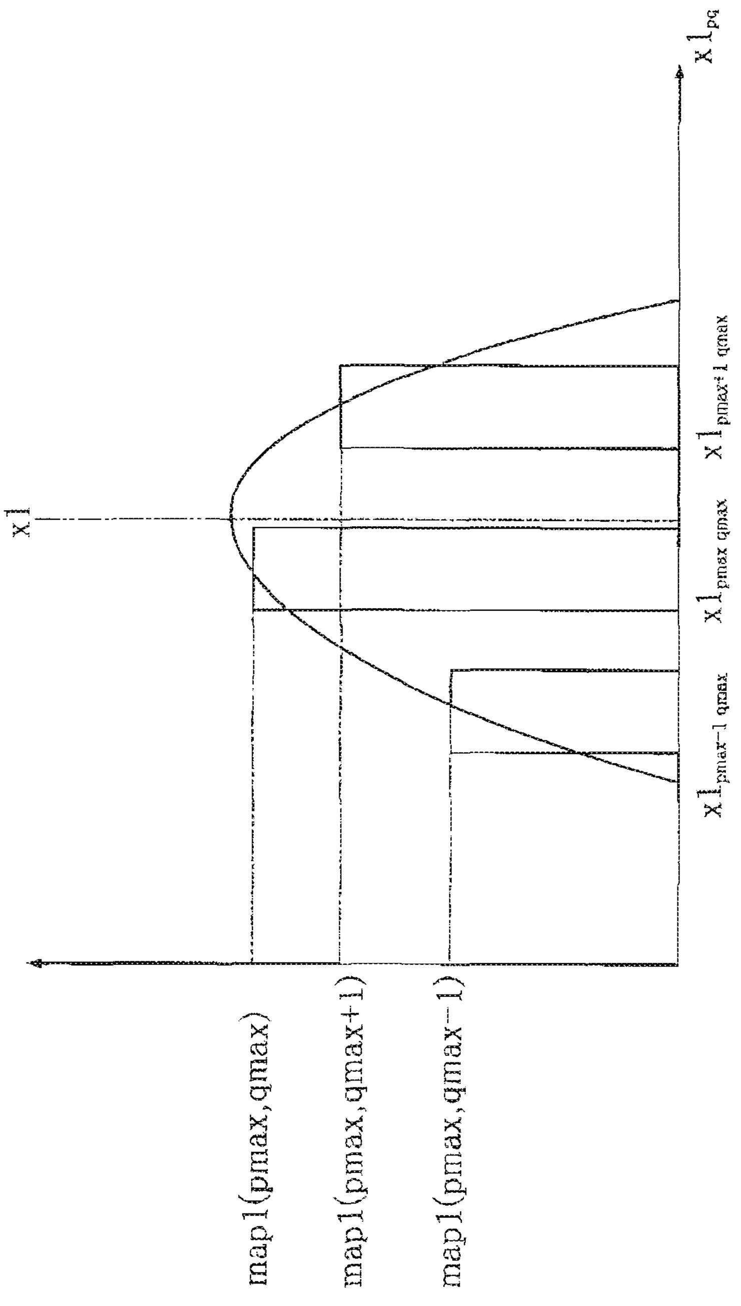
FIG. 16 is a graph used to explain the manner of determining values of a first approached coordinate in a first embodiment.

FIG. 16 is a graph used to explain the manner of determining the value of x1 in the first approach coordinate (x1,y1) in the present embodiment. The horizontal axis of the graph shown in this drawing indicates the values of the two-dimensional coordinate $X1_{pq}$ respectively correlated to an adjacent first map value map1(pmax−1,qmax), the maximum first map value map1(pmax,qmax), and an adjacent first map value map1(pmax+1,qmax). The vertical axis of this graph indicates the value of each first map value. When determining the value of x1 of the first approach coordinate, a quadratic curve is determined that passes through the three first map values of this graph. The value of x1 is then calculated by determining the coordinate or axis at the apex of that quadratic curve.

In the present embodiment, the maximum first map value map1(pmax,qmax) and two adjacent first map values map1 (v,qmax−1) and map1(v,qmax+1), which are contained in rows which differ by one column number from the maximum first map value map1(pmax,qmax), are used to calculate y1 of the first approach coordinate (x1,y1) (here, v=2, 3, . . . , 2n+1) in the same manner as in the case of calculating x1. These two adjacent first map values are mutually contained in the same column. Since the method used to calculate the value of y1 is the same as that used to calculate x1, an explanation thereof is omitted.

In this manner, the calculation unit 92 calculates the first approach coordinate (x1,y1) indicating an approach position of the conductor D1 with respect to the plurality of first detection electrodes $Ex_i$ and the plurality of second detection electrodes $Ey_j$. The IC chip 9 outputs a signal relating to the calculated first approach coordinate (x1,y1) to the outside (S106).

The first approach coordinate (x1,y1) can be calculated with the flow described above.

Next, an explanation is provided of the action and effects of the present embodiment.

In the present embodiment, as shown in FIG. 7, when the conductor D1 approaches the first detection electrodes $Ex_i$, several (two or three) of first direction detection values Xch(i) become large in comparison with other first direction detection values Xch(i). Similarly, when the conductor D1 approaches the second detection electrodes $Ey_j$, several (two or three) second direction detection values Ych(j) become large in comparison with other second direction detection values Ych(j). By generating the first map value map1(p,q), a value can be determined that takes into consideration the effects of the first direction detection value Xch(i) that becomes larger in the case the conductor D1 has approached the first detection electrodes $Ex_i$ and the second direction detection value Ych(j) that becomes larger in the case the conductor D1 has approached the second detection electrodes $Ey_j$. Consequently, as shown in FIG. 14, in the case the conductor D1 has approached the first detection electrodes $Ex_i$ and the second detection electrodes $Ey_j$, the value of a specific first map value map1(p,q) becomes extremely large. Consequently, the width of values that can be set for the threshold value used when detecting whether or not the conductor D1 has approached can be increased. As a result, a larger threshold value can be set so that the first map value map1(p,q) does not exceed the threshold value provided the conductor D1 has not approached even if the first direction detection value Xch(i) or the second direction detection value Ych(j) has increased due to the effects of noise. Thus, according to the input device A1, misoperations resulting from determining that the conductor D1 has approached even though the conductor D1 has not actually approached can be inhibited.

In the present invention, the first approach coordinate (x1, y1) is calculated using the first map values map1(p,q). The number of the first map values map1(p,q) generated is not limited to the number of first detection electrodes $Ex_i$ and the number of second detection electrodes $Ey_i$. Consequently, the first approach coordinate (x1,y1) can be calculated more accurately by generating a larger number of first map values map1(p,q).

In the present embodiment, a coordinate or axis of the apex of the two-dimensional curve shown in FIG. 16 is determined to calculate the first approach coordinate (x1,y1). According to the present inventors, this type of calculation method was determined to be suitable for accurately determining the first approach coordinate (x1,y1).

Next, an explanation is provided of a second embodiment of the present invention. In the present embodiment, although the parameters used when determining the first map values map1(p,q) differ from those of the first embodiment, other aspects are the same as those of the first embodiment. The following provides a detailed explanation.

In the present embodiment, the region $R_{pq}$ has an area of 4.5 of the diamond-shaped portions of each first detection electrode $Ex_i$.

In the present embodiment, in the four cases in which the first map value map1(p,q) is:

(p,q)=(2*i*,2*j*) (case 1), (p,q)=(2*i*+1, 2*j*) (case 2), (p,q)=(2*i*, 2*j*+1) (case 3), or (p,q)=(2*i*+1, 2*j*+1) (case 4), (where, i=1, 2, . . . , n, and j=1, 2, . . . , m), the parameters used during determination differ. The following provides a detailed explanation of this.

<Case 1>

The two-dimensional coordinate ($X1_{pq}$,$Y1_{pq}$) is represented as follows in case 1:

$$\begin{aligned}(X1_{pq}, Y1_{pq}) &= (X1_{2i}, Y1_{2j}) \\ &= (X_i, Y_j)\end{aligned} \tag{4-5}$$

In case 1, formula (2) is represented as follows:

$$\begin{aligned}Vx(p, q) &= Vx(2i, 2j) \\ &= S_{i-1}Xch(i-1) + S_iXch(i) + S_{i+1}Xch(i+1) \\ &= 0.3375Xch(i-1) + 1.575Xch(i) + \\ &\quad 0.3375Xch(i+1)\end{aligned} \tag{2-5}$$

Similarly, formula (3) in case 1 is represented as follows:

$$\begin{aligned}Vy(p, q) &= Vy(2i, 2j) \\ &= T_{j-1}Ych(j-1) + T_jYch(j) + T_{j+1}Ych(j+1) \\ &= 0.3375Ych(j-1) + 1.575Ych(j) + \\ &\quad 0.3375Ych(j+1)\end{aligned} \tag{3-5}$$

In case 1, the first map value map1(p,q) is generated according to formula (1) by determining the first value Vx(p, q) and the second value Vy(p,q).

<Case 2>

The two-dimensional coordinate ($X1_{pq}$,$Y1_{pq}$) is represented as follows in case 2:

$$\begin{aligned}(X1_{pq}, Y1_{pq}) &= (X1_{2i+1}, Y1_{2j}) \\ &= ((X_i + X_{i+1})/2, Y_j)\end{aligned} \tag{4-6}$$

In case 2, formula (2) is represented as follows:

$$\begin{aligned}Vx(p, q) &= Vx(2i+1, 2j) \\ &= S_iXch(i) + S_{i+1}Xch(i+1) \\ &= 1.125Xch(i) + 1.125Xch(i+1)\end{aligned} \tag{2-6}$$

Formula (3) in case 2 is represented as follows in the same manner as case 1:

$$\begin{aligned}Vy(p, q) &= Vy(2i+1, 2j) \\ &= T_{j-1}Ych(j-1) + T_jYch(j) + T_{j+1}Ych(j+1) \\ &= 0.3375Ych(j-1) + 1.575Ych(j) + \\ &\quad 0.3375Ych(j+1)\end{aligned} \tag{3-6}$$

In case 2, the first map value map1(p,q) is generated according to formula (1) by determining the first value Vx(p, q) and the second value Vy(p,q).

<Case 3>

The two-dimensional coordinate ($X1_{pq}$,$Y1_{pq}$) is represented as follows in case 3:

$$\begin{aligned}(X1_{pq}, Y1_{pq}) &= (X1_{2i}, Y1_{2j+1}) \\ &= (X_i, (Y_j + Y_{j+1})/2)\end{aligned} \tag{4-7}$$

In case 3, formula (2) is represented as follows in the same manner as case 1:

$$\begin{aligned}Vx(p, q) &= Vx(2i, 2j+1) \\ &= S_{i-1}Xch(i-1) + S_iXch(i) + S_{i+1}Xch(i+1) \\ &= 0.3375Xch(i-1) + 1.575Xch(i) + 0.3375Xch(i+1)\end{aligned} \tag{2-7}$$

Formula (3) in case 3 is represented as follows:

$$\begin{aligned}Vy(p, q) &= Vy(2i, 2j+1) \\ &= T_jYch(j) + T_{j+1}Ych(j+1) \\ &= 1.125Ych(j) + 1.125Ych(j+1)\end{aligned} \tag{3-7}$$

In case 3, the first map value map1(p,q) is generated according to formula (1) by determining the first value Vx(p, q) and the second value Vy(p,q).

<Case 4>

The two-dimensional coordinate ($X1_{pq}$,$Y1_{pq}$) is represented as follows in case 4:

$$(X1_{pq}, Y1_{pq}) = (X1_{2i+1}, Y1_{2j+1}) = ((X_i + X_{i+1})/2, (Y_j + Y_{j+1})/2) \quad (4\text{-}8)$$

In case 4, formula (2) is represented as follows in the same manner as case 2:

$$Vx(p, q) = Vx(2i+1, 2j+1) = S_i Xch(i) + S_{i+1} Xch(i+1) = 1.125Xch(i) + 1.125Xch(i+1) \quad (2\text{-}8)$$

Formula (3) in case 4 is represented as follows in the same manner as case 3:

$$Vy(p, q) = Vy(2i+1, 2j+1) = T_j Tch(j) + T_{j+1} Ych(j+1) = 1.125Ych(j) + 1.125Ych(j+1) \quad (3\text{-}8)$$

In case 4, the first map value map1(p,q) is generated according to formula (1) by determining the first value Vx(p, q) and the second value Vy(p,q).

A plurality of first map values map1(p,q) can be generated by calculating cases 1 to 4 described above.

Figure 17:
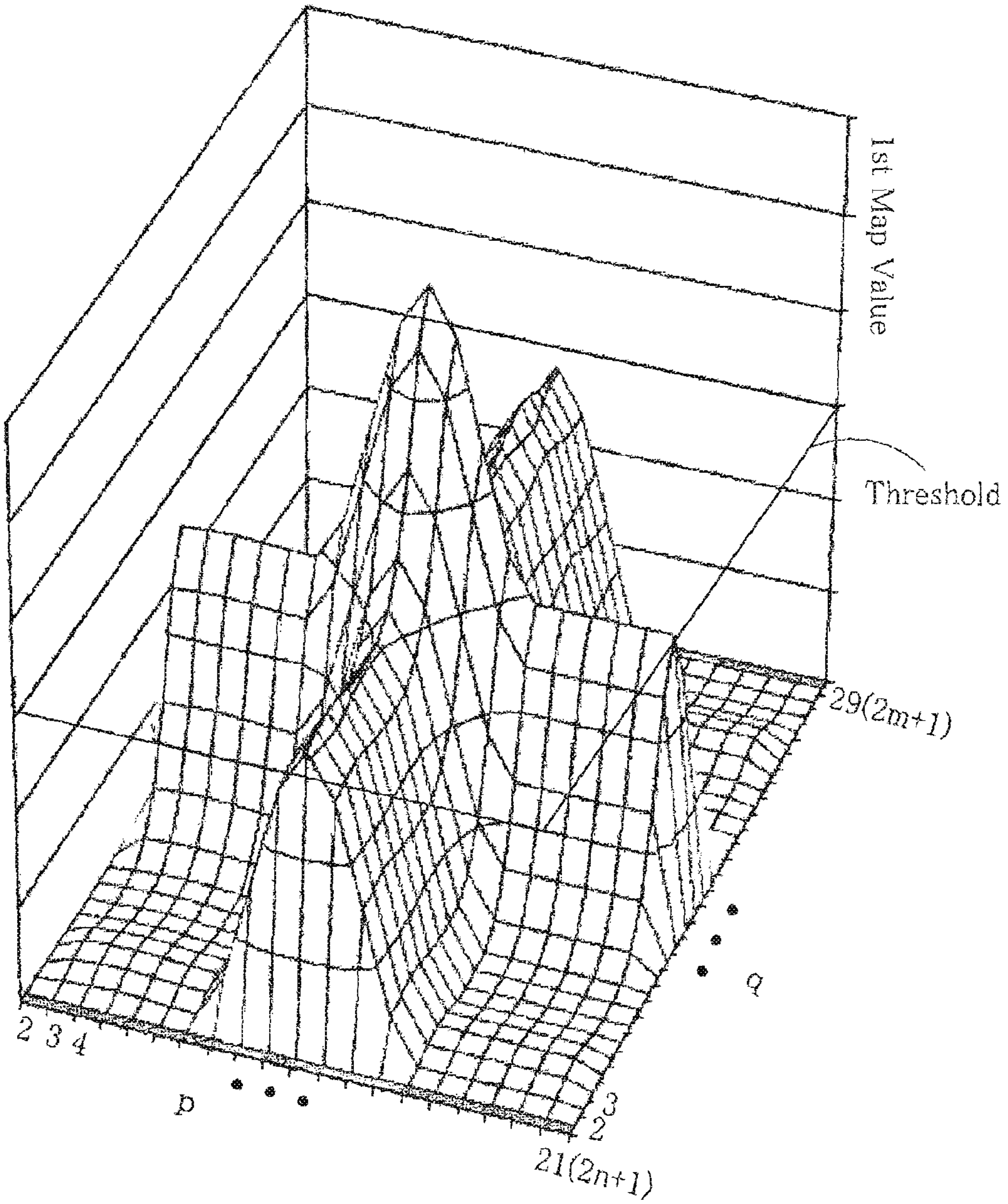
FIG. 17 is a drawing showing a three-dimensional representation of first map values of a second embodiment of the present invention.

FIG. 17 indicates a three-dimensional representation of the first map values map1(p,q) generated using these parameters in the case the conductor D1 has approached.

Next, an explanation is provided of a third embodiment of the present invention. In the present embodiment, although the parameters used when determining the first map values map1(p,q) differ from those of the first and second embodiments, other aspects are the same as those of the first embodiment. The following provides a detailed explanation.

In the present embodiment, the region $R_{pq}$ has an area of 6.25 of the diamond-shaped portions of each first detection electrode $Ex_i$.

In the present embodiment, in the four cases in which the first map value map1(p,q) is:

(p,q)=(2*i*,2*j*) (case 1), (p,q)=(2*i*+1,2*j*) (case 2), (p,q)=(2*i*,2*j*+1) (case 3), or (p,q)=(2*i*+1,2*j*+1) (case 4), (where, i=1, 2, . . . , n, and j=1, 2, . . . , m), the parameters used during determination differ. The following provides a detailed explanation of this.

<Case 1>

The two-dimensional coordinate ($X1_{pq}$,$Y1_{pq}$) is represented as follows in case 1:

$$(X1_{pq}, Y1_{pq}) = (X1_{2i}, Y1_{2j}) = (X_i, Y_j) \quad (4\text{-}9)$$

In case 1, formula (2) is represented as follows:

$$Vx(p, q) = Vx(2i, 2j) = S_{i-1} Xch(i-1) + S_i Xch(i) + S_{i+1} Xch(i+1) = 0.5Xch(i-1) + 2.125Xch(i) + 0.5Xch(i+1) \quad (2\text{-}9)$$

Similarly, formula (3) in case 1 is represented as follows:

$$Vy(p, q) = Vy(2i, 2j) = T_{j-1} Ych(j-1) + T_j Ych(j) + T_{j+1} Ych(j+1) = 0.5Ych(j-1) + 2.125Ych(j) + 0.5Ych(j+1) \quad (3\text{-}9)$$

In case 1, the first map value map1(p,q) is generated according to formula (1) by determining the first value Vx(p, q) and the second value Vy(p,q).

<Case 2>

The two-dimensional coordinate ($X1_{pq}$,$Y1_{pq}$) is represented as follows in case 2:

$$(X1_{pq}, Y1_{pq}) = (X1_{2i+1}, Y1_{2j}) = ((X_i + X_{i+1})/2, Y_j) \quad (4\text{-}10)$$

In case 2, formula (2) is represented as follows:

$$Vx(p, q) = Vx(2i+1, 2j) = S_i Xch(i) + S_{i+1} Xch(i+1) = 1.5Xch(i) + 1.5Xch(i+1) \quad (2\text{-}10)$$

Formula (3) in case 2 is represented as follows in the same manner as case 1:

$$Vy(p, q) = Vy(2i+1, 2j) = T_{j-1} Ych(j-1) + T_j Ych(j) + T_{j+1} Ych(j+1) = 0.5625Ych(j-1) + 2.125Ych(j) + 0.5625Ych(j+1) \quad (3\text{-}10)$$

In case 2, the first map value map1(p,q) is generated according to formula (1) by determining the first value Vx(p, q) and the second value Vy(p,q).

<Case 3>

The two-dimensional coordinate ($X1_{pq}$,$Y1_{pq}$) is represented as follows in case 3:

$$(X1_{pq}, Y1_{pq}) = (X1_{2i}, Y1_{2j+1}) = (X_i, (Y_j + Y_{j+1})/2) \quad (4\text{-}11)$$

In case 3, formula (2) is represented as follows in the same manner as case 1:

$$Vx(p, q) = Vx(2i, 2j+1) = S_{i-1} Xch(i-1) + S_i Xch(i) + S_{i+1} Xch(i+1) = 0.5625Xch(i-1) + 2.125Xch(i) + 0.5625Xch(i+1) \quad (2\text{-}11)$$

Formula (3) in case 3 is represented as follows:

$$\begin{aligned} Vy(p,q) &= Vy(2i,2j+1) \quad (3\text{-}11)\\ &= T_jYch(j)+T_{j+1}Ych(j+1)\\ &= 1.5Ych(j)+1.5Ych(j+1) \end{aligned}$$

In case 3, the first map value map1(p,q) is generated according to formula (1) by determining the first value Vx(p, q) and the second value Vy(p,q).

<Case 4>

The two-dimensional coordinate ($X1_{pq}$,$Y1_{pq}$) is represented as follows in case 4:

$$\begin{aligned} (X1_{pq},Y1_{pq}) &= (X1_{2i+1},Y1_{2j+1}) \quad (4\text{-}12)\\ &= ((X_i+X_{i+1})/2,(Y_j+Y_{j+1})/2) \end{aligned}$$

In case 4, formula (2) is represented as follows in the same manner as case 2:

$$\begin{aligned} Vx(p,q) &= Vx(2i+1,2j+1) \quad (2\text{-}12)\\ &= S_{i-1}Xch(i-1)+S_iXch(i)+S_{i+1}Xch(i+1)+\\ &\quad S_{i+2}Xch(i+2)\\ &= 0.0625Xch(i-1)+1.5Xch(i)+1.5Xch(i+1)+\\ &\quad 0.0625Xch(i+2) \end{aligned}$$

Formula (3) in case 4 is represented as follows in the same manner as case 3:

$$\begin{aligned} Vy(p,q) &= Vy(2i+1,2j+1) \quad (3\text{-}12)\\ &= T_{j-1}Ych(j-1)+T_jYch(j)+T_{i+1}Ych(j+1)+\\ &\quad T_{j+2}Ych(j+2)\\ &= 0.0625Ych(j-1)+1.5Ych(j)+1.5Ych(j+1)+\\ &\quad 0.0625Ych(j+2) \end{aligned}$$

In case 4, a plurality of the first map values map1(p,q) is generated according to formula (1) by determining the first value Vx(p,q) and the second value Vy(p,q).

A plurality of first map values map1(p,q) can be generated by calculating cases 1 to 4 described above.

Figure 18:
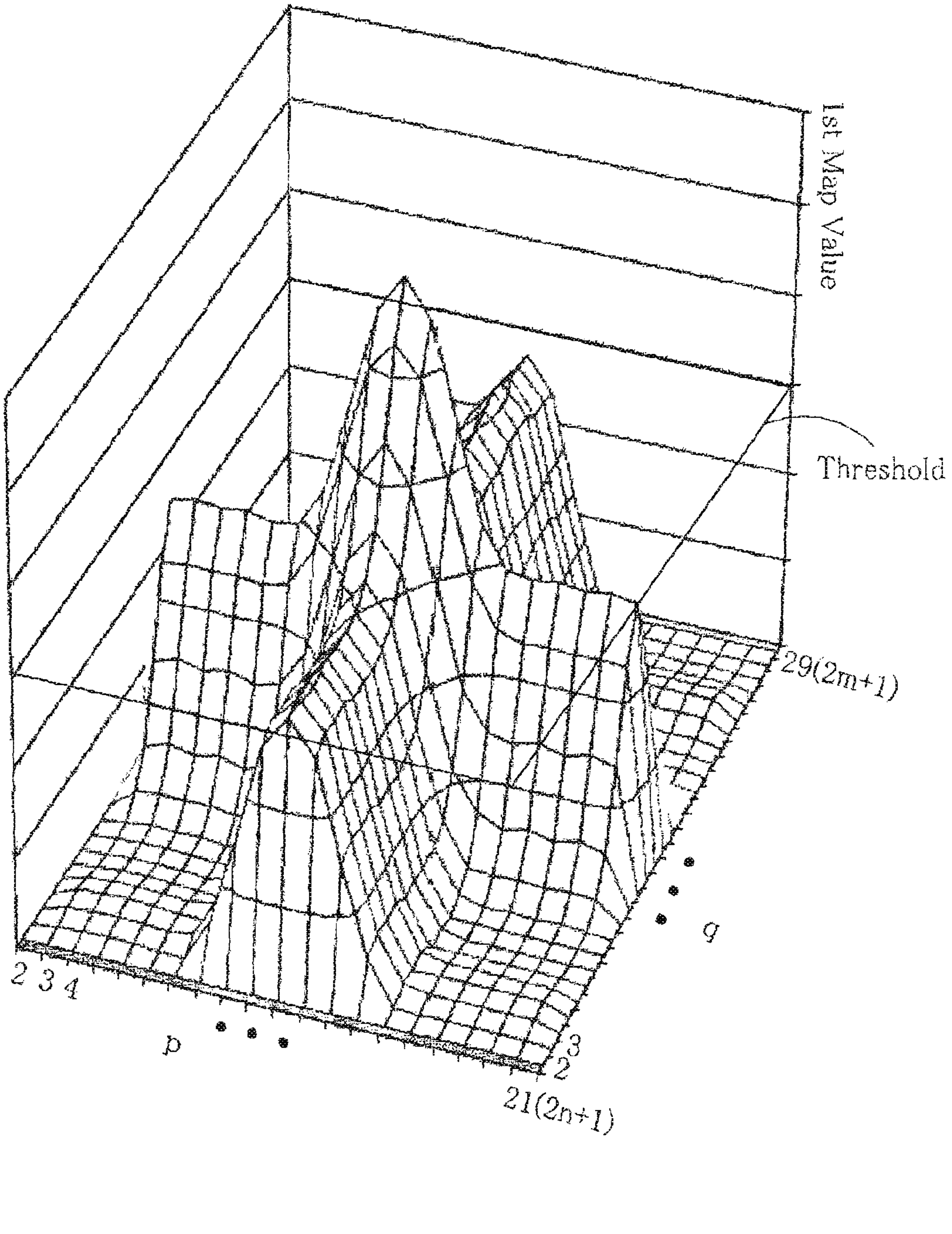
FIG. 18 is a drawing showing a three-dimensional representation of first map values of a third embodiment of the present invention.

FIG. 18 indicates a three-dimensional representation of the first map values map1(p,q) generated using these parameters in the case the conductor D1 has approached.

Next, an explanation is provided of a fourth embodiment of the present invention. In the present embodiment, the method used to determine the first approach coordinate (x1,y1) differs from that of the previously described methods. In the present embodiment, all first map values map1(v,qmax) (v=2, 3, . . . , 2n+1) contained in the same column as the maximum first map value map1(pmax,qmax) of FIG. 15 are used to calculate x1 of the first approach coordinate. x1 of the first approach coordinate can be calculated by weighting the magnitudes of this plurality of first map values map1(p,q) and calculating a weighted average.

Similarly, all first map values map1(pmax,u) (u=2, 3, . . . , 2m+1) contained in the same row as the maximum first map value map1(pmax,qmax) are used to calculate y1 of the first approach coordinate. y1 of the first approach coordinate can be calculated by weighting the magnitudes of this plurality of first map values map1(p,q) and calculating a weighted average.

Figure 19:
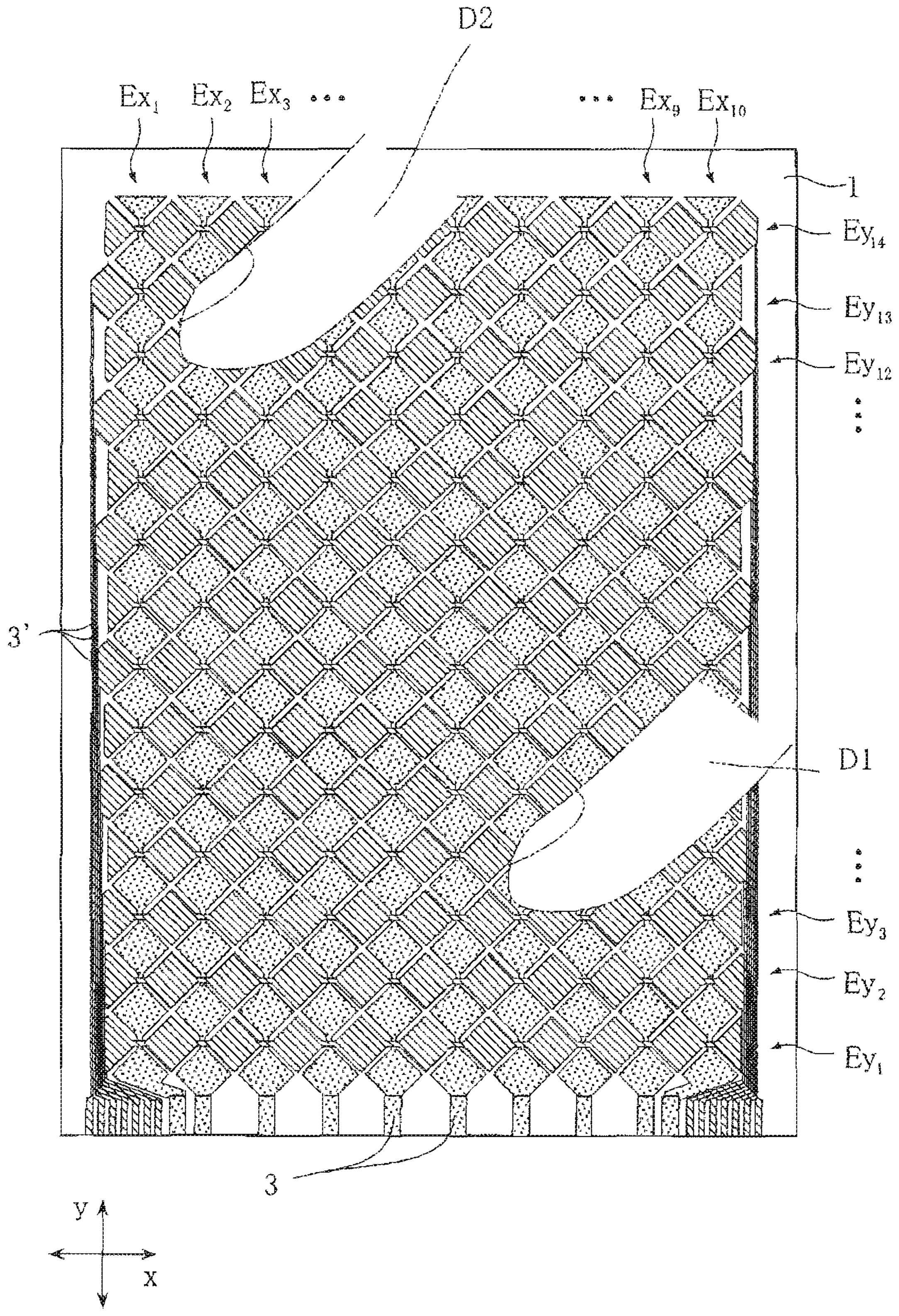
FIG. 19 is an overhead view of essential portions of an input device for explaining a fifth embodiment of the present invention.
Figure 20:
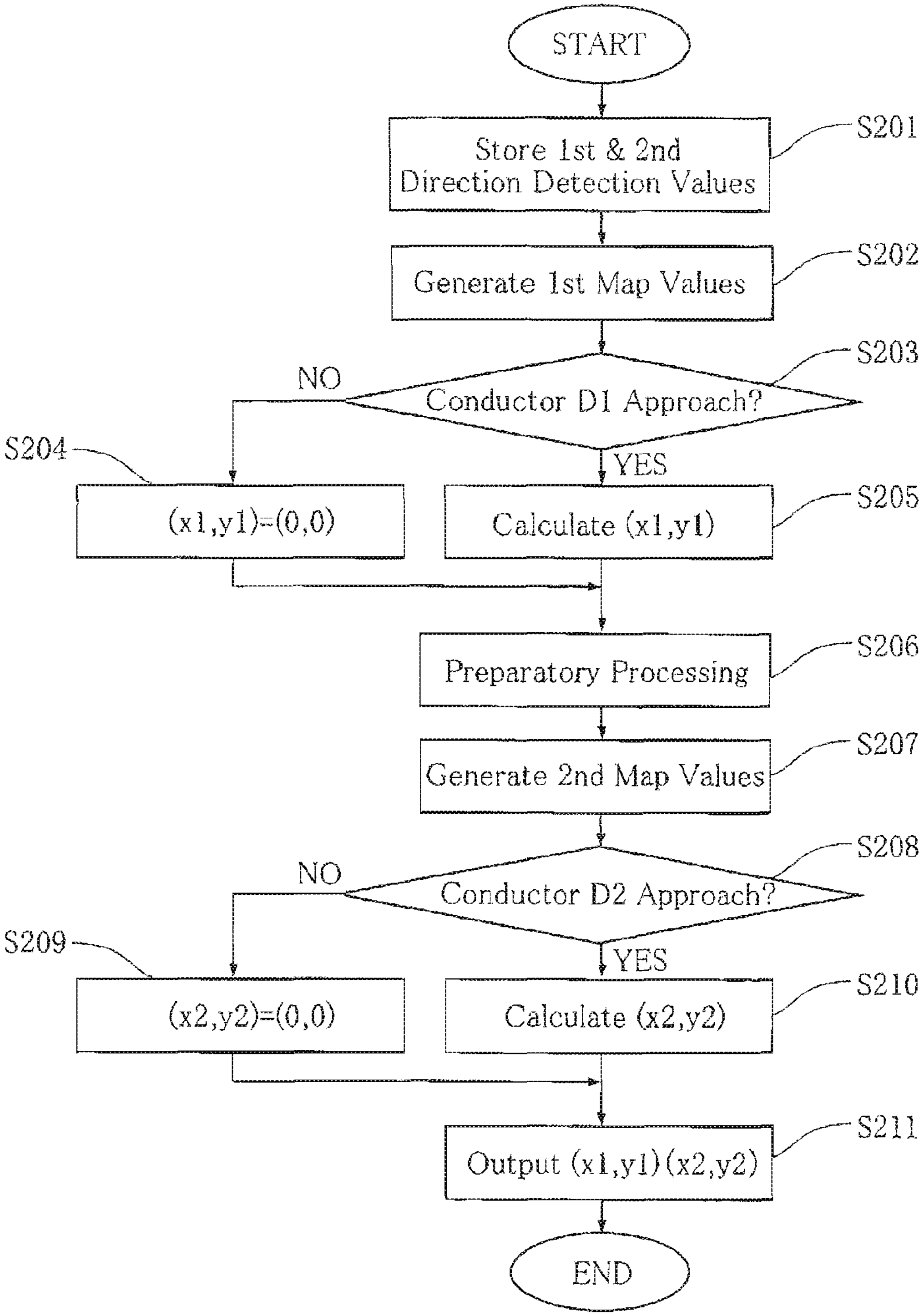
FIG. 20 is a flow chart showing the flow of processing of a fifth embodiment.

Next, an explanation is provided of a fifth embodiment of the present invention. In the present embodiment, approach positions of two conductors D1 and D2 are calculated as shown in FIG. 19. FIG. 20 is a flow chart indicating the processing flow of the present embodiment. As shown in the drawing, the present embodiment differs from the first embodiment in that not only the first approach coordinate (x1,y1), but also a second approach coordinate (x2,y2) is calculated that is the approach position of the second conductor D2 (S207 to S211).

First, steps through calculation of the first approach coordinate (x1,y1) (S201 to S205) are the same as the steps of the first embodiment shown in FIG. 6 (S101 to S105).

<Preparatory Processing (S206)>

Figure 21:
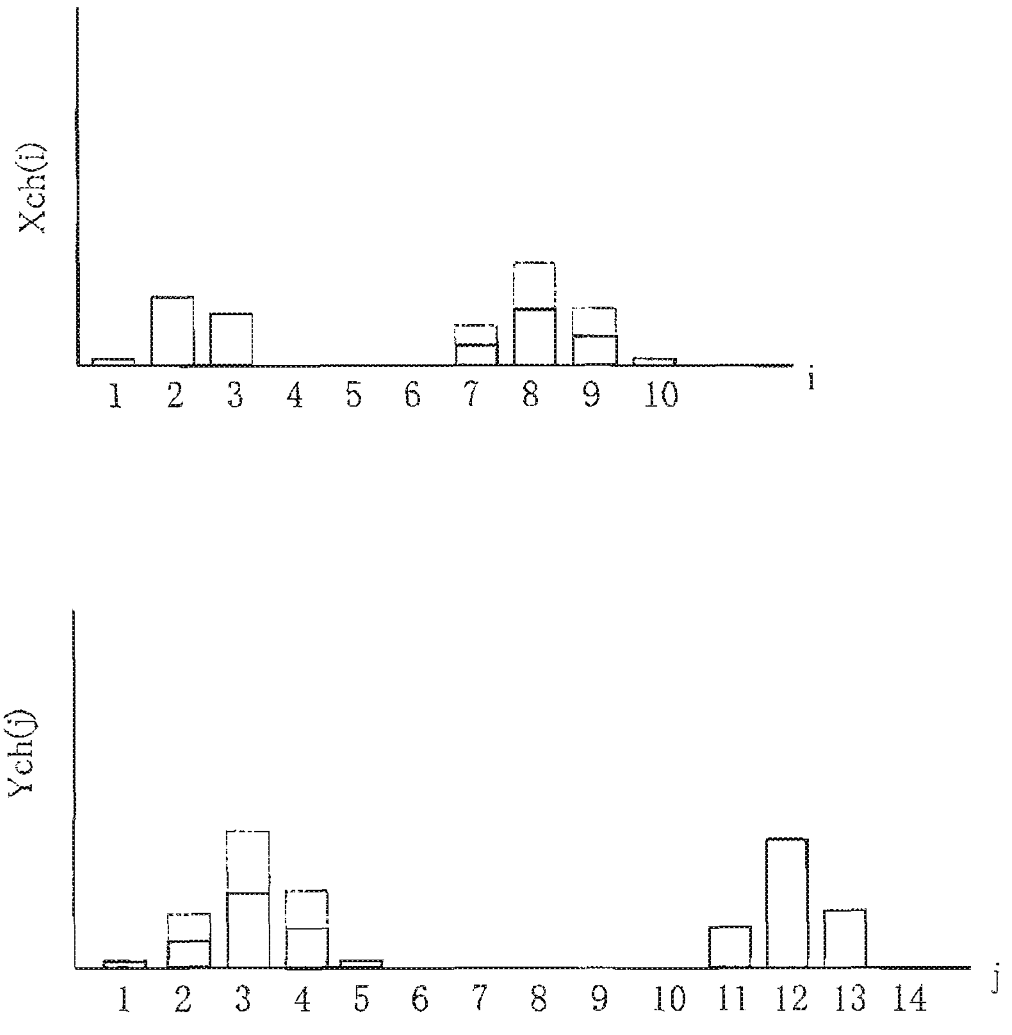
FIG. 21 is a drawing for explaining preparatory processing of a fifth embodiment.

Next, preparatory processing is carried out for calculating the second approach coordinate (x2,y2) (S206). As has been previously described, the plurality of first direction detection values Xch(i) obtained from the plurality of first detection electrodes $Ex_i$ and the plurality of second direction detection values Ych(j) obtained from the plurality of second detection electrodes $Ey_j$ are stored in the storage unit 91. As shown in FIG. 21, the preparatory processing consists of decreasing the first direction detection value Xch(i) obtained from the first detection electrode $Ex_i$ ($Ex_8$ in FIGS. 19 and 21) that is closest to the first approach coordinate (x1,y1). This, is for reducing the effect of the conductor D1 approaching the first direction detection values Xch(i) on calculation of the second approach coordinate (x2,y2). Similarly, two values consisting of a first direction detection value Xch(i−1) obtained from a first detection electrode $Ex_{i-1}$ adjacent to the first detection electrode $Ex_i$ closest to the first approach coordinate (x1,y1), and a first direction detection value Xch(i+1) obtained from a first detection electrode $Ex_{i+1}$, are decreased.

Similarly, preparatory processing is carried out that consists of decreasing the second direction detection value Ych(j) obtained from the second detection electrode $Ey_j$ ($Ey_3$ in FIGS. 19 and 21) that is closest to the first approach coordinate (x1,y1). Two values consisting of a second direction detection value Ych(j−1) obtained from a second detection electrode $Ey_{j-1}$ adjacent to the second detection electrode $Ey_j$ closest to the first approach coordinate (x1,y1), and a second direction detection value Ych(j+1) obtained from a second detection electrode $Ey_{j+1}$, are decreased. For example, each of the values of the first direction detection value and the second direction detection value is halved.

<Generation of Second Map Values (S207)>

Next, a plurality of second map values map2(p,q) is generated using the first direction detection values Xch(i) and the second direction detection values Ych(j) (S207). The method for determining the second maps values map2(p,q) described below is the same as the method for determining the first map values map1(p,q) with the exception of using the first direction detection values Xch(i) and the second direction detection values Ych(j) after completing the previously described preparatory processing. The second map values map2(p,q) are also values obtained by arithmetic processing of a third value obtained by arithmetic processing of at least any of the first direction detection values Xch(i) and a fourth value obtained by arithmetic processing of at least any of the second direction detection values Ych(j).

The second map values have a positive correlation with each of the first direction detection values Xch(i) used to determine the second map values. Namely, if a value other than a specific first direction detection value Xch(i) among the first direction detection values Xch(i) used to determine that second map value, and a value of the second direction detection value Ych(j) used to determine that second map value are the same, then the value of the second map value becomes larger the larger the value of that specific first direction detection value Xch(i). The second map values have a positive correlation with each of the second direction detection values Ych(j) used to determine the second map values. Namely, if the first direction detection value Xch(i) used to determine that second map value, and a value other than a specific second direction detection value Ych(j) among the second direction detection values Ych(j) used to determine that second map value are the same, then the value of the second map value becomes larger the larger the value of that specific second direction detection value Ych(j).

The number of the second map values generated can be freely determined according to combinations of any of the plurality of first direction detection values Xch(i) and any of the plurality of second direction detection values Ych(j). The following indicates an example of generating 2n×2m second map values.

Figure 22:
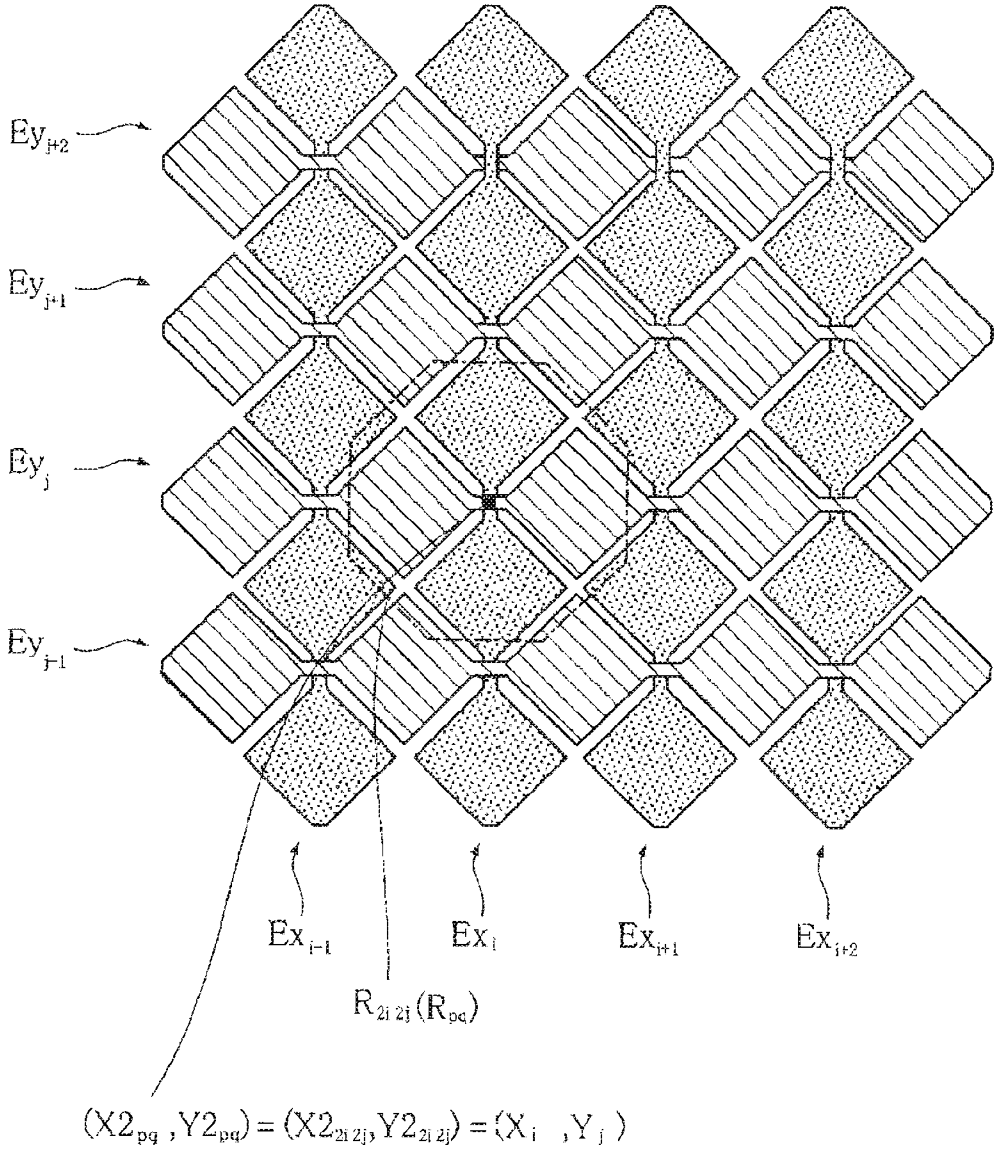
FIG. 22 is a drawing for explaining a case 1 of a fifth embodiment.

A two-dimensional coordinate ($X2_{pq}$,$Y2_{pq}$) correlated with each second map value map2(p,q) is a barycentric coordinate of a region $R_{pq}$ of a prescribed area shown in FIG. 22 and the like. The shape of the region $R_{pq}$ may be of any shape. In the present embodiment, the region $R_{pq}$ has an area of 4 of the diamond-shaped portions of each first detection electrode $Ex_i$. The second map value map2(p,q) is defined as follows:

$$map2(p,q)=Wx(p,q)+Wy(p,q) \tag{6}$$

Wx(p,q) is a third value, and is represented as follows:

$$Wx(p,q)=\Sigma S_k Xch(k) \tag{7}$$

Here, $S_k$ is the area of the region where the region $R_{pq}$ and a first detection electrode $Ex_k$ overlap (where, k=1, 2, . . . , n). Namely, the third value Wx(p,q) is a value obtained by weighting each area where the region $R_{pq}$ and the first detection electrode $Ex_k$ overlap and adding each first direction detection value Xch(i).

Similarly, Wy(p,q) is a fourth value, and is represented by the following:

$$Wy(p,q)=\Sigma T_k Ych(k) \tag{8}$$

Here, similar to $S_k$, $T_k$ is the area of the region where the region $R_{pq}$ and a second detection electrode $Ey_k$ overlap (where, k=1, 2, . . . , m). Namely, the fourth value Wy(p,q) is a value obtained by weighting each of the areas of the regions where the region $R_{pq}$ and the second detection electrode $Ey_k$ overlap, and adding each second direction detection value Ych(j).

Consequently, the second map value map2(p,q) can be said to be the sum of a value obtained by weighting each of the areas of the regions where the region $R_{pq}$ and the first detection electrode $Ex_k$ overlap and adding each first direction detection value Xch(i), and a value obtained by weighting each of the areas of the regions where the region $R_{pq}$ and the second detection electrode $Ey_k$ overlap and adding each second direction detection value Ych(j).

In the present embodiment, in the four cases in which the second map value map2(p,q) is:

(p,q)=(2*i*,2*j*) (case 1, see FIG. 22), (p,q)=(2*i*+1,2*j*) (case 2, see FIG. 23), (p,q)=(2*i*,2*j*+1) (case 3, see FIG. 24), or (p,q)=(2*i*+1,2*j*+1) (case 4, see FIG. 25), (where, i=1, 2, . . . , n, and j=1, 2, . . . , m), the parameters used during determination differ. The following provides a detailed explanation of this.

<Case 1>

The following provides an explanation of case 1 using FIG. 22. As shown in the drawing, the two-dimensional coordinate ($X2_{pq}$,$Y2_{pq}$) is represented as follows:

$$\begin{aligned}(X2_{pq}, Y2_{pq}) &= (X2_{2i}, Y2_{2j}) \\ &= (X_i, Y_j)\end{aligned} \tag{9-1}$$

$X_i$ is a central position of the first detection electrodes $Ex_i$ in the x direction. Similarly, $Y_j$ is a central position of the second detection electrodes $Ey_j$ in the y direction.

In case 1, formula (7) is represented as follows:

$$\begin{aligned}Wx(p, q) &= Wx(2i.2j) \\ &= S_{i-1}Xch(i-1) + S_iXch(i) + S_{i+1}Xch(i+1) \\ &= 0.3Xch(i-1) + 1.4Xch(i) + 0.3Xch(i+1)\end{aligned} \tag{7-1}$$

$S_{i-1}$, $S_i$ and $S_{i+1}$ are defined as $S_{i-1}$=0.3, $S_i$=1.4 and $S_{i+1}$=0.3 based on a value of 1 for the area of a single diamond-shaped electrode included in the first detection electrodes $Ex_i$. Furthermore, a suitable value is used for those values that do not actually exist, such as Xch(0), Xch(n+1).

Similarly, formula (8) in case 1 is represented as follows:

$$\begin{aligned}Wy(p, q) &= Wy(2i, 2j) \\ &= T_{j-1}Ych(j-1) + T_jYch(j) + T_{j+1}Ych(j+1) \\ &= 0.3Tch(j-1) + 1.4Ych(j) + 0.3Ych(j+1)\end{aligned} \tag{8-1}$$

$T_{j-1}$, $T_j$ and $T_{i+1}$ are defined as $T_{j-i}$=0.3, $T_j$=1.4 and $T_{j+1}$=0.3 based on a value of 1 for the area of a single diamond-shaped electrode included in the second detection electrodes $Ey_j$. Furthermore, a suitable value is used for those values that do not actually exist, such as Ych(0), Ych(m+1).

In case 1, the second map value map2(p,q) is generated according to formula (6) by determining the third value Wx(p, q) and the fourth value Wy(p,q).

<Case 2>

Figure 23:
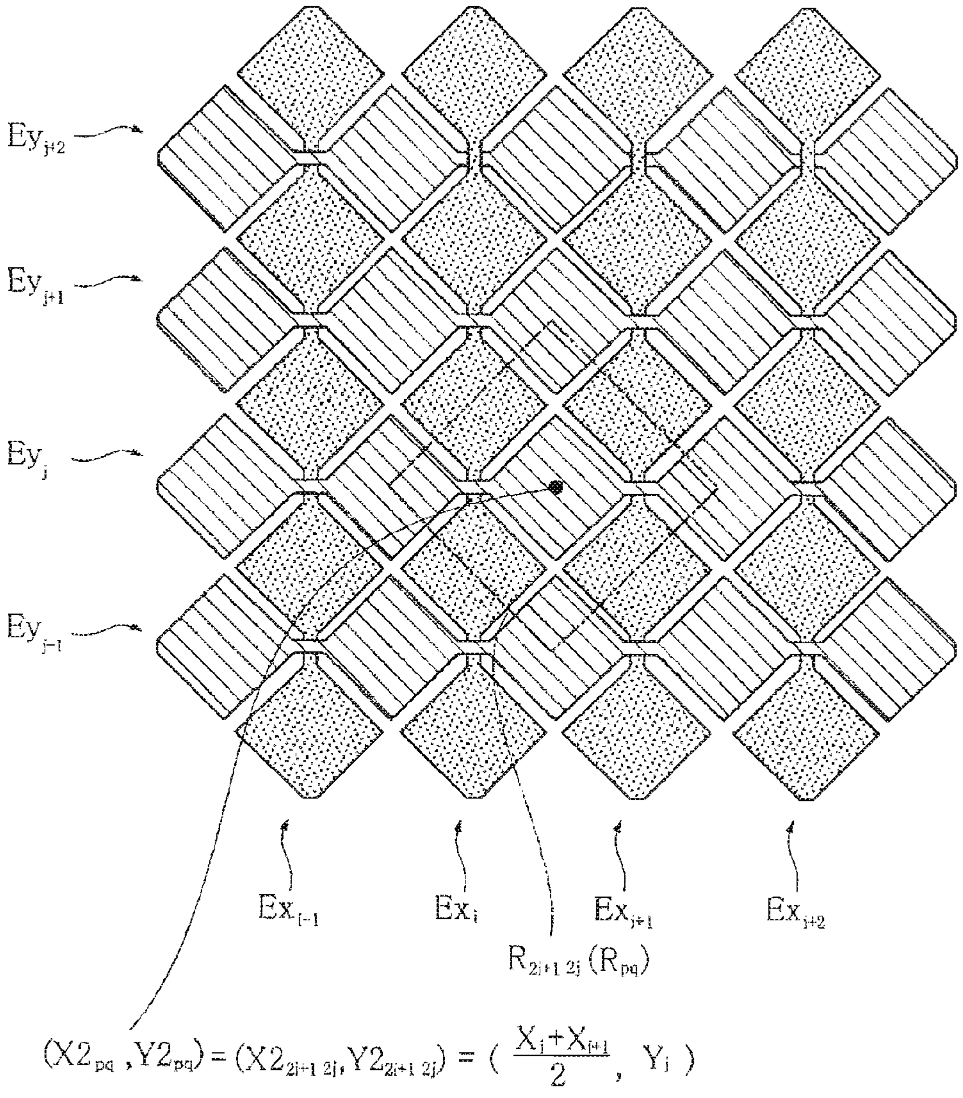
FIG. 23 is a drawing for explaining a case 2 of a fifth embodiment.

The following provides an explanation of case 2 using FIG. 23. As shown in the drawing, the two-dimensional coordinate ($X2_{pq}$,$Y2_{pq}$) is represented as follows:

$$\begin{aligned}(X2_{pq}, Y2_{pq}) &= (X2_{2i+1}, Y2_{2j}) \\ &= ((X_i + X_{i+1})/2, Y_j)\end{aligned} \tag{9-2}$$

$X_{i+1}$ is a central position of the first detection electrodes $Ex_{i+i}$ in the x direction.

In case 2, formula (7) is represented as follows:

$$\begin{aligned}Wx(p, q) &= Wx(2i+1, 2j) \\ &= S_iXch(i) + S_{i+1}Xch(i+1) \\ &= 1.0Xch(i) + 1.0Xch(i+1)\end{aligned} \tag{7-2}$$

$S_i$ and $S_{i+1}$ are defined as $S_i$=1.0 and $S_{i+1}$=1.0 based on a value of 1 for the area of a single diamond-shaped electrode included in the first detection electrodes $Ex_i$.

Formula (8) in case 2 is represented as follows in the same manner as case 1:

$$\begin{aligned} Wy(p,q) &= Wy(2i+1,2j) \\ &= T_{j-1}Ych(j-1)+T_jYch(j)+T_{j+1}Ych(j+1) \\ &= 0.3Ych(j-1)+1.4Ych(j)+0.3Ych(j+1) \end{aligned} \tag{8-2}$$

In case 2, the second map value map2(p,q) is generated according to formula (6) by determining the third value Wx(p, q) and the fourth value Wy(p,q).

<Case 3>

Figure 24:
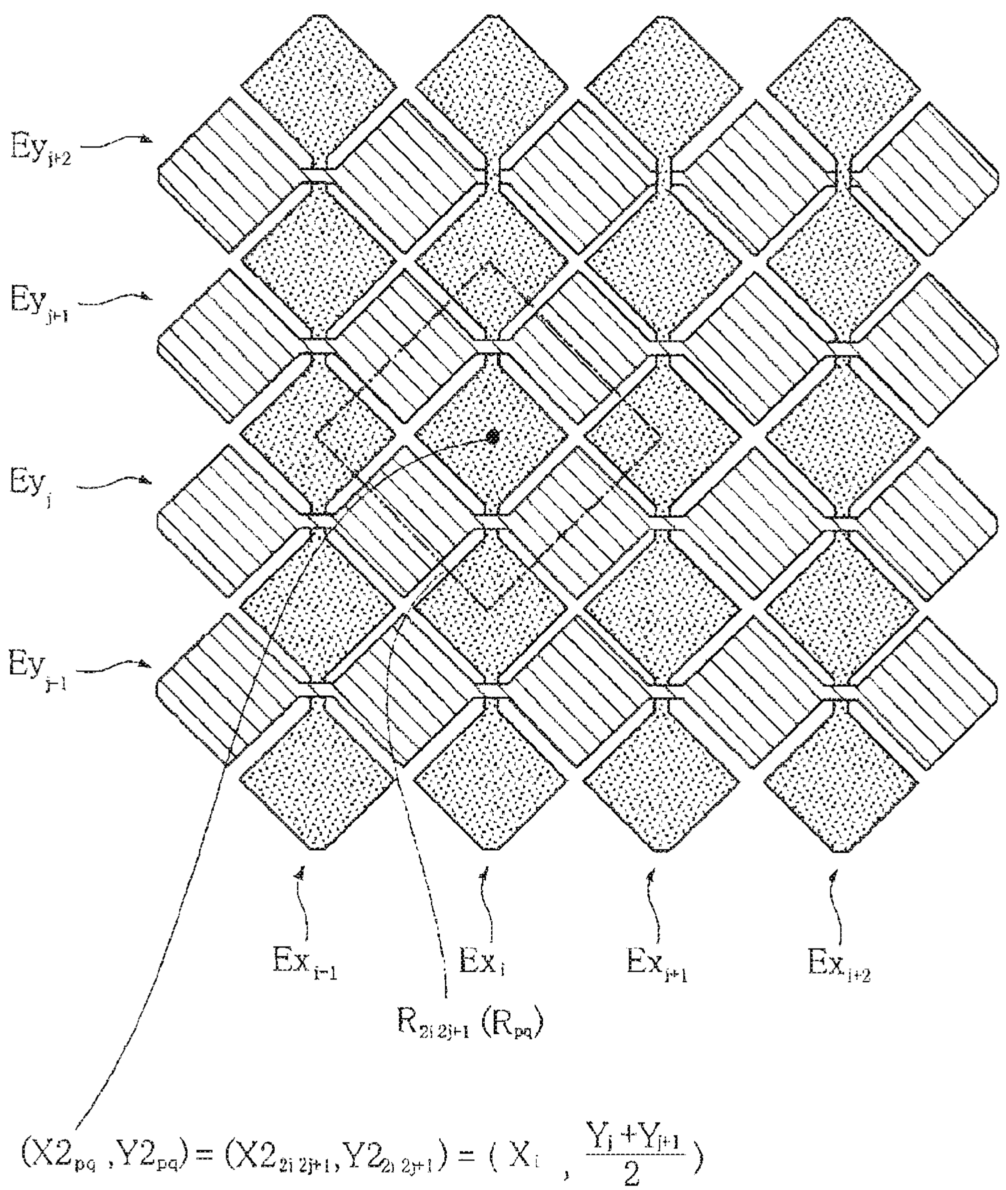
FIG. 24 is a drawing for explaining a case 3 of a fifth embodiment.

The following provides an explanation of case 3 using FIG. 24. As shown in the drawing, the two-dimensional coordinate ($X2_{pq}$, $Y2_{pq}$) is represented as follows:

$$\begin{aligned} (X2_{pq},Y2_{pq}) &= (X2_{2i},Y2_{2j+1}) \\ &= (X_i,(Y_j+Y_{j+1})/2) \end{aligned} \tag{9-3}$$

$Y_{j+1}$ is a central position of the second detection electrodes $Ey_j$ in the y direction.

In case 3, formula (7) is represented as follows in the same manner as case 1:

$$\begin{aligned} Wx(p,q) &= Wx(2i,2j+1) \\ &= S_{i-1}Xch(i-1)+S_iXch(i)+S_{i+1}Xch(i+1) \\ &= 0.3Xch(i-1)+1.4Xch(i)+0.3Xch(i+1) \end{aligned} \tag{7-3}$$

Formula (8) in case 3 is represented as follows:

$$\begin{aligned} Wy(p,q) &= Wy(2i,2j+1) \\ &= T_jYch(j)+T_{j+1}Ych(j+1) \\ &= 1.0Ych(j)+1.0Ych(j+1) \end{aligned} \tag{8-3}$$

$T_j$ and $T_{j+1}$ are defined as $T_j$=1.0 and $T_{j+1}$=1.0 based on a value of 1 for the area of a single diamond-shaped electrode included in the second detection electrodes $Ey_j$.

In case 3, the second map value map2(p,q) is generated according to formula (6) by determining the third value Wx(p, q) and the fourth value Wy(p,q).

<Case 4>

Figure 25:
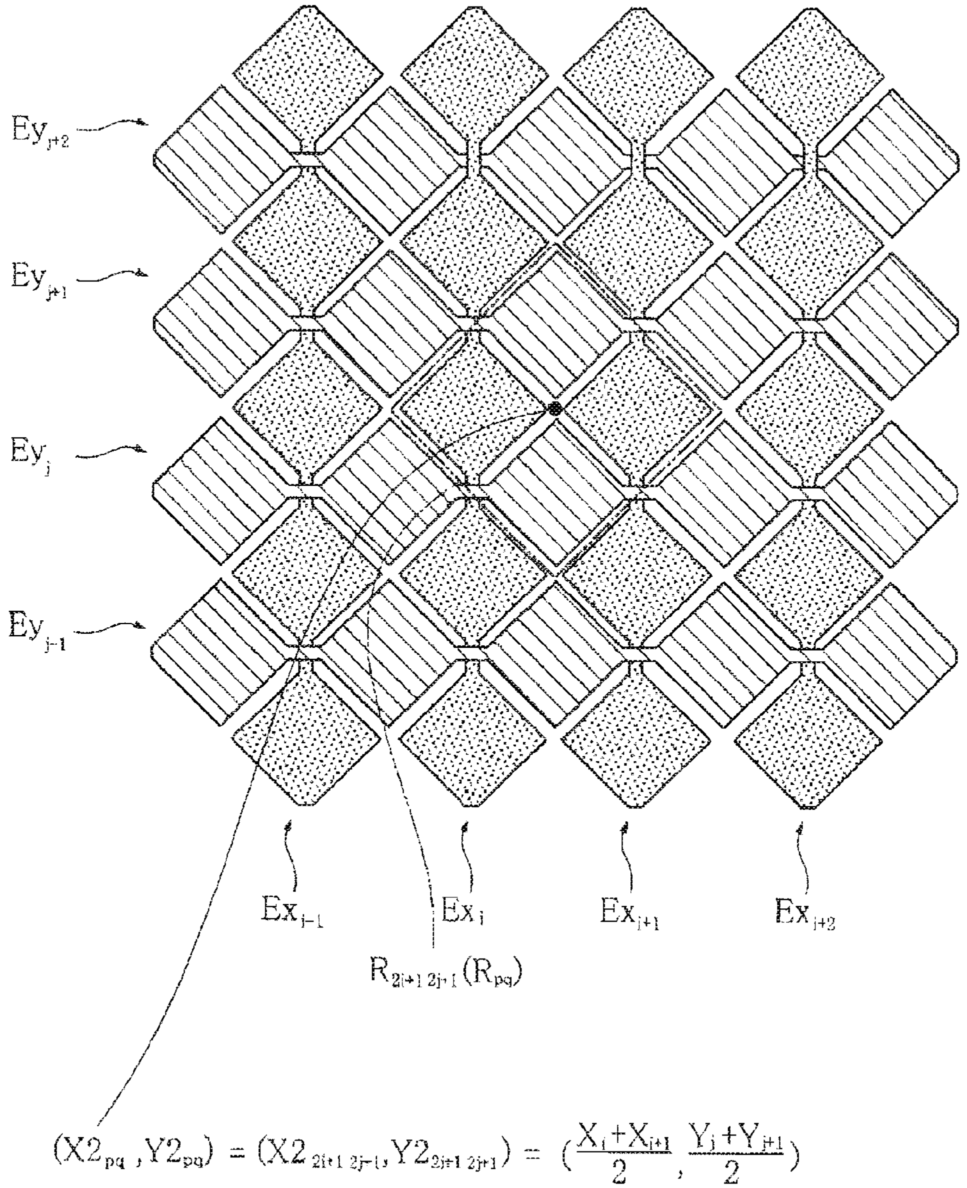
FIG. 25 is a drawing for explaining a case 4 of a fifth embodiment.

The following provides an explanation of case 4 using FIG. 25. As shown in the drawing, the two-dimensional coordinate ($X2_{pq}$, $Y2_{pq}$) is represented as follows:

$$\begin{aligned} (X2_{pq},Y2_{pq}) &= (X2_{2i+1},Y2_{2j+1}) \\ &= ((X_i+X_{i+1})/2,(Y_j+Y_{j+1})/2) \end{aligned} \tag{9-4}$$

In case 4, formula (7) is represented as follows in the same manner as case 2:

$$\begin{aligned} Wx(p,q) &= Wx(2i+1,2j+1) \\ &= S_iXch(i)+S_{i+1}Xch(i+1) \\ &= 1.0Xch(i)+1.0Xch(i+1) \end{aligned} \tag{7-4}$$

Formula (8) in case 4 is represented as follows in the same manner as case 3:

$$\begin{aligned} Wy(p,q) &= Wy(2i+1,2j+1) \\ &= T_jYch(j)+T_{j+1}Ych(j+1) \\ &= 1.0Ych(j)+1.0Ych(j+1) \end{aligned} \tag{8-4}$$

In case 4, the second map value map2(p,q) is generated according to formula (6) by determining the third value Wx(p, q) and the fourth value Wy(p,q).

A plurality of second map values map2(p,q) can be generated by calculating cases 1 to 4 described above.

Figure 26:
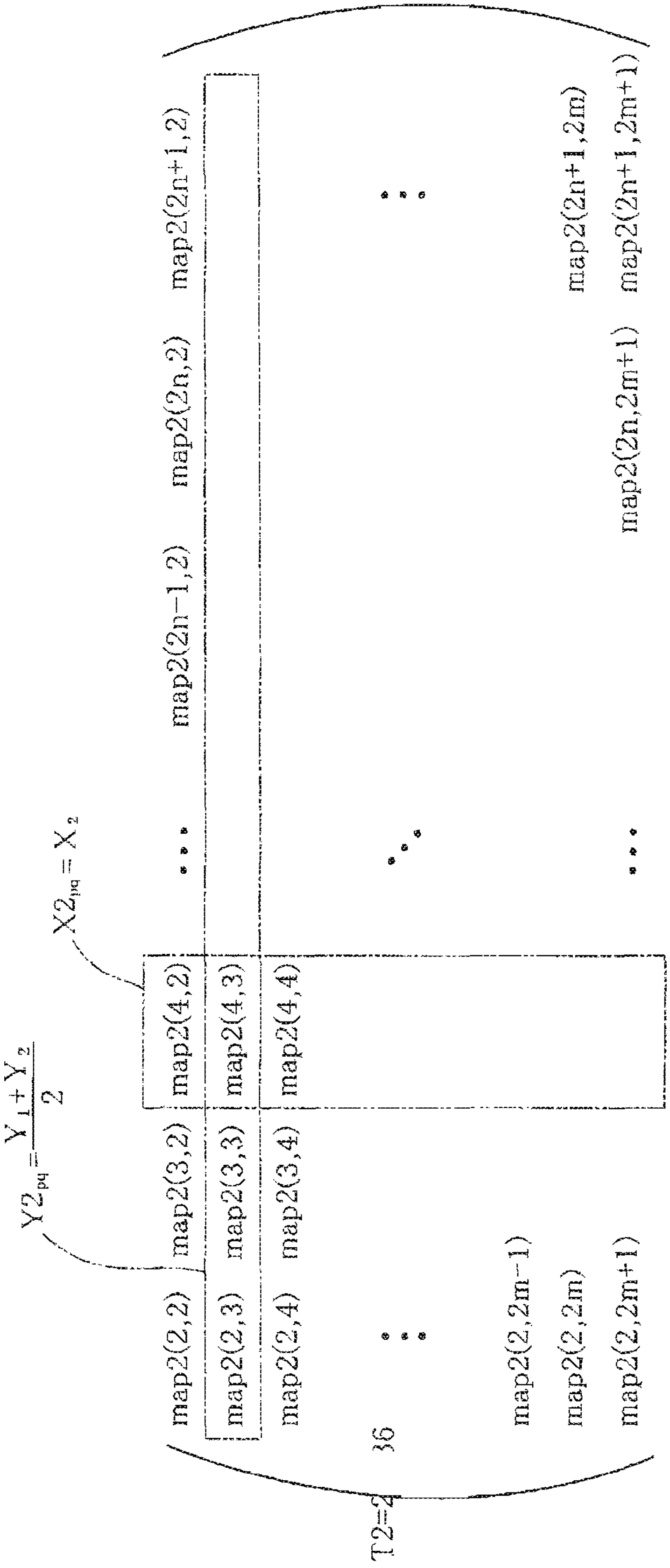
FIG. 26 is a drawing for explaining a matrix of a fifth embodiment having second map values as elements thereof.

When considering that i=1, 2, . . . , n, p represents 2n integers from 2 to 2n+1. On the other hand, when considering that j=1, 2, . . . , m, q represents 2m integers from 2 to 2m+1. Therefore, the second map value map2(p,q) can be considered to be an element of a 2n×2m matrix T2. Here, an element $\beta_{rs}$ of the matrix T2 is defined as follows (see FIG. 26):

$$\beta_{rs}=\text{map2}(r+1,s+1) \tag{10}$$

(where, r=1, 2, . . . , 2n and s=1, 2, . . . , 2m).

It can be understood from formulas (9-1), (9-2), (9-3) and (9-4) that if the values of p in a plurality of second map values map2(p,q) are mutually the same, then the values of the two-dimensional coordinate $X2_{pq}$ correlated with these second map values map2(p,q) are the same. Consequently, if row numbers in the matrix T2 are the same, then the values of the two-dimensional coordinate $X2_{pq}$ correlated with a matrix element (second map value map2(p,q)) are the same. For example, component p of the third row of the matrix T2 is 4, and $X2_{pq}=X_2$ according to formulas (9-1) and (9-3).

Similarly, it can be understood that if the values of q in a plurality of the second map values map2(p,q) are mutually the same, then the values of the two-dimensional coordinate $Y2_{pq}$ correlated with these second map values map2(p,q) are the same. Consequently, if column numbers in the matrix T2 are the same, then the values of the two-dimensional coordinate $Y2_{pq}$ correlated with a matrix element (second map value map2(p,q)) are the same. For example, component q of the second column of the matrix T2 is 3, and $Y2_{pq}=(Y_1+Y_2)/2$ according to formulas (9-3) and (9-4).

According to formulas (9-1), (9-2), (9-3) and (9-4), as the value of p becomes larger, the value of $X2_{pq}$ also becomes larger, and as the value of q becomes larger, the value of $Y2_{pq}$ also becomes larger. Consequently, in the matrix T2, as a row number increases, the value of the two-dimensional coordinate X2 correlated with a component of that row (second map value map2(p,q)) increases monotonously. Similarly, in the matrix T2, as a column number increases, the value of the two-dimensional coordinate $Y2_{pq}$ correlated to a component of that column (second map value map2(p,q)) increases monotonously.

<Determination of Approach of Conductor D2 (S208)>

Next, an explanation is provided of the step (S208) for determining whether or not the conductor D2 has approached the plurality of first detection electrodes $Ex_i$ and the plurality of second detection electrodes $Ey_j$ by using the second map values map2(p,q) generated according to the process described above with reference to FIG. 27. First, a maximum second map value map2(pmax,qmax) is extracted from the second map values map2(p,q) determined in the above-mentioned processing (pmax is the value of p for which the second map value reaches a maximum, while similarly, qmax is the value of q for which the second map value reaches a maximum). Next, the calculation unit 92 determines whether or not the value of this maximum second map value map2(pmax, qmax) is larger than a prescribed threshold value. In the case the maximum second map value map2(pmax,qmax) is less than or equal to the prescribed threshold value (NO in S208), the calculation unit 92 determines that the conductor D2 has not approached (S209).

In the case the conductor D2 has been determined to have not approached, the calculation unit 92 outputs a signal indicating that the conductor D2 has not approached (such as a signal indicating that the second approach coordinate (x2,y2) is (0,0)) and the previously calculated first approach coordinate (x1,y1) outside the IC chip 9 (S211).

<Calculation of Second Approach Coordinate (x2,y2) (S210)>

On the other hand, in the case the maximum second map value map2(pmax,qmax) is larger than the prescribed threshold value (YES in S208), the calculation unit 92 judges that the conductor D2 has approached. In this case, the calculation unit 92 calculates the value of the second approach coordinate (x2,y2) (S210). In the present embodiment, the maximum second map value map2(pmax,qmax) and two adjacent second map values map2(pmax−1,u) and map2(pmax+1,u), which differ by one row number from the maximum second map value map2(pmax,qmax) but are mutually contained in the same column, are used to calculate x2 of the second approach coordinate (x2,y2) (here, u=2, 3, . . . , 2m+1). The following provides an explanation of an example of the case in which u=qmax, namely in the case the two adjacent second map values are contained in the same column as the maximum second map value.

Figure 28:
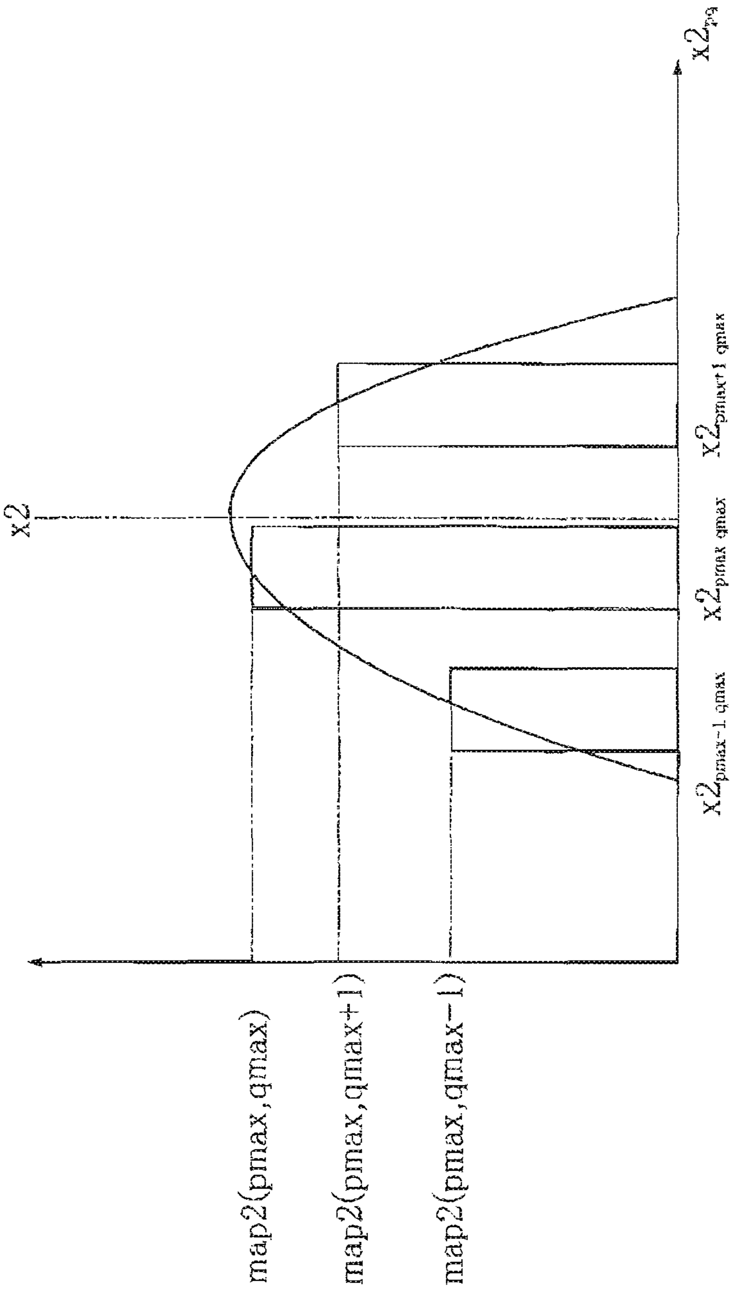
FIG. 28 is a graph used to explain the manner of determining values of a second approached coordinate in a fifth embodiment.

FIG. 28 is a graph used to explain the manner of determining the value of x2 in the second approach coordinate (x2,y2) in the present embodiment. The horizontal axis of the graph shown in this drawing indicates the values of the two-dimensional coordinate $X2_{pq}$ respectively correlated to an adjacent second map value map2(pmax−1,qmax), the maximum second map value map2(pmax,qmax), and an adjacent second map value map2(pmax+1,qmax). The vertical axis of this graph indicates the value of each second map value. When determining the value of x2 of the first approach coordinate, a two-dimensional curve is determined that passes through the three second map values of this graph. The value of x2 is then calculated by determining the coordinate or axis at the apex of that two-dimensional curve.

In the present embodiment, the maximum second map value map2(pmax,qmax) and two adjacent second map values map2(v,qmax−1) and map2(v,qmax+1), which are contained in rows which differ by one column number from the maximum second map value map2(pmax,qmax), are used to calculate y2 of the second approach coordinate (x2,y2) (here, v=2, 3, . . . , 2n+1) in the same manner as in the case of calculating x2. These two adjacent second map values are mutually contained in the same column. Since the method used to calculate the value of y2 is the same as that used to calculate x2, an explanation thereof is omitted.

In this manner, the calculation unit 92 calculates the second approach coordinate (x2,y2) indicating an approach position of the conductor D2 with respect to the plurality of first detection electrodes $Ex_i$ and the plurality of second detection electrodes $Ey_j$. The IC chip 9 outputs a signal relating to the calculated second approach coordinate (x2,y2) and the previously calculated first approach coordinate (x1,y1) to the outside (S211).

The first approach coordinate (x1,y1) and the second approach coordinate (x2,y2) can be calculated with the flow described above.

Next, an explanation is provided of the action of the present embodiment.

In the present embodiment as well, misoperations resulting from determining that the conductor D2 has approached even though the conductor D2 has not actually approached can be inhibited in the same manner as the first embodiment.

In the present embodiment, the second approach coordinate (x2,y2) is calculated using the second map values map2 (p,q). The number of the second map values map2(p,q) generated is not limited to the number of first detection electrodes $Ex_i$ and the number of second detection electrodes $Ey_j$. Consequently, the second approach coordinate (x2,y2) can be calculated more accurately by generating a larger number of second map values map2(p,q).

In the present embodiment, a coordinate or axis of the apex of the two-dimensional curve shown in FIG. 28 is determined to calculate the second approach coordinate (x2,y2). According to the present inventors, this type of calculation method was determined to be suitable for accurately determining the second approach coordinate (x2,y2).

Next, an explanation is provided of a sixth embodiment of the present invention. The present embodiment differs from the first embodiment in that the first map value map1(p,q) is a value obtained by exponentiating a sum of the first value Vx(p,q) and the second value Vy(p,q).

Namely, the first map value map1(p,q) in the present embodiment is defined as follows:

$$\text{map1}(p,q)=(Vx(p,q)+Vy(p,q))^v \tag{1'}$$

(where, v=2, 3, 4 . . . ).

Since the methods used to determine the first value Vx(p,q) and the second value Vy(p,q) and steps S103 to S106 are the same as those of the first embodiment, explanations thereof are omitted.

Figure 29:
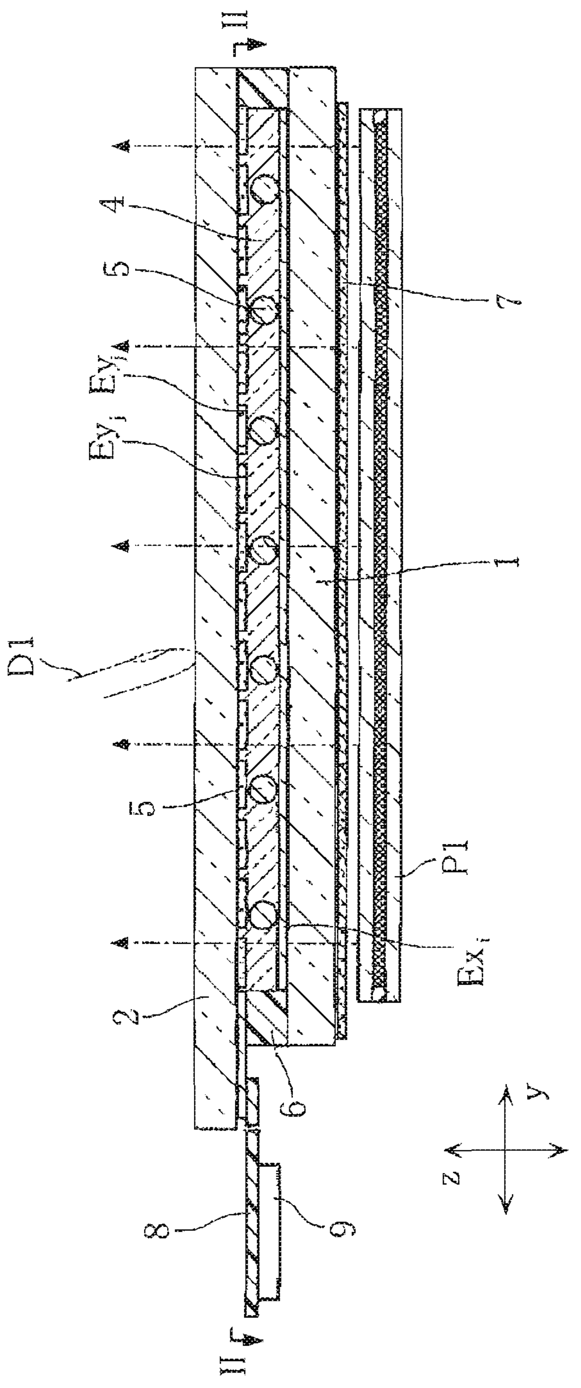
FIG. 29 is a cross-sectional view of essential portions of an input device for explaining a sixth embodiment of the present invention.
Figure 30:
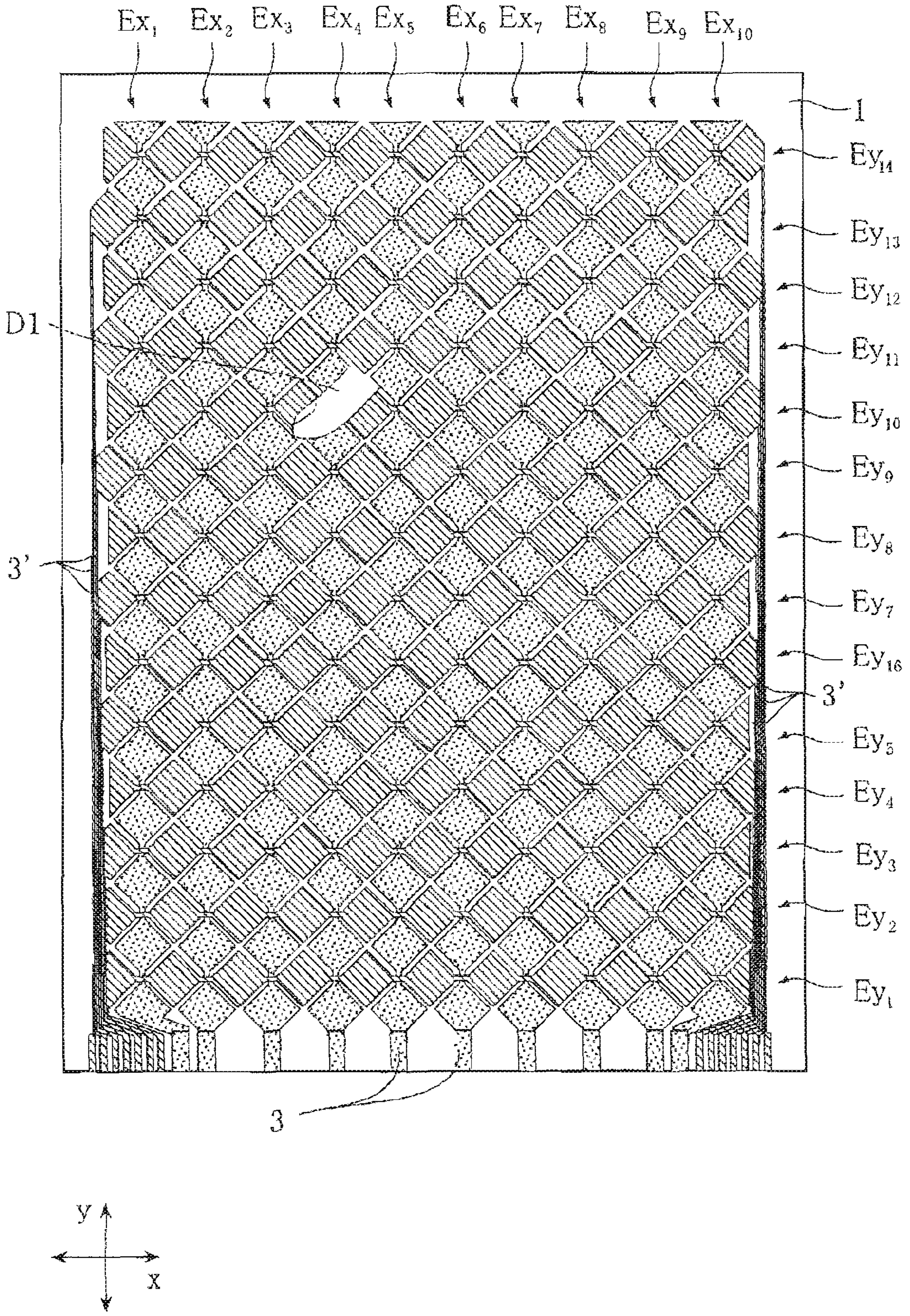
FIG. 30 is an overhead view of essential portions of an input device for explaining a sixth embodiment of the present invention.

According to the present embodiment, an approach position of the conductor D1 can be accurately calculated even in the case the contact area of the conductor D1 relative to the transmission plate 2 shown in FIGS. 29 and 30 is smaller than the contact area in the first embodiment. A state in which contact area of the conductor D1 relative to the transmission plate 2 is small occurs in the case, for example, the size of the conductor D1 is small (such as in the case the conductor D1 is a child's finger, see FIGS. 29 and 30), or in the case a finger serving as the conductor D1 is not adequately pressed against the transmission plate 2. According to the present embodiment, even in a case in which the plurality of first direction detection values Xch(i) slightly indicate values at all times or in a case in which the plurality of second direction detection values Ych(j) slightly indicate values at all times due to the effects of noise, an approach position of the conductor D1 can be calculated accurately. The reason for this is described below.

In order to accurately calculate an approach position of the conductor D1 in the case the contact area of the conductor D1 relative to the transmission plate 2 is small, it is desirable that a ratio Ra of a first map value map1(p,q), which becomes larger in the case the conductor D1 has approached the first detection electrodes $Ex_i$ and the second detection electrodes $Ey_j$, to a first map value map1(p,q) determined using a first direction detection value Xch(i) and a second direction detection value Ych(j) attributable to noise. The ratio Ra is also preferably large in order to accurately calculate an approach position of the conductor D1 in the case the plurality of first direction detection values Xch(i) are slightly indicating values or in the case the plurality of second direction detection values Ych(j) are slightly indicating values due to the effects of noise. This is because, if the ratio Ra is large, the conductor D1 can be more accurately determined to have approached even in the case the contact area of the conductor D1 relative to the transmission plate 2 is small, and a threshold value can be set that reduces the likelihood of an erroneous determination that the conductor D1 has approached even if effects of noise are present.

In the present embodiment, since the exponent v is larger than 1, the ratio Ra becomes larger in comparison with the case in which v=1. This can be better understood by referring to FIGS. 31 to 33.

Figure 31:
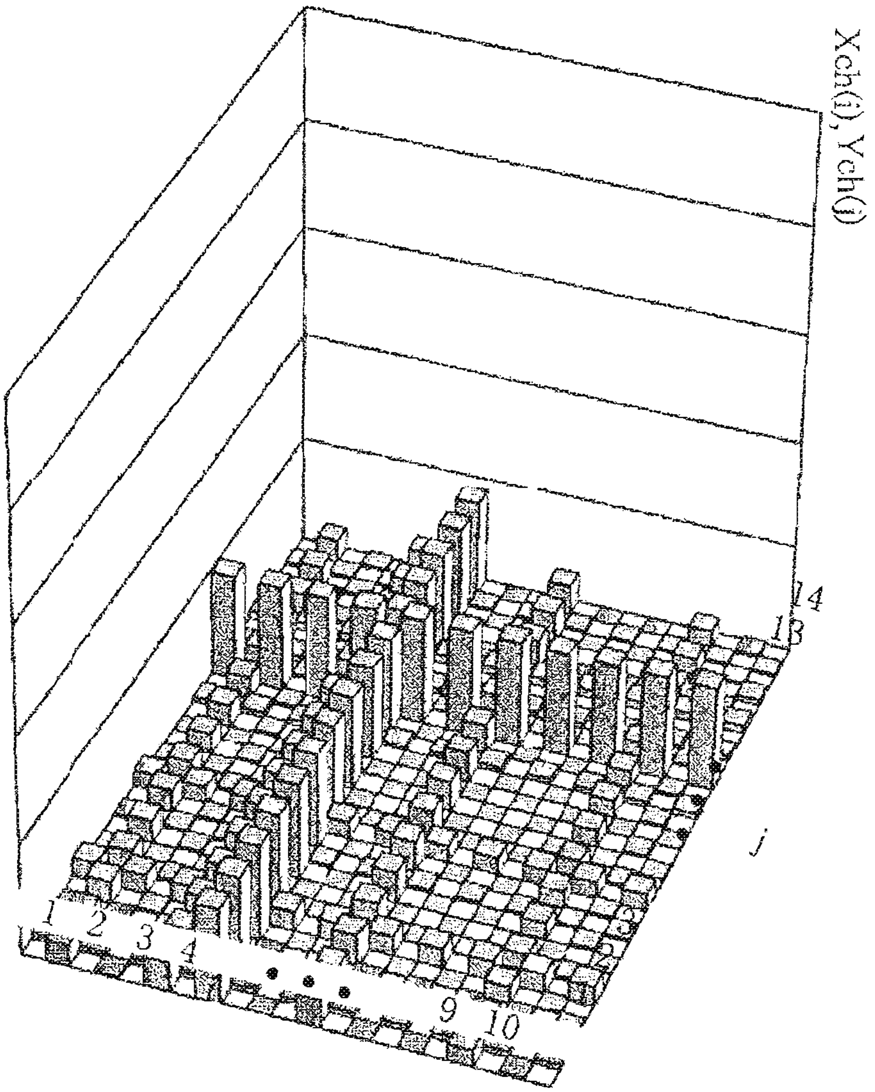
FIG. 31 is a graph showing an example of each of first direction detection values and second direction detection values of a sixth embodiment.

FIG. 31 indicates a bar graph providing a three-dimensional representation of each value for the first direction detection values Xch(i) and the second direction detection values Ych(j) in the case the conductor D1 has approached the transmission plate 2 as shown in FIG. 30.

Among the first detection electrodes $Ex_1$ to $Ex_n$, the electrode that opposes the majority of the region of the conductor D1 that contacts the transmission plate 2 shown in FIG. 30 is a first detection electrode $Ex_4$. Consequently, in FIG. 31, the first direction detection value Xch(4) indicates a larger value than the other first direction detection values Xch(i). Since the contact area of the conductor D1 relative to the transmission plate 2 is smaller than the contact area in the first embodiment, the area opposing the first detection electrode $Ex_4$ is also small. Consequently, the value of the first direction detection value Xch(4) is smaller than the value in the first embodiment. Among the first detection electrodes $Ex_1$ to $Ex_n$, an electrode $Ex_3$ slightly opposes the region of the conductor D1 that contacts the transmission plate 2 in FIG. 30. Consequently, in FIG. 31, the first direction detection value Xch(3) slightly indicates a value. In the present embodiment, a description is provided of the case in which a plurality of first direction detection values Xch(i) slightly indicate values at all times due to the effects of noise. In FIG. 31, Xch(1), Xch(6) and Xch(9) slightly indicate values.

Among the second detection electrodes $Ey_1$ to $Ey_m$, the only electrode that opposes the region of the conductor D1 shown in FIG. 30 that contacts the transmission plate 2 is the second detection electrode $Ey_{10}$. Consequently, in FIG. 31, the second direction detection value Ych(10) indicates a larger value than the other second direction detection values Ych(j). Since the contact area of the conductor D1 relative to the transmission plate 2 is smaller than the contact area in the first embodiment, the area that opposes the second detection electrode $Ey_{10}$ is also small. Consequently, the value of the second direction detection value Ych(10) is also smaller than that in the first embodiment. In the present embodiment, a description is provided of the case in which a plurality of second direction detection values Ych(j) slightly indicate values at all times due to the effects of noise. In FIG. 31, Ych(3) and Ych(6) slightly indicate values due to the effects of noise.

Figure 32:
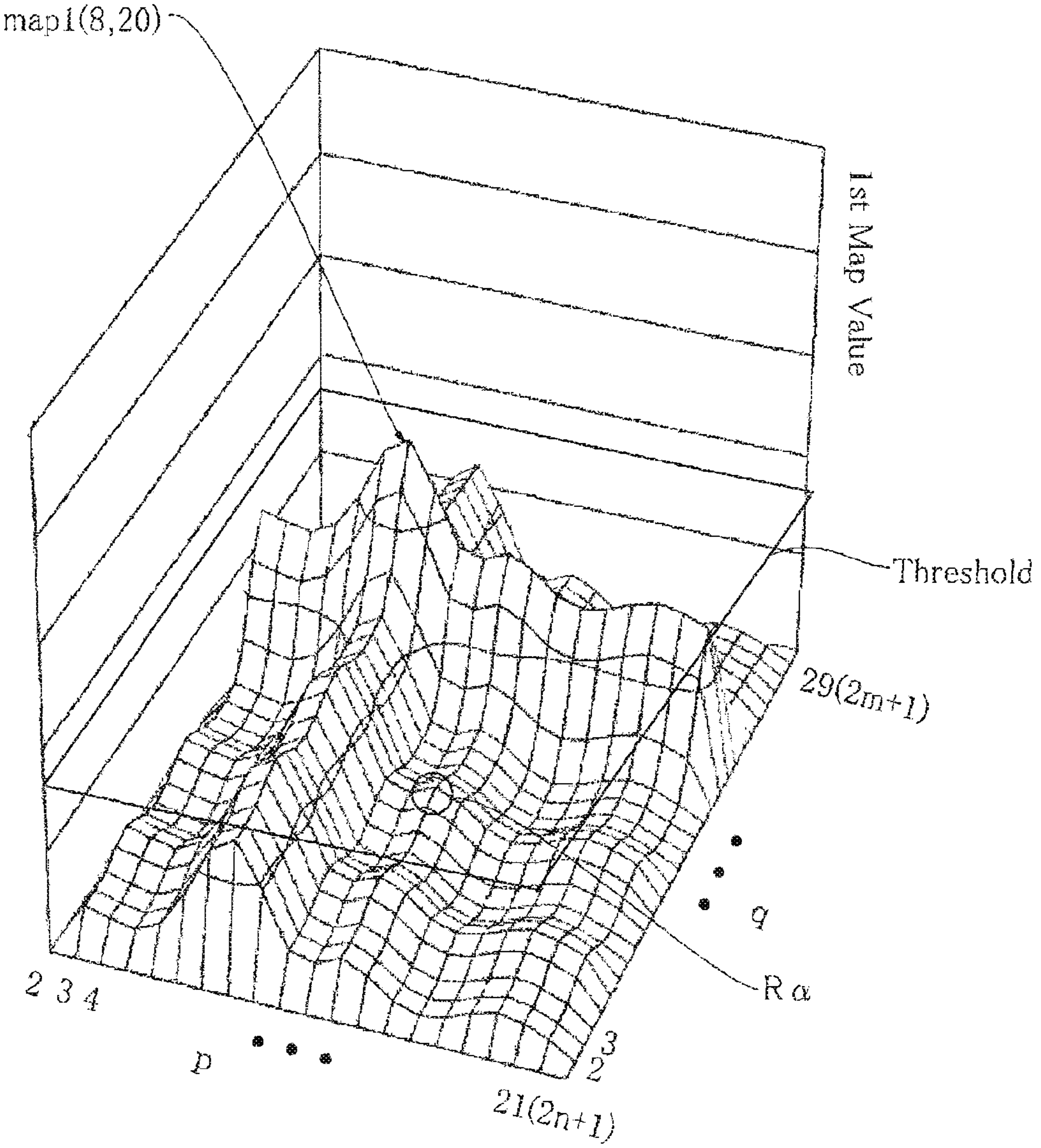
FIG. 32 is a drawing showing a three-dimensional representation of first map values generated using each of the first direction detection values and second direction detection values shown in FIG. 31 and a formula in a first embodiment.
Figure 33:
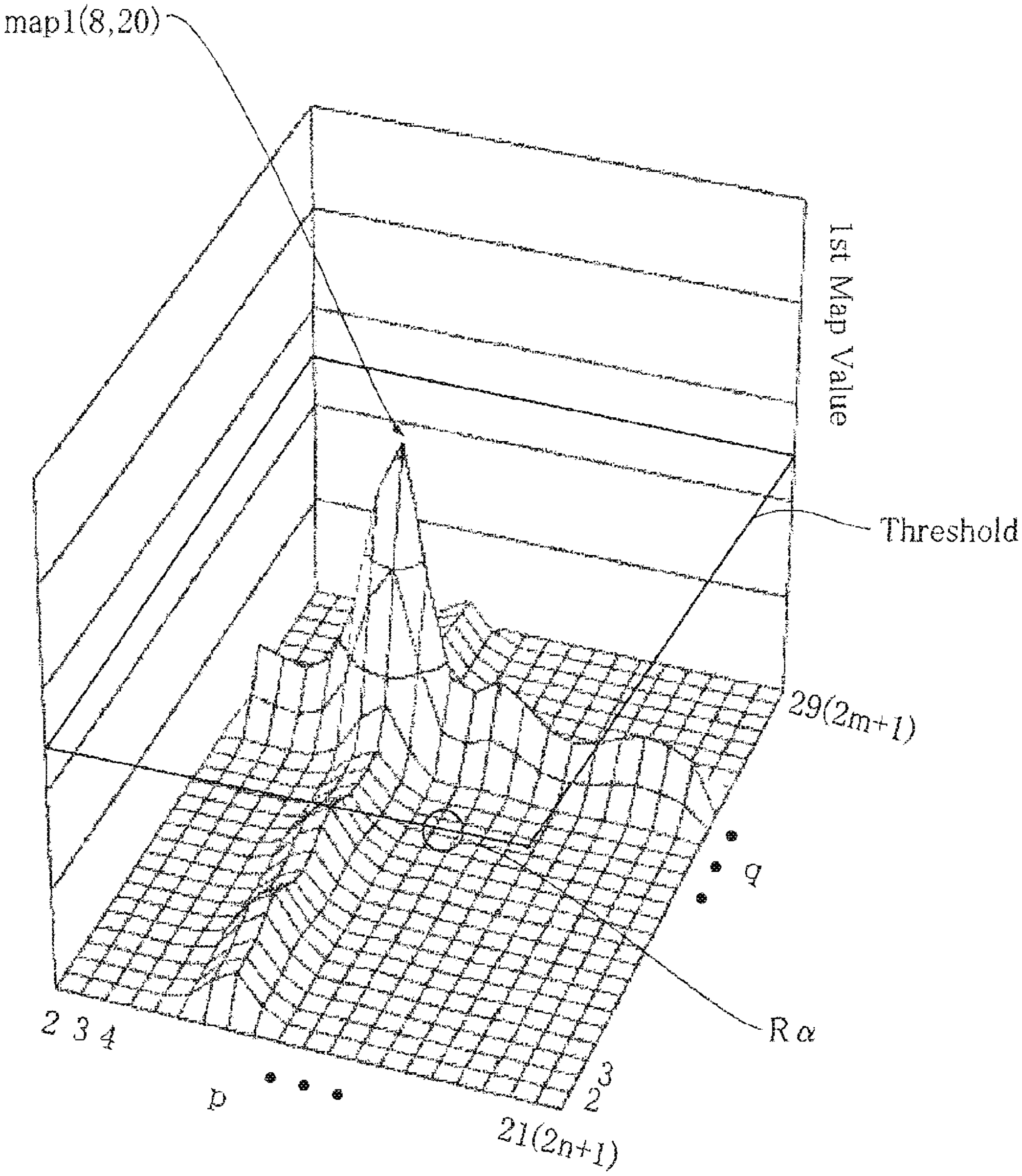
FIG. 33 is a drawing showing a three-dimensional representation of first map values of a sixth embodiment of the present invention.
Figure 34:
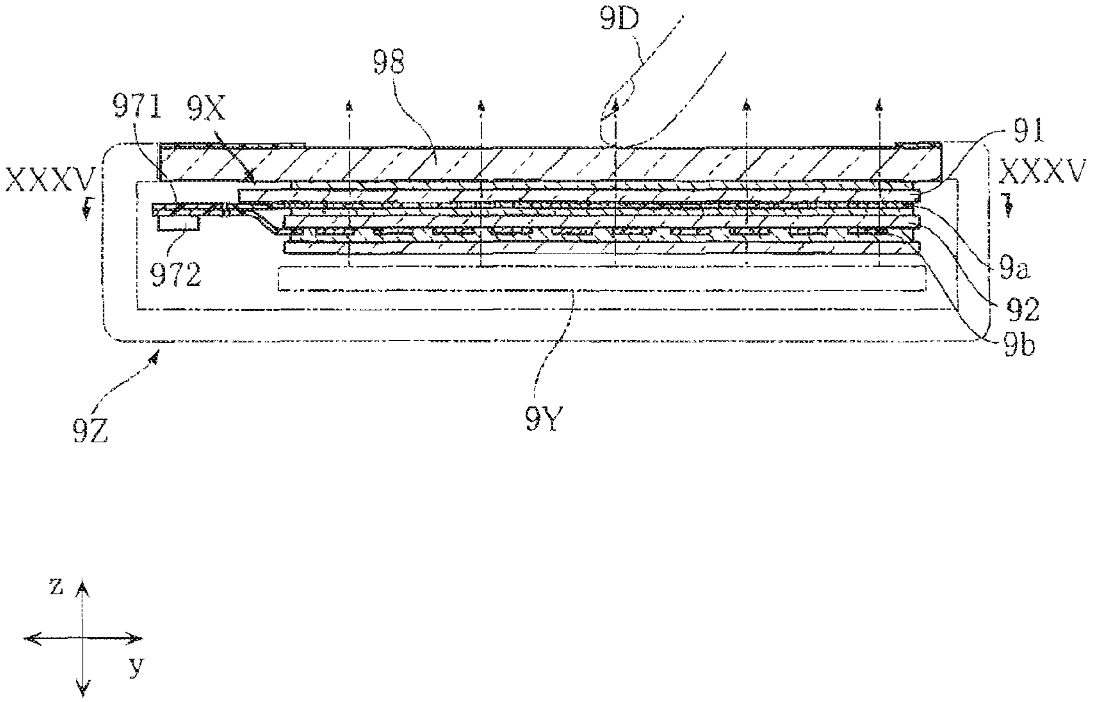
FIG. 34 is a cross-sectional view showing an example of an input device related to the present invention.
Figure 35:
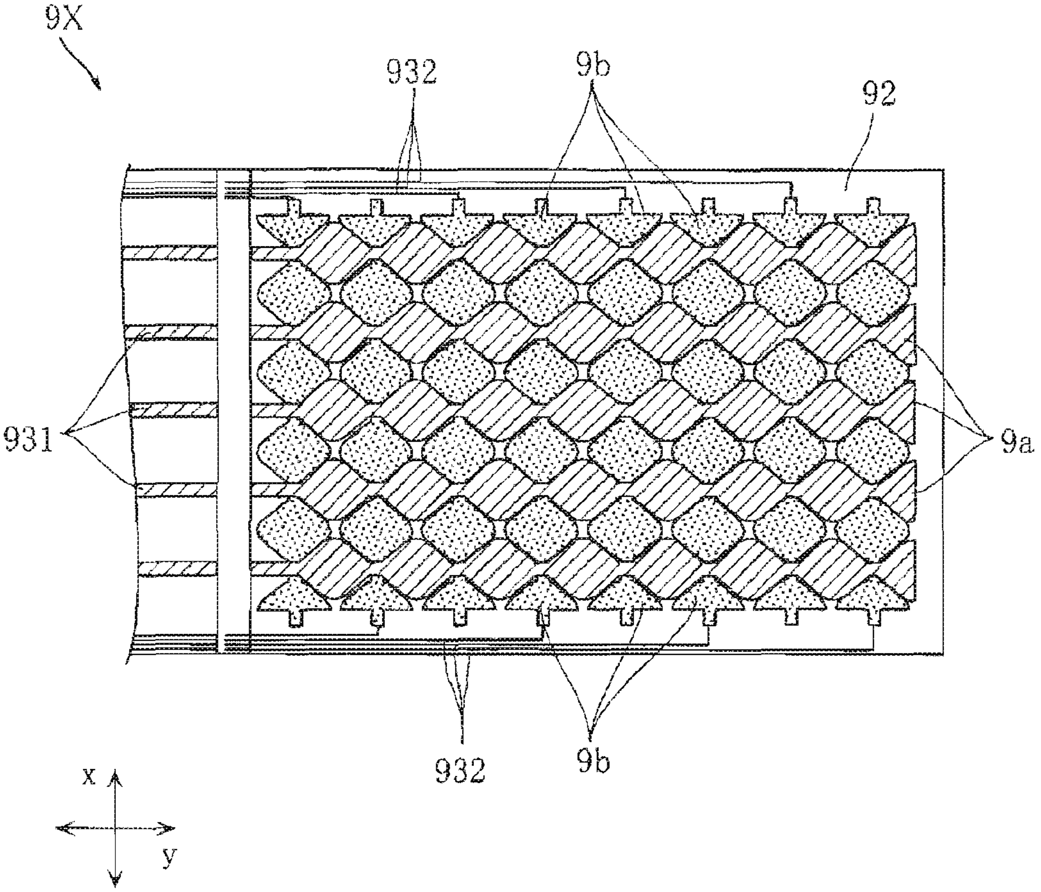
FIG. 35 is an overhead view of essential portions taken along. line XXXV-XXXV of FIG. 34.
Figure 36:
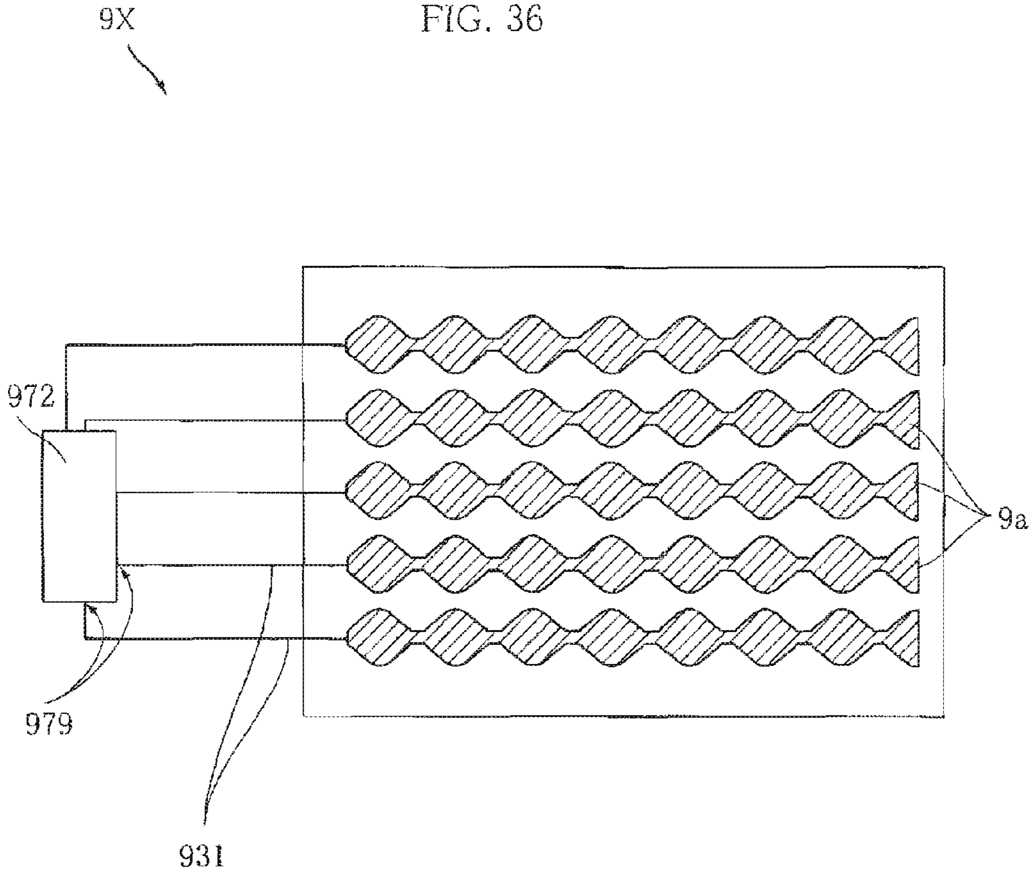
FIG. 36 is a drawing conceptually showing a connected state between detection electrodes and an IC chip.
Figure 37:
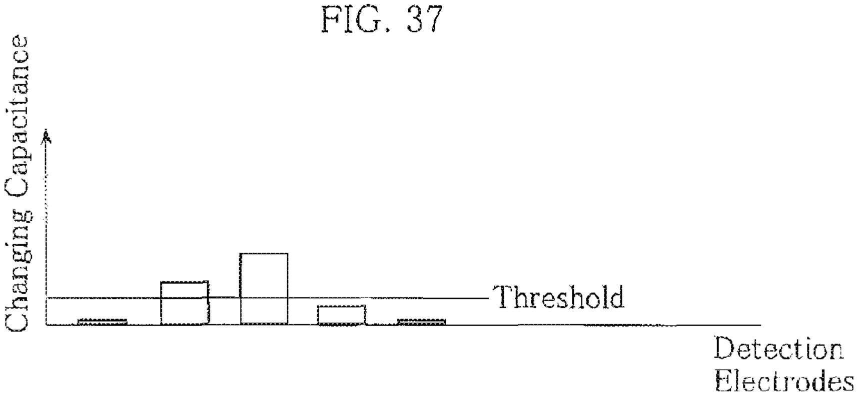
FIG. 37 is a graph representing values corresponding to changes in electrostatic capacitance between a conductor and detection electrodes when the conductor has approached or contacted a transparent cover.

FIG. 32 indicates a three-dimensional representation of first map values map1(p,q) in the case of v=1 in formula (1)', namely in the case of having determined according to the method described in the first embodiment, by using the first direction detection values Xch(i) and the second direction detection values Ych(j) shown in FIG. 31. FIG. 33 indicates a three-dimensional representation of first map values map1(p, q) in the case of v=3 in formula (1)' by using the first direction detection values Xch(i) and the second direction detection values Ych(j) shown in FIG. 31.

As shown in FIG. 32, since the contact area of the conductor D1 relative to the transmission plate 2 is small, the first map value map1(p,q) that demonstrates a peak in the same drawing (such as map1(8,20)) is only slightly larger than the other first map values map1(p,q). The first map values map1 (p,q) determined using the first direction detection values Xch(i) (such as Xch(6)) or the second direction detection values Ych(j) (such as Ych(6)) attributable to noise (an example of which is indicated with Rα in FIG. 32) are comparatively small. Consequently, the value of the ratio Ra is comparatively small in the case of FIG. 32.

On the other hand, in FIG. 33, the first map value map1(p, q) demonstrating a peak (such as map1(8,20)) is much larger than the other first map values map1(p,q) in comparison with the case shown in FIG. 32. In FIG. 33, the first map values map1(p,q) determined using the first direction detection values Xch(i) (such as Xch(6)) and the second direction detection values Ych(j) (such as Ych(6)) attributable to noise (an example of which is indicated with Rα in FIG. 33) are comparatively small. Consequently, the value of the ratio Ra is comparatively large in the case shown in FIG. 33.

As has been described above, in the present embodiment, the ratio Ra can be seen to have become larger in comparison with the case in which v=1.

Thus, according to the present embodiment, an approach position of the conductor D1 can be calculated accurately even in the case the contact area of the conductor D1 relative to the transmission plate 2 is smaller than the area in the first embodiment. According to the present embodiment, an approach position of the conductor D1 can be calculated accurately even in the case a plurality of the first direction detection values Xch(i) slightly indicate values at all times, or in the case a plurality of the second direction detection values Ych(j) slightly indicate values at all times, due to the effects of noise.

Furthermore, in the fourth embodiment, the first map values map1(p,q) may be defined and calculated as follows in the same manner as the present embodiment:

$$\mathrm{map1}(p,q)=(Vx(p,q)+Vy(p,q))^v \quad (1)'$$

(where, v=2, 3, 4 . . . ).

Moreover, the second map values map2(p,q) may be calculated and defined as follows:

$$\mathrm{map2}(p,q)=(Wx(p,q)+Wy(p,q))^w \quad (6)'$$

(where, w=2, 3, 4, . . . ).

In addition, these values may also be calculated using v=w.

According to this type of configuration as well, approach positions of the conductors D1 and D2 can each be calculated accurately as previously described.

The scope of the present invention is not limited to the previously described embodiments. The designs of specific configurations of each component of the present invention can be freely altered in various ways. For example, although an example in which the first map values are the sums of the first values and the second values has been indicated, whether or not a conductor has approached may also be determined by comparing first map values obtained by multiplying the first values and the second values with a prescribed threshold value.

Although the first detection electrodes and the second detection electrodes are formed on different substrates in the previously described embodiments, the first detection electrodes and the second detection electrodes may also be formed on a single substrate.

The input device according to the present invention is not limited to that used in a cell phone. For example, the input device of the present invention can also be used in apparatuses using a touch panel, such as a digital camera, personal navigation device, automatic teller machine.

A calculation may also be carried out between the step of generating the first map values map1(p,q) (S102) and the step of determining whether or not the conductor D1 has approached (S103) by which the first map values map(p,q) that slightly indicate values due to the effects of noise are set to 0. For example, this type of calculation can be carried out by setting the first map values map1(p,q) that are equal to or less than a certain value to 0.

The invention claimed is:

1. An electrostatic capacitance type input device comprising:

a plurality of first detection electrodes arranged in a first direction and respectively extending in a second direction intersecting the first direction;

a plurality of second detection electrodes arranged in the second direction and respectively extending in the first direction;

a storage unit that respectively stores values obtained through each of the first detection electrodes resulting from a change in electrostatic capacitance between a first conductor and each of the first detection electrodes as first direction detection values, and respectively stores values obtained through each of the second detection electrodes as a result of a change in electrostatic capacitance between the first conductor and each of the second detection electrodes as second direction detection values; and a calculation unit, wherein the calculation unit executes:

processing for generating a plurality of first map values obtained by arithmetic processing of a first value obtained by arithmetic processing of at least any of the plurality of first direction detection values and a second value obtained by arithmetic processing of at least any of the plurality of second direction detection values, and processing for determining whether or not the first conductor has approached the plurality of first detection electrodes and the plurality of second detection electrodes by using the plurality of first map values, and each of the first map values is a value obtained by exponentiating a sum of any one of the plurality of first values and any one of the plurality of second values.

2. The electrostatic capacitance type input device according to claim 1, wherein the plurality of first map values includes a maximum first map value that is the largest value among the plurality of first map values, and the calculation unit compares the maximum first map value with a prescribed threshold value in the processing for determining whether or not the first conductor has approached.

3. The electrostatic capacitance type input device according to claim 1, wherein any one of the plurality of first values is a value obtained by weighting the area of a region where each of the first detection electrodes and a prescribed region overlap and adding at least any of the plurality of first direction detection values, and any one of the plurality of second values is a value obtained by weighting the area of a region where each of the second detection electrodes and the prescribed region overlap and adding at least any of the plurality of second direction detection values.

4. The electrostatic capacitance type input device according to claim 1, wherein each of the first map values is correlated with a two-dimensional coordinate containing a pair of one coordinate value in the first direction and one coordinate value in the second direction, the calculation unit executes processing for calculating a first approach position in use of the plurality of first map values, and the first approach position is an approach position of the first conductor relative to the plurality of first detection electrodes and the plurality of second detection electrodes in the first direction and the second direction respectively.

5. The electrostatic capacitance type input device according to claim 4, wherein the calculation unit calculates the first approach position in use of only a portion of the plurality of first map values in the processing for calculating the first approach position.

6. The electrostatic capacitance type input device according to claim 5, wherein each of the first map values is any one of a plurality of elements of a first matrix, each of row components of the first matrix is correlated with a single coordinate value in the first direction while each of column components of the first matrix is correlated with a single coordinate value in the second direction, in the first matrix, coordinate values in the first direction correlated with the row components change monotonously as row numbers increase, while coordinate values in the second direction correlated with the column components change monotonously as column numbers increase, the plurality of first map values includes a maximum first map value that is the largest value among the plurality of first map values and two adjacent first map values different by one row number from the maximum first map value, but having mutually same column numbers as the maximum first map value, and the calculation unit calculates the first approach position by using the maximum first map value and the two adjacent first map values in the processing for calculating the first approach position.

7. An electrostatic capacitance type input device, comprising:

a plurality of first detection electrodes arranged in a first direction and respectively extending in a second direction intersecting the first direction;

a plurality of second detection electrodes arranged in the second direction and respectively extending in the first direction;

a storage unit that respectively stores values obtained through each of the first detection electrodes resulting from a change in electrostatic capacitance between a first conductor and each of the first detection electrodes as first direction detection values, and respectively stores values obtained through each of the second detection electrodes as a result of a change in electrostatic capacitance between the first conductor and each of the second detection electrodes as second direction detection values; and a calculation unit, wherein the calculation unit executes:

processing for generating a plurality of first map values obtained by arithmetic processing of a first value obtained by arithmetic processing of at least any of the plurality of first direction detection values and a second value obtained by arithmetic processing of at least any of the plurality of second direction detection values, and processing for determining whether or not the first conductor has approached the plurality of first detection electrodes and the plurality of second detection electrodes by using the plurality of first map values, the plurality of first detection electrodes includes a first approached detection electrode closest to the first approach position among the plurality of first detection electrodes, the plurality of second detection electrodes includes a second approached detection electrode closest to the first approach position among the plurality of second detection electrodes, the calculation unit executes preparatory processing, and in the preparatory processing, a value corresponding to the first approached detection electrode among the plurality of first direction detection values in the storage unit is down-converted, and a value corresponding to the second approached detection electrode among the plurality of second direction detection values in the storage unit is down-converted, and the calculation unit, after carrying out the preparatory processing, executes processing for generating a plurality of second map values obtained by arithmetic processing of a third value obtained by arithmetic processing of at least any of the plurality of first direction values and a fourth value obtained by arithmetic processing of at least any of the plurality of second direction detection values, and processing for determining whether or not a second conductor has approached the plurality of first detection electrodes and the plurality of second detection electrodes by using the plurality of second map values.

8. The electrostatic capacitance type input device according to claim 7, wherein each of the second map values is correlated with a two-dimensional coordinate containing a pair of one coordinate value in the first direction and one coordinate value in the second direction, the calculation unit executes processing for calculating a second approach position using the plurality of second map values, and the second approach position is an approach position of a second conductor, which differs from the first conductor, relative to the plurality of first detection electrodes and the plurality of second detection electrodes in the first direction and the second direction respectively.

9. The electrostatic capacitance type input device according to claim 8, wherein the calculation unit calculates the second approach position in use of only a portion of the plurality of second map values in the processing for calculating the second approach position.

10. The electrostatic capacitance type input device according to claim 9, wherein each of the second map values is any one of a plurality of elements of a second matrix, each of row components of the second matrix is correlated with a single coordinate value in the first direction while each of column components of the second matrix is correlated with a single coordinate value in the second direction, in the second matrix, coordinate values in the first direction correlated with the row components change monotonously as row numbers increase, while coordinate values in the second direction correlated with the column components change monotonously as column numbers increase, the plurality of second map values includes a maximum second map value that is the largest value among the plurality of second map values and two adjacent second map values different by one column number from the maximum second map value, but having mutually same row numbers as the maximum second map value, and the calculation unit calculates the second approach position by using the maximum second map value and the two adjacent second map values in the processing for calculating the second approach position.

11. A calculation method that uses an electrostatic capacitance type input device provided with a plurality of first detection electrodes arranged in a first direction and respectively extending in a second direction intersecting the first direction, and a plurality of second detection electrodes arranged in the second direction and respectively extending in the first direction, the method comprising the steps of:

storing respectively in a storage unit, as first direction detection values, values obtained through each of the first detection electrodes resulting from a change in electrostatic capacitance between a first conductor and each of the first detection electrodes;

storing respectively in the storage unit, as second direction detection values, values obtained through each of the second detection electrodes resulting from a change in electrostatic capacitance between the first conductor and each of the second detection electrodes;

generating a plurality of first map values obtained by arithmetic processing of a first value obtained by arithmetic processing of at least any of the plurality of first direction detection values and a second value obtained by arithmetic processing of at least any of the plurality of second direction detection values, and determining whether or not the first conductor has approached the plurality of first detection electrodes and the plurality of second detection electrodes by using the plurality of first map values, and wherein each of the first map values is a value obtained by exponentiating a sum of any one of the plurality of first values and any one of the plurality of second values.

12. The calculation method according to claim 11, wherein the plurality of first map values includes a maximum first map value that is the largest value among the plurality of first map values, and the maximum first map value is compared with a prescribed threshold value in the determination step.

13. The calculation method according to claim 11, wherein any of the plurality of first values is a value obtained by weighting the area of a region where each of the first detection electrodes and a prescribed region overlap and adding at least any of the plurality of first direction detection values, and any of the plurality of second values is a value obtained by weighting the area of a region where each of the second detection electrodes and the prescribed region overlap and adding at least any of the plurality of second direction detection values.

14. The calculation method according to claim 11, wherein each of the first map values is correlated with a two-dimensional coordinate containing a pair of one coordinate value in the first direction and one coordinate value in the second direction, a step is further provided for calculating a first approach position in use of the plurality of first map values, and the first approach position is an approach position of the first conductor relative to the plurality of first detection electrodes and the plurality of second detection electrodes in the first direction and the second direction respectively.

15. The calculation method according to claim 14, wherein the first approach position is calculated in use of only a portion of the plurality of first map values in the step of calculating the first approach position.

16. The calculation method according to claim 15, wherein each of the first map values is any one of a plurality of elements of a first matrix, each of row components of the first matrix is correlated with a single coordinate value in the first direction while each of column components of the first matrix is correlated with a single coordinate value in the second direction, in the first matrix, coordinate values in the first direction correlated with the row components change monotonously as row numbers increase, while coordinate values in the second direction correlated with the column components change monotonously as column numbers increase, the plurality of first map values includes a maximum first map value that is the largest value among the plurality of first map values and two adjacent first map values different by one row number from the maximum first map value, but having mutually same column numbers as the maximum first map value, and the first approach position is calculated by using the maximum first map value and the two adjacent first map values in the step of calculating the first approach position.

17. A calculation method, that uses an electrostatic capacitance type input device provided with a plurality of first detection electrodes arranged in a first direction and respectively extending in a second direction intersecting the first direction, and a plurality of second detection electrodes arranged in the second direction and respectively extending in the first direction, the method comprising the steps of:

storing respectively in a storage unit, as first direction detection values, values obtained through each of the first detection electrodes resulting from a change in electrostatic capacitance between a first conductor and each of the first detection electrodes;

storing respectively in the storage unit, as second direction detection values, values obtained through each of the second detection electrodes resulting from a change in electrostatic capacitance between the first conductor and each of the second detection electrodes;

generating a plurality of first map values obtained by arithmetic processing of a first value obtained by arithmetic processing of at least any of the plurality of first direction detection values and a second value obtained by arithmetic processing of at least any of the plurality of second direction detection values, and determining whether or not the first conductor has approached the plurality of first detection electrodes and the plurality of second detection electrodes by using the plurality of first map values, wherein the plurality of first detection electrodes includes a first approached detection electrode closest to the first approach position among the plurality of first detection electrodes, the plurality of second detection electrodes includes a second approached detection electrode closest to the first approach position among the plurality of second detection electrodes, the calculation method further comprising a preparation step, and in the preparation step, a value corresponding to the first approached detection electrode among the plurality of first direction detection values in the storage unit is down-converted, and a value corresponding to the second approached detection electrode among the plurality of second direction detection values in the storage unit is down-converted, and the method further comprising:

after the preparation step, a step of generating a plurality of second map values obtained by arithmetic processing of a third value obtained by arithmetic processing of at least any of the plurality of first direction values and a fourth value obtained by arithmetic processing of at least any of the plurality of second direction detection values; and a step of determining whether or not the second conductor has approached the plurality of first detection electrodes and the plurality of second detection electrodes by using the plurality of second map values.

18. The calculation method according to claim 17, wherein each of the second map values is correlated with a two-dimensional coordinate containing a pair of one coordinate value in the first direction and one coordinate value in the second direction, a step is further provided for calculating a second approach position in use of the plurality of second map values, and the second approach position is an approach position of the second conductor relative to the plurality of first detection electrodes and the plurality of second detection electrodes in the first direction and the second direction respectively.

19. The calculation method according to claim 18, wherein the second approach position is calculated in use of only a portion of the plurality of second map values in the step of calculating the second approach position.

20. The calculation method according to claim 19, wherein each of the second map values is any one of a plurality of elements of a second matrix, each of row components of the second matrix is correlated with a single coordinate value in the first direction while each of column components of the second matrix is correlated with a single coordinate value in the second direction, in the second matrix, coordinate values in the first direction correlated with the row components change monotonously as row numbers increase, while coordinate values in the second direction correlated with the column components change monotonously as column numbers increase, the plurality of second map values includes a maximum second map value that is the largest value among the plurality of second map values and two adjacent second map values different by one column number from the maximum second map value, but having mutually same row numbers as the maximum second map value, and the second approach position is calculated by using the maximum second map value and the two adjacent second map values in the step of calculating the second approach position.

* * * * *